(12) United States Patent
Sun et al.

(10) Patent No.: US 12,145,303 B2
(45) Date of Patent: Nov. 19, 2024

(54) POLYMERIC MATERIAL FOR CONTAINER

(71) Applicant: Berry Plastics Corporation, Evansville, IN (US)

(72) Inventors: David Dezhou Sun, Evansville, IN (US); Philip A. Driskill, Newburgh, IN (US); Tony Cain, Spottsville, KY (US); Diane E. Marret, Newburgh, IN (US); Debra R. Wilson, Houston, TX (US); Timothy Ponrathnam, Evansville, IN (US)

(73) Assignee: Berry Plastics Corporation, Evansville, IN (US)

( * ) Notice: Subject to any disclaimer, the term of this patent is extended or adjusted under 35 U.S.C. 154(b) by 898 days.

(21) Appl. No.: 17/075,183

(22) Filed: Oct. 20, 2020

(65) Prior Publication Data

US 2021/0053270 A1 Feb. 25, 2021

Related U.S. Application Data

(63) Continuation of application No. 15/902,489, filed on Feb. 22, 2018, now abandoned, which is a
(Continued)

(51) Int. Cl.
B29C 48/23 (2019.01)
B29B 11/14 (2006.01)
(Continued)

(52) U.S. Cl.
CPC ............ *B29C 49/071* (2022.05); *B29B 11/14* (2013.01); *B29C 48/0017* (2019.02);
(Continued)

(58) Field of Classification Search
CPC ... B29C 49/071; B29C 48/0017; B29C 48/21; B29C 48/23; B29C 49/04; B29C 49/22; B29C 48/0015; B29C 48/09; B29C 48/49; B29C 2049/627; B29C 2949/3008; B29C 2949/3012; B29C 2949/302; B29C 2949/3044; B29C 2949/0715;
(Continued)

(56) References Cited

U.S. PATENT DOCUMENTS 1,396,282 A 11/1921 Penn
1,435,120 A 11/1922 Holman
(Continued)

FOREIGN PATENT DOCUMENTS

AU 2013334155 B2 2/2017
BE 898053 4/1984
(Continued)

OTHER PUBLICATIONS

Office Action (Non-Final Rejection) dated Dec. 23, 2022 for U.S. Appl. No. 17/135,048, BP-432 US-CON1 |, (pp. 1-14).
(Continued)

*Primary Examiner* — K. Boyle
(74) *Attorney, Agent, or Firm* — Barnes & Thornburg LLP

(57) ABSTRACT

A formulation for producing a polymeric material including high-density polyethylene, a chemical blowing agent, and other optional components is described.

13 Claims, 6 Drawing Sheets

Related U.S. Application Data continuation of application No. 15/059,995, filed on Mar. 3, 2016, now Pat. No. 9,937,652.

(60) Provisional application No. 62/279,177, filed on Jan. 15, 2016, provisional application No. 62/128,195, filed on Mar. 4, 2015.

(51) Int. Cl.

| | | |
|---|---|---|
| *B29C 48/00* | (2019.01) | |
| *B29C 48/21* | (2019.01) | |
| *B29C 49/00* | (2006.01) | |
| *B29C 49/04* | (2006.01) | |
| *B29C 49/22* | (2006.01) | |
| *B32B 1/00* | (2006.01) | |
| *B32B 5/20* | (2006.01) | |
| *B32B 27/08* | (2006.01) | |
| *B32B 27/30* | (2006.01) | |
| *B32B 27/32* | (2006.01) | |
| *B65D 1/02* | (2006.01) | |
| *B65D 1/12* | (2006.01) | |
| *B65D 81/38* | (2006.01) | |
| *C08J 9/06* | (2006.01) | |
| *C08J 9/12* | (2006.01) | |
| *B29B 11/10* | (2006.01) | |
| *B29C 48/09* | (2019.01) | |
| *B29C 48/49* | (2019.01) | |
| *B29C 49/48* | (2006.01) | |
| *B29C 49/62* | (2006.01) | |
| *B29K 23/00* | (2006.01) | |
| *B29K 105/00* | (2006.01) | |
| *B29K 105/04* | (2006.01) | |
| *B29K 105/12* | (2006.01) | |
| *B29K 223/00* | (2006.01) | |
| *B29L 9/00* | (2006.01) | |
| *B29L 23/00* | (2006.01) | |
| *B29L 31/00* | (2006.01) | |

(52) U.S. Cl.
CPC .............. *B29C 48/21* (2019.02); *B29C 48/23* (2019.02); *B29C 49/04* (2013.01); *B29C 49/22* (2013.01); *B32B 1/00* (2013.01); *B32B 5/20* (2013.01); *B32B 27/08* (2013.01); *B32B 27/306* (2013.01); *B32B 27/32* (2013.01); *B65D 1/0215* (2013.01); *B65D 1/12* (2013.01); *B65D 81/38* (2013.01); *B65D 81/3846* (2013.01); *C08J 9/06* (2013.01); *C08J 9/122* (2013.01); *B29B 11/10* (2013.01); *B29C 48/0015* (2019.02); *B29C 48/09* (2019.02); *B29C 48/49* (2019.02); *B29C 49/48* (2013.01); *B29C 2049/627* (2013.01); *B29C 2949/3008* (2022.05); *B29C 2949/3012* (2022.05); *B29C 2949/302* (2022.05); *B29C 2949/3044* (2022.05); *B29K 2023/0633* (2013.01); *B29K 2023/065* (2013.01); *B29K 2105/0005* (2013.01); *B29K 2105/0058* (2013.01); *B29K 2105/04* (2013.01); *B29K 2105/12* (2013.01); *B29K 2223/00* (2013.01); *B29K 2995/0063* (2013.01); *B29L 2009/001* (2013.01); *B29L 2023/00* (2013.01); *B29L 2031/712* (2013.01); *B29L 2031/7158* (2013.01); *B32B 2250/242* (2013.01); *B32B 2250/246* (2013.01); *B32B 2262/0253* (2013.01); *B32B 2262/14* (2013.01); *B32B 2270/00* (2013.01); *B32B 2307/4026* (2013.01); *B32B 2307/71* (2013.01); *B32B 2307/72* (2013.01); *B32B 2307/7242* (2013.01); *B32B 2439/60* (2013.01); *B32B 2439/70* (2013.01); *C08J 2323/06* (2013.01); *C08J 2323/08* (2013.01); *C08J 2423/06* (2013.01)

(58) Field of Classification Search
CPC . B29C 2949/3094; B29B 11/14; B29B 11/10; B32B 1/00; B32B 1/02; B32B 5/20; B32B 27/08; B32B 27/306; B32B 27/32; B32B 2250/242; B32B 2250/246; B32B 2262/0253; B32B 2262/14; B32B 2270/00; B32B 2307/4026; B32B 2307/71; B32B 2307/72; B32B 2307/7242; B32B 2439/60; B32B 2439/70; B65D 1/0215; B65D 1/12; B65D 81/38; B65D 81/3846; C08J 9/06; C08J 9/122; C08J 2323/06; C08J 2323/08; C08J 2423/06; C08J 9/0061; B29K 2023/0633; B29K 2023/065; B29K 2105/0005; B29K 2105/0058; B29K 2105/04; B29K 2105/12; B29K 2223/00; B29K 2995/0063; B29L 2009/001; B29L 2023/00; B29L 2031/712; B29L 2031/7158

See application file for complete search history.

(56) References Cited

U.S. PATENT DOCUMENTS

| | | |
|---|---|---|
| 1,920,529 A | 8/1933 | Sidebotham |
| 1,969,030 A | 8/1934 | Page |
| 2,097,899 A | 11/1937 | Smith |
| 2,103,831 A | 12/1937 | Sidon |
| 2,809,776 A | 3/1956 | Barrington |
| 3,182,882 A | 5/1965 | Aellen, Jr. |
| 3,221,954 A | 12/1965 | Lux |
| 3,227,784 A | 1/1966 | Blades |
| 3,252,387 A | 5/1966 | Schur |
| 3,290,198 A | 12/1966 | Lux |
| 3,312,383 A | 4/1967 | Shapiro |
| 3,327,038 A | 6/1967 | Fox |
| 3,327,103 A | 6/1967 | Bonnet |
| 3,344,222 A | 9/1967 | Shapiro |
| 3,381,880 A | 5/1968 | Lewallen et al. |
| 3,409,204 A | 11/1968 | Carle |
| 3,431,163 A | 3/1969 | Harold |
| 3,443,715 A | 5/1969 | Bryant |
| 3,468,467 A | 9/1969 | Amberg |
| 3,547,012 A | 12/1970 | Amberg |
| 3,583,624 A | 6/1971 | Peacock |
| 3,658,615 A | 4/1972 | Amberg |
| 3,661,282 A | 5/1972 | Buhayar |
| 3,703,255 A | 11/1972 | Wade |
| 3,733,381 A | 5/1973 | Willette |
| 3,793,283 A | 2/1974 | Frailey |
| 3,846,349 A | 11/1974 | Harada |
| 3,892,828 A | 7/1975 | Weatherly |
| 3,907,193 A | 9/1975 | Heller |
| 3,919,368 A | 11/1975 | Seto |
| RE28,658 E | 12/1975 | MacDaniel |
| 3,967,991 A | 7/1976 | Shimano |
| 3,969,173 A | 7/1976 | Amberg |
| 3,971,696 A | 7/1976 | Manfredi |
| 3,973,721 A | 8/1976 | Nakane |
| 3,981,412 A | 9/1976 | Asmus |
| 4,026,458 A | 5/1977 | Morris |
| 4,036,675 A | 7/1977 | Amberg |
| 4,047,868 A | 9/1977 | Kudo |
| 4,049,122 A | 9/1977 | Maxwell |
| 4,070,513 A | 1/1978 | Rhoads |
| 4,106,397 A | 8/1978 | Amberg |
| 4,171,085 A | 10/1979 | Doty |

(56) References Cited

U.S. PATENT DOCUMENTS

| | | |
|---|---|---|
| 4,197,948 A | 4/1980 | Amberg |
| 4,206,166 A | 6/1980 | Hayashi |
| 4,220,730 A | 9/1980 | Coyne |
| 4,240,568 A | 12/1980 | Pool |
| 4,264,672 A | 4/1981 | Taylor-Brown |
| 4,284,226 A | 8/1981 | Herbst |
| 4,288,026 A | 9/1981 | Wilhelm |
| 4,298,331 A | 11/1981 | Mueller |
| 4,299,349 A | 11/1981 | Gilden |
| 4,300,891 A | 11/1981 | Bemiss |
| 4,306,849 A | 12/1981 | Cress |
| 4,310,369 A | 1/1982 | Miller |
| 4,349,400 A | 9/1982 | Gilden |
| 4,365,460 A | 12/1982 | Cress |
| 4,391,666 A | 7/1983 | Mueller |
| 4,409,045 A | 10/1983 | Busse |
| 4,435,344 A | 3/1984 | Tioka |
| 4,468,435 A | 8/1984 | Shimba et al. |
| 4,479,989 A | 10/1984 | Mahal |
| 4,490,130 A | 12/1984 | Konzal |
| 4,550,046 A | 10/1985 | Miller |
| 4,553,999 A | 11/1985 | Ziegler |
| 4,579,275 A | 4/1986 | Peelman |
| 4,604,324 A | 8/1986 | Nahmias |
| 4,621,763 A | 11/1986 | Brauner |
| 4,706,873 A | 11/1987 | Schulz |
| 4,720,023 A | 1/1988 | Jeff |
| 4,856,989 A | 8/1989 | Siebert |
| 4,867,664 A | 9/1989 | Fukuhara |
| 4,878,970 A | 11/1989 | Schubert |
| 4,911,978 A | 3/1990 | Tsubone |
| 4,918,112 A | 4/1990 | Roox |
| 4,940,736 A | 7/1990 | Alteepping |
| 4,990,382 A | 2/1991 | Weissenstein |
| 5,037,285 A | 8/1991 | Kudert |
| 5,037,684 A | 8/1991 | Dundas |
| 5,055,022 A | 10/1991 | Hirschberger |
| 5,078,817 A | 1/1992 | Takagaki |
| 5,116,881 A | 5/1992 | Park |
| 5,149,579 A | 9/1992 | Park |
| 5,158,986 A | 10/1992 | Cha |
| 5,160,674 A | 11/1992 | Colton |
| 5,180,751 A | 1/1993 | Park |
| 5,236,963 A | 8/1993 | Jacoby |
| 5,256,462 A | 10/1993 | Callahan |
| 5,286,428 A | 2/1994 | Hayashi |
| 5,308,568 A | 5/1994 | Lipp |
| 5,328,651 A | 7/1994 | Gallagher |
| 5,332,121 A | 7/1994 | Schmidt |
| 5,348,795 A | 9/1994 | Park |
| 5,366,791 A | 11/1994 | Carr |
| 5,385,260 A | 1/1995 | Gatcomb |
| 5,405,667 A | 4/1995 | Heider |
| 5,443,769 A | 8/1995 | Karabedian |
| 5,445,315 A | 8/1995 | Shelby |
| 5,462,794 A | 10/1995 | Lindemann |
| 5,490,631 A | 2/1996 | Iioka |
| 5,507,640 A | 4/1996 | Gilmer |
| 5,547,124 A | 8/1996 | Mueller |
| 5,549,864 A | 8/1996 | Greene |
| 5,574,074 A | 11/1996 | Zushi |
| 5,575,965 A | 11/1996 | Caronia |
| 5,598,940 A | 2/1997 | Finkelstein |
| 5,601,200 A | 2/1997 | Finkelstein |
| 5,605,936 A | 2/1997 | DeNicola, Jr. |
| 5,622,308 A | 4/1997 | Ito |
| 5,628,453 A | 5/1997 | MacLaughlin |
| 5,629,076 A | 5/1997 | Fukasawa |
| 5,669,553 A | 9/1997 | Smith |
| 5,688,572 A | 11/1997 | Slat |
| 5,713,512 A | 2/1998 | Barrett |
| 5,759,624 A | 6/1998 | Neale |
| 5,765,710 A | 6/1998 | Bergerioux |
| 5,766,709 A | 6/1998 | Geddes |
| 5,769,311 A | 6/1998 | Morita |
| 5,819,507 A | 10/1998 | Kaneko |
| 5,840,139 A | 11/1998 | Geddes |
| 5,857,572 A | 1/1999 | Bird |
| 5,866,053 A | 2/1999 | Park |
| 5,868,309 A | 2/1999 | Sandstrom |
| 5,895,614 A | 4/1999 | Rivera |
| 5,916,926 A | 6/1999 | Cooper |
| 5,925,450 A | 7/1999 | Karabedian |
| 5,927,525 A | 7/1999 | Darr |
| 5,928,741 A | 7/1999 | Andersen |
| 5,929,127 A | 7/1999 | Raetzsch |
| 5,944,225 A | 8/1999 | Kawolics |
| 5,948,839 A | 9/1999 | Chatterjee |
| 5,952,423 A | 9/1999 | Shang |
| 6,001,439 A | 12/1999 | Kawakami |
| 6,007,437 A | 12/1999 | Schickert |
| 6,010,062 A | 1/2000 | Shimono |
| 6,030,476 A | 2/2000 | Geddes |
| 6,034,144 A | 3/2000 | Shioya |
| 6,051,174 A | 4/2000 | Park |
| 6,053,214 A | 4/2000 | Sjoberg et al. |
| 6,071,580 A | 6/2000 | Bland |
| 6,077,878 A | 6/2000 | Okura |
| 6,083,611 A | 7/2000 | Eichbauer |
| 6,103,153 A | 8/2000 | Park |
| 6,109,518 A | 8/2000 | Mueller |
| 6,129,653 A | 10/2000 | Fredricks |
| 6,136,396 A | 10/2000 | Gilmer |
| 6,139,665 A | 10/2000 | Schmelzer |
| 6,142,331 A | 11/2000 | Breining |
| 6,169,122 B1 | 1/2001 | Blizard |
| 6,174,930 B1 | 1/2001 | Agarwal |
| 6,193,098 B1 | 2/2001 | Mochizuki |
| 6,218,023 B1 | 4/2001 | Denicola |
| 6,221,925 B1 | 4/2001 | Constant |
| 6,225,366 B1 | 5/2001 | Raetzsch |
| 6,231,942 B1 | 5/2001 | Blizard |
| 6,235,380 B1 | 5/2001 | Tupil |
| 6,251,319 B1 | 6/2001 | Tusim |
| 6,257,485 B1 | 7/2001 | Sadlier |
| 6,258,862 B1 | 7/2001 | Matz |
| 6,267,837 B1 | 7/2001 | Mitchell |
| 6,284,810 B1 | 9/2001 | Burnham |
| 6,294,115 B1 | 9/2001 | Blizard |
| 6,306,973 B1 | 10/2001 | Takaoka |
| 6,308,883 B1 | 10/2001 | Schmelzer |
| 6,319,590 B1 | 11/2001 | Geddes |
| 6,323,251 B1 | 11/2001 | Perez |
| 6,328,916 B1 | 12/2001 | Nishikawa |
| 6,376,059 B1 | 4/2002 | Anderson |
| 6,378,733 B1 | 4/2002 | Boonzaier |
| 6,379,802 B2 | 4/2002 | Ito |
| 6,383,425 B1 | 5/2002 | Wu |
| 6,417,240 B1 | 7/2002 | Park |
| 6,420,024 B1 | 7/2002 | Perez |
| 6,432,525 B1 | 8/2002 | Gokuraku |
| 6,444,073 B1 | 9/2002 | Reeves |
| 6,444,149 B1 | 9/2002 | Valentinsson |
| 6,455,150 B1 | 9/2002 | Sheppard |
| 6,468,451 B1 | 10/2002 | Perez |
| 6,472,473 B1 | 10/2002 | Ansems |
| RE37,932 E | 12/2002 | Baldwin |
| 6,512,019 B1 | 1/2003 | Agarwal |
| 6,521,675 B1 | 2/2003 | Wu |
| 6,541,105 B1 | 4/2003 | Park |
| 6,562,447 B2 | 5/2003 | Wu |
| 6,565,934 B1 | 5/2003 | Fredricks |
| 6,586,532 B1 | 7/2003 | Gauthy |
| 6,593,005 B2 | 7/2003 | Tau |
| 6,593,384 B2 | 7/2003 | Anderson |
| 6,613,811 B1 | 9/2003 | Pallaver |
| 6,616,434 B1 | 9/2003 | Burnham |
| 6,646,019 B2 | 11/2003 | Perez |
| 6,649,666 B1 | 11/2003 | Read |
| 6,706,223 B1 | 3/2004 | Anderson |
| 6,713,139 B2 | 3/2004 | Usui |
| 6,720,362 B1 | 4/2004 | Park |
| 6,749,913 B2 | 6/2004 | Watanabe |
| 6,779,662 B2 | 8/2004 | Dorsey |

(56) References Cited

U.S. PATENT DOCUMENTS

| | | |
|---|---|---|
| 6,811,843 B2 | 11/2004 | DeBraal |
| 6,814,253 B2 | 11/2004 | Wong |
| 6,875,484 B1 | 4/2005 | Kogure |
| 6,875,826 B1 | 4/2005 | Huovinen |
| 6,883,677 B2 | 4/2005 | Goeking |
| 6,884,377 B1 | 4/2005 | Burnham |
| 6,884,851 B2 | 4/2005 | Gauthy |
| 6,908,651 B2 | 6/2005 | Watanabe |
| 6,921,571 B2 | 7/2005 | Funakoshi |
| 6,926,507 B2 | 8/2005 | Cardona |
| 6,926,512 B2 | 8/2005 | Wu |
| 6,982,107 B1 | 1/2006 | Hennen |
| 6,986,922 B2 | 1/2006 | Hesse |
| 7,014,801 B2 | 3/2006 | Imanari |
| 7,056,563 B2 | 6/2006 | Halabisky |
| 7,070,852 B1 | 7/2006 | Reiners |
| 7,074,466 B2 | 7/2006 | Debraal |
| 7,094,463 B2 | 8/2006 | Haas |
| 7,121,991 B2 | 10/2006 | Mannlein |
| 7,144,532 B2 | 12/2006 | Kim |
| 7,169,338 B2 | 1/2007 | Imanari |
| 7,173,069 B2 | 2/2007 | Swennen |
| 7,183,005 B2 | 2/2007 | Poloso |
| 7,234,629 B2 | 6/2007 | Ho |
| 7,281,650 B1 | 10/2007 | Milan |
| 7,311,243 B1 | 12/2007 | Konzal |
| 7,355,089 B2 | 4/2008 | Chang |
| 7,361,720 B2 | 4/2008 | Pierini |
| 7,365,136 B2 | 4/2008 | Huovinen |
| 7,423,071 B2 | 9/2008 | Mogami |
| 7,458,504 B2 | 12/2008 | Robertson |
| 7,462,307 B2 | 12/2008 | Hesse |
| 7,504,347 B2 | 3/2009 | Poon |
| 7,510,098 B2 | 3/2009 | Hartjes |
| 7,513,386 B2 | 4/2009 | Hartjes |
| 7,514,517 B2 | 4/2009 | Hoenig |
| 7,524,911 B2 | 4/2009 | Karjala |
| 7,546,932 B2 | 6/2009 | Smith |
| 7,557,147 B2 | 7/2009 | Martinez |
| 7,579,408 B2 | 8/2009 | Walton |
| 7,582,716 B2 | 9/2009 | Liang |
| 7,585,557 B2 | 9/2009 | Aylward |
| 7,588,808 B2 | 9/2009 | Hutchinson |
| 7,588,810 B2 | 9/2009 | Semersky |
| 7,592,397 B2 | 9/2009 | Markovich |
| 7,608,668 B2 | 10/2009 | Shan |
| 7,622,179 B2 | 11/2009 | Patel |
| 7,622,529 B2 | 11/2009 | Walton |
| 7,629,416 B2 | 12/2009 | Li |
| 7,655,296 B2 | 2/2010 | Haas |
| 7,662,881 B2 | 2/2010 | Walton |
| 7,666,918 B2 | 2/2010 | Prieto |
| 7,671,106 B2 | 3/2010 | Markovich |
| 7,671,131 B2 | 3/2010 | Hughes |
| 7,673,564 B2 | 3/2010 | Wolf |
| 7,687,442 B2 | 3/2010 | Walton |
| 7,695,812 B2 | 4/2010 | Peng |
| 7,704,440 B2 | 4/2010 | Brandner |
| 7,714,071 B2 | 5/2010 | Hoenig |
| 7,732,052 B2 | 6/2010 | Chang |
| 7,737,061 B2 | 6/2010 | Chang |
| 7,737,215 B2 | 6/2010 | Chang |
| 7,741,397 B2 | 6/2010 | Liang |
| 7,754,814 B2 | 7/2010 | Barcus |
| 7,759,267 B2 | 7/2010 | Conover |
| 7,759,404 B2 | 7/2010 | Burgun |
| 7,786,216 B2 | 8/2010 | Soediono |
| 7,795,321 B2 | 9/2010 | Cheung |
| 7,803,728 B2 | 9/2010 | Poon |
| 7,811,644 B2 | 10/2010 | Debraal |
| 7,818,866 B2 | 10/2010 | Hollis |
| 7,820,282 B2 | 10/2010 | Haas |
| 7,825,166 B2 | 11/2010 | Sasaki |
| 7,841,974 B2 | 11/2010 | Hartjes |
| 7,842,770 B2 | 11/2010 | Liang |
| 7,858,706 B2 | 12/2010 | Arriola |
| 7,863,379 B2 | 1/2011 | Kapur |
| 7,871,558 B2 | 1/2011 | Merical |
| 7,883,769 B2 | 2/2011 | Seth |
| 7,893,166 B2 | 2/2011 | Shan |
| 7,897,689 B2 | 3/2011 | Harris |
| 7,906,587 B2 | 3/2011 | Poon |
| 7,910,658 B2 | 3/2011 | Chang |
| 7,915,192 B2 | 3/2011 | Arriola |
| 7,918,005 B2 | 4/2011 | Hollis |
| 7,918,016 B2 | 4/2011 | Hollis |
| 7,922,071 B2 | 4/2011 | Robertson |
| 7,928,162 B2 | 4/2011 | Kiss |
| 7,935,740 B2 | 5/2011 | Dang |
| 7,947,367 B2 | 5/2011 | Poon |
| 7,951,882 B2 | 5/2011 | Arriola |
| 7,973,100 B2 | 7/2011 | Wada |
| 7,977,397 B2 | 7/2011 | Cheung |
| 7,989,543 B2 | 8/2011 | Karjala |
| 7,993,254 B2 | 8/2011 | Robertson |
| 7,998,579 B2 | 8/2011 | Lin |
| 7,998,728 B2 | 8/2011 | Rhoads |
| 8,003,176 B2 | 8/2011 | Ylitalo |
| 8,003,744 B2 | 8/2011 | Okamoto |
| 8,012,550 B2 | 9/2011 | Ylitalo |
| 8,026,291 B2 | 9/2011 | Handa |
| 8,043,695 B2 | 10/2011 | Ballard |
| 8,061,540 B2 | 11/2011 | Toyoda |
| 8,061,541 B2 | 11/2011 | Trumpp |
| 8,067,319 B2 | 11/2011 | Poon |
| 8,076,381 B2 | 12/2011 | Miyagawa |
| 8,076,416 B2 | 12/2011 | Ellul |
| 8,084,537 B2 | 12/2011 | Walton |
| 8,087,147 B2 | 1/2012 | Hollis |
| 8,105,459 B2 | 1/2012 | Alvarez |
| 8,119,237 B2 | 2/2012 | Peng |
| 8,124,203 B2 | 2/2012 | Semersky |
| 8,124,234 B2 | 2/2012 | Weaver |
| 8,137,600 B2 | 3/2012 | Pierick |
| 8,173,233 B2 | 5/2012 | Rogers |
| 8,198,374 B2 | 6/2012 | Arriola |
| 8,211,982 B2 | 7/2012 | Harris |
| 8,227,075 B2 | 7/2012 | Matsushita |
| 8,263,198 B2 | 9/2012 | Carvell |
| 8,273,068 B2 | 9/2012 | Chang |
| 8,273,826 B2 | 9/2012 | Walton |
| 8,273,838 B2 | 9/2012 | Shan |
| 8,288,470 B2 | 10/2012 | Ansems |
| 8,304,496 B2 | 11/2012 | Weaver |
| 8,342,420 B2 | 1/2013 | RobertsJr |
| 8,397,932 B2 | 3/2013 | Ichikawa |
| 8,404,780 B2 | 3/2013 | Weaver |
| 8,414,823 B2 | 4/2013 | Rudiger |
| 8,435,615 B2 | 5/2013 | Tsuchida |
| 8,444,905 B2 | 5/2013 | Li |
| 8,535,598 B2 | 9/2013 | Imanari |
| 8,679,620 B2 | 3/2014 | Matsushita |
| 8,715,449 B2 | 5/2014 | Leser |
| 8,721,823 B2 | 5/2014 | Vaideeswaran |
| 8,795,827 B2 | 8/2014 | Siche |
| 8,883,280 B2 | 11/2014 | Leser |
| 9,067,705 B2 | 6/2015 | Leser |
| 9,102,461 B2 | 8/2015 | Leser |
| 9,180,995 B2 | 11/2015 | Iyori |
| 9,346,605 B2 | 5/2016 | Leser |
| 9,358,772 B2 | 6/2016 | Leser |
| 9,447,248 B2 | 9/2016 | Sun |
| 9,688,456 B2 | 6/2017 | Euler |
| 9,758,292 B2 | 9/2017 | Leser |
| 9,758,293 B2 | 9/2017 | Leser |
| 9,937,652 B2 | 4/2018 | Sun |
| 9,993,098 B2 | 6/2018 | Leser |
| 10,011,696 B2 | 7/2018 | Leser |
| 10,059,037 B2 | 8/2018 | Li |
| 10,266,664 B2 | 4/2019 | Sun |
| 10,899,532 B2 | 1/2021 | Leser |
| 10,906,725 B2 | 2/2021 | Leser |
| 11,091,311 B2 | 8/2021 | Euler |
| 11,214,429 B2 | 1/2022 | Euler |

(56) References Cited

U.S. PATENT DOCUMENTS

| | | |
|---|---|---|
| 2001/0010848 A1 | 8/2001 | Usui |
| 2001/0010849 A1 | 8/2001 | Blizard |
| 2001/0036520 A1 | 11/2001 | Hall |
| 2001/0038893 A1 | 11/2001 | Mohan |
| 2001/0039299 A1 | 11/2001 | Park |
| 2001/0041236 A1 | 11/2001 | Usui |
| 2001/0048988 A1 | 12/2001 | Forte |
| 2002/0006975 A1 | 1/2002 | Welsh |
| 2002/0030296 A1 | 3/2002 | Geddes |
| 2002/0035164 A1 | 3/2002 | Wu |
| 2002/0041046 A1 | 4/2002 | Hartjes |
| 2002/0058126 A1 | 5/2002 | Kannankeril |
| 2002/0122905 A1 | 9/2002 | Andersson |
| 2002/0135088 A1 | 9/2002 | Harfmann |
| 2002/0137851 A1 | 9/2002 | Kim |
| 2002/0144769 A1 | 10/2002 | Debraal |
| 2002/0172739 A1 | 11/2002 | Anderson |
| 2002/0172818 A1 | 11/2002 | Debraal |
| 2003/0003251 A1 | 1/2003 | Debraal |
| 2003/0017284 A1 | 1/2003 | Watanabe |
| 2003/0021921 A1 | 1/2003 | Debraal |
| 2003/0021927 A1 | 1/2003 | Boenig |
| 2003/0029876 A1 | 2/2003 | Giraud |
| 2003/0065097 A1 | 4/2003 | DeGroot |
| 2003/0069362 A1 | 4/2003 | Ramanathan |
| 2003/0108695 A1 | 6/2003 | Freek |
| 2003/0114594 A1 | 6/2003 | Starita |
| 2003/0127765 A1 | 7/2003 | Weiland |
| 2003/0138515 A1 | 7/2003 | Harfmann |
| 2003/0151172 A1 | 8/2003 | Floyd |
| 2003/0186039 A1 | 10/2003 | Hanada |
| 2003/0211310 A1 | 11/2003 | Haas |
| 2003/0211350 A1 | 11/2003 | Migliorini |
| 2003/0228336 A1 | 12/2003 | Gervasio |
| 2003/0232210 A1 | 12/2003 | Haas |
| 2004/0013830 A1 | 1/2004 | Nonomura |
| 2004/0031714 A1 | 2/2004 | Hanson |
| 2004/0037980 A1 | 2/2004 | Debraal |
| 2004/0038018 A1 | 2/2004 | Anderson |
| 2004/0062885 A1 | 4/2004 | Imanari |
| 2004/0086703 A1 | 5/2004 | Semersky |
| 2004/0115418 A1 | 6/2004 | Anderson |
| 2004/0147625 A1 | 7/2004 | Dostal |
| 2004/0162358 A1 | 8/2004 | Yamamoto |
| 2004/0162363 A1 | 8/2004 | Mochizuki |
| 2004/0170814 A1 | 9/2004 | Vanhandel |
| 2005/0003122 A1 | 1/2005 | Debraal |
| 2005/0006449 A1 | 1/2005 | Damato |
| 2005/0009973 A1 | 1/2005 | Lee |
| 2005/0040218 A1 | 2/2005 | Hinchey |
| 2005/0101926 A1 | 5/2005 | Ausen |
| 2005/0104365 A1 | 5/2005 | Haas |
| 2005/0115975 A1 | 6/2005 | Smith |
| 2005/0121457 A1 | 6/2005 | Wilson |
| 2005/0124709 A1 | 6/2005 | Krueger |
| 2005/0145317 A1 | 7/2005 | Yamamoto |
| 2005/0147807 A1 | 7/2005 | Haas |
| 2005/0159496 A1 | 7/2005 | Bambara |
| 2005/0165165 A1 | 7/2005 | Zwynenburg |
| 2005/0184136 A1 | 8/2005 | Baynum |
| 2005/0236294 A1 | 10/2005 | Herbert |
| 2005/0256215 A1 | 11/2005 | Burnham |
| 2005/0272858 A1 | 12/2005 | Pierini |
| 2005/0288383 A1 | 12/2005 | Haas |
| 2006/0000882 A1 | 1/2006 | Darzinskas |
| 2006/0073298 A1 | 4/2006 | Hutchinson |
| 2006/0091576 A1 | 5/2006 | Takase |
| 2006/0094577 A1 | 5/2006 | Mannlein |
| 2006/0095151 A1 | 5/2006 | Mannlein |
| 2006/0100296 A1 | 5/2006 | Wilkes |
| 2006/0108409 A1 | 5/2006 | Pyper |
| 2006/0135679 A1 | 6/2006 | Winowiecki |
| 2006/0135699 A1 | 6/2006 | Li |
| 2006/0142495 A1 | 6/2006 | Lalho |
| 2006/0148920 A1 | 7/2006 | Musgrave |
| 2006/0151584 A1 | 7/2006 | Wonnacott |
| 2006/0178478 A1 | 8/2006 | Ellul |
| 2006/0198983 A1 | 9/2006 | Patel |
| 2006/0199006 A1 | 9/2006 | Poon |
| 2006/0199030 A1 | 9/2006 | Liang |
| 2006/0199744 A1 | 9/2006 | Walton |
| 2006/0199872 A1 | 9/2006 | Prieto |
| 2006/0199884 A1 | 9/2006 | Hoenig |
| 2006/0199887 A1 | 9/2006 | Liang |
| 2006/0199896 A1 | 9/2006 | Walton |
| 2006/0199897 A1 | 9/2006 | Karjala |
| 2006/0199905 A1 | 9/2006 | Hughes |
| 2006/0199906 A1 | 9/2006 | Walton |
| 2006/0199907 A1 | 9/2006 | Chang |
| 2006/0199908 A1 | 9/2006 | Cheung |
| 2006/0199910 A1 | 9/2006 | Walton |
| 2006/0199911 A1 | 9/2006 | Markovich |
| 2006/0199912 A1 | 9/2006 | Fuchs |
| 2006/0199914 A1 | 9/2006 | Harris |
| 2006/0199930 A1 | 9/2006 | Shan |
| 2006/0199931 A1 | 9/2006 | Poon |
| 2006/0199933 A1 | 9/2006 | Okamoto |
| 2006/0205833 A1 | 9/2006 | Martinez |
| 2006/0211819 A1 | 9/2006 | Hoenig |
| 2006/0234033 A1 | 10/2006 | Nishikawa |
| 2006/0255049 A1 | 11/2006 | McCarthy |
| 2006/0286325 A1 | 12/2006 | Swoboda |
| 2006/0289609 A1 | 12/2006 | Fritz |
| 2006/0289610 A1 | 12/2006 | Kling |
| 2007/0000983 A1 | 1/2007 | Spurrell |
| 2007/0010616 A1 | 1/2007 | Kapur |
| 2007/0013110 A1 | 1/2007 | Safian |
| 2007/0032600 A1 | 2/2007 | Mogami |
| 2007/0056964 A1 | 3/2007 | Holcomb |
| 2007/0065615 A1 | 3/2007 | Odle |
| 2007/0066756 A1 | 3/2007 | Poon |
| 2007/0078222 A1 | 4/2007 | Chang |
| 2007/0095837 A1 | 5/2007 | Meier |
| 2007/0112127 A1 | 5/2007 | Soediono |
| 2007/0141188 A1 | 6/2007 | Kim |
| 2007/0155900 A1 | 7/2007 | Chang |
| 2007/0167315 A1 | 7/2007 | Arriola |
| 2007/0167575 A1 | 7/2007 | Weaver |
| 2007/0167578 A1 | 7/2007 | Arriola |
| 2007/0202330 A1 | 8/2007 | Peng |
| 2007/0219334 A1 | 9/2007 | Lipishan |
| 2008/0020162 A1 | 1/2008 | Fackler |
| 2008/0044617 A1 | 2/2008 | Schmitz |
| 2008/0045638 A1 | 2/2008 | Chapman |
| 2008/0095960 A1 | 4/2008 | Schell |
| 2008/0114131 A1 | 5/2008 | Harris |
| 2008/0118738 A1 | 5/2008 | Boyer |
| 2008/0121681 A1 | 5/2008 | Wiedmeyer |
| 2008/0125547 A1 | 5/2008 | Swogger |
| 2008/0138593 A1 | 6/2008 | Martinez |
| 2008/0156857 A1 | 7/2008 | Johnston |
| 2008/0177242 A1 | 7/2008 | Chang |
| 2008/0185301 A1 | 8/2008 | Merical |
| 2008/0187694 A1 | 8/2008 | Alvarez |
| 2008/0227877 A1 | 9/2008 | Stadlbauer |
| 2008/0234435 A1 | 9/2008 | Chang |
| 2008/0246193 A1 | 10/2008 | Smits |
| 2008/0260996 A1 | 10/2008 | Heilman |
| 2008/0261016 A1 | 10/2008 | Tamada |
| 2008/0269388 A1 | 10/2008 | Markovich |
| 2008/0280517 A1 | 11/2008 | Chang |
| 2008/0281037 A1 | 11/2008 | Karjala |
| 2008/0302800 A1 | 12/2008 | Chou |
| 2008/0311812 A1 | 12/2008 | Arriola |
| 2009/0041965 A1 | 2/2009 | Kochem |
| 2009/0042472 A1 | 2/2009 | Poon |
| 2009/0068402 A1 | 3/2009 | Yoshida |
| 2009/0069523 A1 | 3/2009 | Itakura |
| 2009/0076216 A1 | 3/2009 | Kiss |
| 2009/0096130 A1 | 4/2009 | Jones |
| 2009/0105417 A1 | 4/2009 | Walton |
| 2009/0110855 A1 | 4/2009 | McCarthy |
| 2009/0110944 A1 | 4/2009 | Aguirre |
| 2009/0170679 A1 | 7/2009 | Hartjes |

(56) References Cited

U.S. PATENT DOCUMENTS

| | | |
|---|---|---|
| 2009/0220711 A1 | 9/2009 | Chang |
| 2009/0247033 A1 | 10/2009 | Peng |
| 2009/0263645 A1 | 10/2009 | Barger |
| 2009/0269566 A1 | 10/2009 | Eichbauer |
| 2009/0275690 A1 | 11/2009 | Weaver |
| 2009/0324914 A1 | 12/2009 | Lieng |
| 2010/0000183 A1 | 1/2010 | Nantin |
| 2010/0025073 A1 | 2/2010 | Fagrell |
| 2010/0028568 A1 | 2/2010 | Weaver |
| 2010/0029827 A1 | 2/2010 | Ansems |
| 2010/0040818 A1 | 2/2010 | Farha |
| 2010/0055358 A1 | 3/2010 | Weaver |
| 2010/0069574 A1 | 3/2010 | Shan |
| 2010/0093942 A1 | 4/2010 | Silvis |
| 2010/0108695 A1 | 5/2010 | Zhang |
| 2010/0112247 A1 | 5/2010 | Jari |
| 2010/0116422 A1 | 5/2010 | Vaideeswaran |
| 2010/0137118 A1 | 6/2010 | Chang |
| 2010/0147447 A1 | 6/2010 | Mazzarolo |
| 2010/0168267 A1 | 7/2010 | Dang |
| 2010/0181328 A1 | 7/2010 | Cook |
| 2010/0181370 A1 | 7/2010 | Berbert |
| 2010/0196610 A1 | 8/2010 | Chang |
| 2010/0196641 A1 | 8/2010 | DeVos |
| 2010/0215879 A1 | 8/2010 | Dooley |
| 2010/0215934 A1 | 8/2010 | Fabian Mariezkurrena |
| 2010/0227092 A1 | 9/2010 | Semersky |
| 2010/0240818 A1 | 9/2010 | Walton |
| 2010/0247830 A1 | 9/2010 | Hernandez |
| 2010/0279046 A1 | 11/2010 | Ashman |
| 2010/0279571 A1 | 11/2010 | Poon |
| 2010/0282759 A1 | 11/2010 | Eckhardt |
| 2010/0324202 A1 | 12/2010 | Bafna |
| 2011/0003929 A1 | 1/2011 | Soediono |
| 2011/0008570 A1 | 1/2011 | Seth |
| 2011/0009513 A1 | 1/2011 | Chaudhary |
| 2011/0014835 A1 | 1/2011 | Sieradzki |
| 2011/0091688 A1 | 4/2011 | Maurer |
| 2011/0104414 A1 | 5/2011 | Onodera |
| 2011/0111150 A1 | 5/2011 | Matsuzaki |
| 2011/0118370 A1 | 5/2011 | Jiang |
| 2011/0118416 A1 | 5/2011 | Arriola |
| 2011/0124818 A1 | 5/2011 | Arriola |
| 2011/0129656 A1 | 6/2011 | Zur |
| 2011/0136959 A1 | 6/2011 | Brandstetter |
| 2011/0144240 A1 | 6/2011 | Harris |
| 2011/0172363 A1 | 7/2011 | Share |
| 2011/0180509 A1 | 7/2011 | Hutchinson |
| 2011/0192750 A1 | 8/2011 | Kokin |
| 2011/0217492 A1 | 9/2011 | Stamatiou |
| 2011/0229693 A1 | 9/2011 | Maurer |
| 2011/0230108 A1 | 9/2011 | Arriola |
| 2011/0250384 A1 | 10/2011 | Sumi |
| 2011/0285048 A1 | 11/2011 | Barger |
| 2011/0293914 A1 | 12/2011 | Maurer |
| 2011/0318560 A1 | 12/2011 | Yun |
| 2012/0004087 A1 | 1/2012 | Tharayil |
| 2012/0024459 A1 | 2/2012 | Igarashi |
| 2012/0024873 A1 | 2/2012 | Roseblade |
| 2012/0028065 A1 | 2/2012 | Bafna |
| 2012/0041148 A1 | 2/2012 | Bafna |
| 2012/0043374 A1 | 2/2012 | Lemon |
| 2012/0045603 A1 | 2/2012 | Zerafati |
| 2012/0061886 A1 | 3/2012 | Sumi |
| 2012/0076965 A1 | 3/2012 | Silvers |
| 2012/0103858 A1 | 5/2012 | Schmidt |
| 2012/0108714 A1 | 5/2012 | Wittner |
| 2012/0108741 A1 | 5/2012 | Wu |
| 2012/0108743 A1 | 5/2012 | Krishnaswamy |
| 2012/0125926 A1 | 5/2012 | Iyori |
| 2012/0132699 A1 | 5/2012 | Mann |
| 2012/0178896 A1 | 7/2012 | Bastioli |
| 2012/0184657 A1 | 7/2012 | Lake |
| 2012/0193365 A1 | 8/2012 | Humphries |
| 2012/0199278 A1 | 8/2012 | Lee |
| 2012/0199279 A1 | 8/2012 | Lee |
| 2012/0199641 A1 | 8/2012 | Hsieh |
| 2012/0214890 A1 | 8/2012 | Senda |
| 2012/0220730 A1 | 8/2012 | Li |
| 2012/0225961 A1 | 9/2012 | Vanhorn |
| 2012/0237734 A1 | 9/2012 | Maurer |
| 2012/0267368 A1 | 10/2012 | Wu |
| 2012/0270039 A1 | 10/2012 | Tynys |
| 2012/0295994 A1 | 11/2012 | Bernreitner |
| 2012/0318805 A1 | 12/2012 | Leser |
| 2012/0318807 A1 | 12/2012 | Leser |
| 2012/0318859 A1 | 12/2012 | Leser |
| 2013/0023598 A1 | 1/2013 | Song |
| 2013/0026128 A1 | 1/2013 | Beck |
| 2013/0032963 A1 | 2/2013 | Tokiwa |
| 2013/0052358 A1 | 2/2013 | Alessandro |
| 2013/0052385 A1* | 2/2013 | Leser ............... C08J 9/06 220/660 |
| 2013/0059102 A1 | 3/2013 | Torchio |
| 2013/0085244 A1 | 4/2013 | Zhao |
| 2013/0140320 A1 | 6/2013 | Nadella |
| 2013/0143975 A1 | 6/2013 | Cassidy |
| 2013/0216744 A1 | 8/2013 | Liao |
| 2013/0280517 A1 | 10/2013 | Buehring |
| 2013/0303645 A1 | 11/2013 | Dix |
| 2014/0037880 A1 | 2/2014 | Siddhamalli |
| 2014/0116977 A1 | 5/2014 | Minnette |
| 2014/0131430 A1 | 5/2014 | Leser |
| 2014/0166738 A1 | 6/2014 | Euler |
| 2014/0167311 A1 | 6/2014 | Leser |
| 2014/0228498 A1 | 8/2014 | Prince |
| 2014/0262916 A1 | 9/2014 | Minnette |
| 2014/0263367 A1 | 9/2014 | Robertson |
| 2014/0272229 A1 | 9/2014 | Xing |
| 2014/0309320 A1 | 10/2014 | Prince |
| 2014/0361013 A1 | 12/2014 | Perick |
| 2014/0377512 A1 | 12/2014 | Rogers |
| 2015/0014879 A1 | 1/2015 | Sun |
| 2015/0051302 A1 | 2/2015 | Leser |
| 2015/0061194 A1 | 3/2015 | Sun |
| 2015/0250342 A1 | 9/2015 | Euler |
| 2015/0258771 A1 | 9/2015 | Leser |
| 2015/0284521 A1 | 10/2015 | Abubakar |
| 2015/0307679 A1 | 10/2015 | Lee |
| 2016/0082692 A1 | 3/2016 | Li |
| 2016/0082693 A1 | 3/2016 | Li |
| 2016/0089852 A1 | 3/2016 | Lindenfelzer |
| 2016/0137804 A1 | 5/2016 | Van Der Ven |
| 2016/0257030 A1 | 9/2016 | Sun |
| 2016/0257052 A1 | 9/2016 | Sun |
| 2016/0257799 A1 | 9/2016 | Sun |
| 2016/0355659 A1 | 12/2016 | Sun |
| 2017/0002117 A1 | 1/2017 | Layman |
| 2017/0174865 A1 | 6/2017 | Dhaliwal |
| 2017/0232715 A1 | 8/2017 | Fehr |
| 2018/0099798 A1 | 4/2018 | Lehrter |
| 2018/0201752 A1 | 7/2018 | Lin |
| 2018/0354237 A1 | 12/2018 | De Jonge |
| 2019/0045954 A1 | 2/2019 | Euler |
| 2019/0047265 A1 | 2/2019 | Euler |
| 2020/0361184 A1 | 11/2020 | Saniei |

FOREIGN PATENT DOCUMENTS

| | | |
|---|---|---|
| CA | 2078123 | 9/1991 |
| CA | 2291607 A1 | 6/2000 |
| CA | 2765489 | 12/2010 |
| CA | 2752335 | 3/2012 |
| CN | 1118239 A | 3/1996 |
| CN | 1288427 | 3/2001 |
| CN | 1484602 | 3/2004 |
| CN | 1495100 | 5/2004 |
| CN | 1523051 | 8/2004 |
| CN | 1942370 | 4/2007 |
| CN | 1984763 | 6/2007 |
| CN | 101044195 | 9/2007 |
| CN | 101098918 A | 1/2008 |
| CN | 101104716 | 1/2008 |
| CN | 101352923 | 1/2009 |

(56) References Cited

FOREIGN PATENT DOCUMENTS

| | | |
|---|---|---|
| CN | 101370873 | 2/2009 |
| CN | 101429309 | 5/2009 |
| CN | 101456927 A | 6/2009 |
| CN | 101531260 | 9/2009 |
| CN | 101538387 | 9/2009 |
| CN | 101560307 | 10/2009 |
| CN | 201347706 Y | 11/2009 |
| CN | 102030960 | 4/2011 |
| CN | 102070841 A | 5/2011 |
| CN | 102089370 | 6/2011 |
| CN | 102115561 A | 7/2011 |
| CN | 102245368 | 11/2011 |
| CN | 102313084 | 1/2012 |
| CN | 102391570 | 3/2012 |
| CN | 102762350 | 10/2012 |
| CN | 102892678 A | 1/2013 |
| DE | 2831240 | 1/1980 |
| DE | 2831240 C | 3/1988 |
| DE | 102006025612 A1 | 11/2007 |
| DE | 102008031812 | 12/2009 |
| EP | 0001791 | 5/1979 |
| EP | 0086869 A1 | 8/1983 |
| EP | 0161597 | 11/1985 |
| EP | 0318167 A2 | 5/1989 |
| EP | 0329490 A2 | 8/1989 |
| EP | 0520028 | 12/1992 |
| EP | 0570221 | 11/1993 |
| EP | 0588321 | 3/1994 |
| EP | 0659647 | 6/1995 |
| EP | 713481 A1 | 5/1996 |
| EP | 0851805 A1 | 7/1998 |
| EP | 0879844 | 11/1998 |
| EP | 0851805 B1 | 12/1998 |
| EP | 960826 A2 | 1/1999 |
| EP | 0972727 | 1/2000 |
| EP | 1040158 A1 | 10/2000 |
| EP | 1057608 A2 | 12/2000 |
| EP | 1072389 A1 | 1/2001 |
| EP | 0796199 | 2/2001 |
| EP | 1057608 | 4/2002 |
| EP | 0940240 | 10/2002 |
| EP | 1308263 A2 | 5/2003 |
| EP | 1323779 | 7/2003 |
| EP | 1449634 A1 | 8/2004 |
| EP | 1479716 | 11/2004 |
| EP | 1472087 | 4/2006 |
| EP | 1666530 | 6/2006 |
| EP | 1704047 | 9/2006 |
| EP | 1741744 | 1/2007 |
| EP | 1749634 A2 | 2/2007 |
| EP | 1754744 | 2/2007 |
| EP | 1921023 A1 | 5/2008 |
| EP | 1939099 A1 | 7/2008 |
| EP | 0851805 | 12/2008 |
| EP | 2141000 A2 | 1/2010 |
| EP | 2266894 | 12/2010 |
| EP | 2386584 A1 | 11/2011 |
| EP | 2386601 | 11/2011 |
| EP | 1040158 | 4/2012 |
| EP | 1749635 | 9/2012 |
| EP | 2323829 | 10/2012 |
| EP | 2554374 A1 | 2/2013 |
| EP | 2141000 | 2/2014 |
| EP | 2720954 | 4/2014 |
| EP | 2912142 A4 | 3/2016 |
| GB | 1078326 | 8/1967 |
| GB | 2322100 | 8/1998 |
| GB | 2485077 A | 5/2012 |
| GB | 2504166 A | 1/2014 |
| GB | 2506796 A | 4/2014 |
| JP | 52123043 U | 10/1977 |
| JP | S5641146 A | 4/1981 |
| JP | 58029618 | 2/1983 |
| JP | H02129040 U | 5/1990 |
| JP | H02269683 | 11/1990 |
| JP | 4278340 | 10/1992 |
| JP | 4278340 A | 10/1992 |
| JP | 404278340 A | 10/1992 |
| JP | H0543967 | 2/1993 |
| JP | 0615751 | 1/1994 |
| JP | 06192460 | 7/1994 |
| JP | H06322167 A | 11/1994 |
| JP | H08067758 | 3/1996 |
| JP | 410000748 A | 1/1998 |
| JP | 2001139717 A | 5/1999 |
| JP | 2000128255 | 5/2000 |
| JP | P310847 | 12/2000 |
| JP | 2001138378 A | 5/2001 |
| JP | 2001310429 | 11/2001 |
| JP | 2001315277 | 11/2001 |
| JP | 2001329099 A | 11/2001 |
| JP | 2001348454 A | 12/2001 |
| JP | 2003292663 | 10/2003 |
| JP | 2003321566 | 11/2003 |
| JP | 200418101 | 1/2004 |
| JP | 2004018101 | 1/2004 |
| JP | 2004067820 A | 3/2004 |
| JP | 2004137377 A | 5/2004 |
| JP | 2004168421 A | 6/2004 |
| JP | 2004330464 | 11/2004 |
| JP | 2005053494 A * | 3/2005 |
| JP | 2005138508 A | 6/2005 |
| JP | 2005272542 | 10/2005 |
| JP | 2005290329 A | 10/2005 |
| JP | 2006008988 A | 1/2006 |
| JP | 2006096390 | 4/2006 |
| JP | 2006130814 A | 5/2006 |
| JP | 2006142008 A | 6/2006 |
| JP | 200791323 | 4/2007 |
| JP | 2007154172 | 6/2007 |
| JP | 3140847 | 4/2008 |
| JP | 2008162700 | 7/2008 |
| JP | 2008213491 A | 9/2008 |
| JP | 2009504858 | 2/2009 |
| JP | 2009066856 A | 4/2009 |
| JP | 2009126922 | 6/2009 |
| JP | 2009138029 | 6/2009 |
| JP | 2009190756 A | 8/2009 |
| JP | 2010173258 | 8/2010 |
| JP | 2011104890 | 6/2011 |
| JP | 2011132420 A | 7/2011 |
| JP | 2011207958 A | 10/2011 |
| JP | 2011212968 A | 10/2011 |
| JP | 2012526006 | 10/2012 |
| JP | 2013203886 | 10/2013 |
| JP | 2018002213 A | 1/2018 |
| KR | 100306320 | 10/2001 |
| KR | 2003036558 | 5/2003 |
| KR | 2004017234 | 2/2004 |
| KR | 101196666 | 11/2012 |
| MX | 2004008491 A | 7/2005 |
| MX | 347519 | 4/2014 |
| RU | 2232781 C2 | 7/2004 |
| RU | 2254347 C2 | 6/2005 |
| TW | 393427 | 6/2000 |
| TW | 200404848 | 4/2004 |
| TW | M362648 | 8/2009 |
| TW | 201021747 A | 6/2010 |
| TW | 201309757 | 3/2013 |
| WO | 1991013933 | 9/1991 |
| WO | 9413460 | 6/1994 |
| WO | 1994013460 A1 | 6/1994 |
| WO | 9504709 | 2/1995 |
| WO | 9729150 A1 | 8/1997 |
| WO | 1998016575 | 4/1998 |
| WO | WO-9932544 A1 * | 7/1999 ............ B29C 44/08 |
| WO | 0002800 | 1/2000 |
| WO | 0119733 | 3/2001 |
| WO | 0132758 | 5/2001 |
| WO | 0140374 A2 | 6/2001 |
| WO | 0153079 | 7/2001 |
| WO | 0170859 A2 | 9/2001 |
| WO | 0234824 | 5/2002 |
| WO | 2003066320 | 8/2003 |

(56) References Cited

FOREIGN PATENT DOCUMENTS

| | | |
|---|---|---|
| WO | 03076497 | 9/2003 |
| WO | 03099913 | 12/2003 |
| WO | 2004104075 | 12/2004 |
| WO | 2005097878 | 10/2005 |
| WO | 2006042908 | 4/2006 |
| WO | 2006124369 | 11/2006 |
| WO | 2007003523 A1 | 1/2007 |
| WO | 2007020074 | 2/2007 |
| WO | 2007068766 | 6/2007 |
| WO | 2007090845 A2 | 8/2007 |
| WO | 2008030953 | 3/2008 |
| WO | 2008038750 | 4/2008 |
| WO | 2008045944 | 4/2008 |
| WO | 2008057878 | 5/2008 |
| WO | 2008080111 | 7/2008 |
| WO | 2008145267 | 12/2008 |
| WO | 2009035580 | 3/2009 |
| WO | 2010006272 | 1/2010 |
| WO | 2010015673 | 2/2010 |
| WO | 2010019146 | 2/2010 |
| WO | 2010076701 A1 | 7/2010 |
| WO | 2010111869 | 10/2010 |
| WO | 2010151724 | 12/2010 |
| WO | 2011005856 | 1/2011 |
| WO | 2011036272 A2 | 3/2011 |
| WO | 2011038081 A1 | 3/2011 |
| WO | 2011076637 | 6/2011 |
| WO | 2011141044 | 11/2011 |
| WO | 2011144705 | 11/2011 |
| WO | 2012020106 A1 | 2/2012 |
| WO | 2012025584 A1 | 3/2012 |
| WO | 2012044730 | 4/2012 |
| WO | 2012055797 | 5/2012 |
| WO | 2012099682 | 7/2012 |
| WO | 2012173873 | 12/2012 |
| WO | 2012174422 | 12/2012 |
| WO | 2012174567 | 12/2012 |
| WO | 2012174567 A1 | 12/2012 |
| WO | 2012174567 A2 | 12/2012 |
| WO | 2012174568 | 12/2012 |
| WO | 2012174568 A2 | 12/2012 |
| WO | 2013032552 | 3/2013 |
| WO | 2012174567 A3 | 4/2013 |
| WO | 2013101301 | 7/2013 |
| WO | 20140066761 | 5/2014 |
| WO | 2014099335 | 6/2014 |
| WO | 2015024018 | 2/2015 |

OTHER PUBLICATIONS

Office Action (Non-Final Rejection) dated Jun. 20, 2023 for U.S. Appl. No. 17/410,386 , BP-527 US-U I (pp. 1-18).
Second Mexican Office action for Mexican Patent App. No. MX/a/2016/002374 dated Aug. 2, 2021, 9 pages.
Canadian Office Action for Canadian Patent App. No. 2918306 dated Jul. 28, 2021, BP-423 CA I , 3 pages.
Dow (TM) HDPE DMDA-8007 NT7 Technical Information, Dow Chemical Company, 2011. (Year: 2011).
Office Action (Non-Final Rejection) dated Jul. 11, 2022 for U.S. Appl. No. 17/410,386 (pp. 1-12).
Office Action (Final Rejection) dated Jan. 10, 2023 for U.S. Appl. No. 17/410,386, BP-527 US-U I (pp. 1-12).
Mexican Office action for Mexican Patent App. No. MX/a/2016/002374 dated Mar. 3, 2021, 7 pages.
Office Action (Final Rejection) dated May 31, 2023 for U.S. Appl. No. 17/135,048 (pp. 1-15).
Mexican Office Action for MX/a/2016/002490 dated Jun. 22, 21, BP-423 MX I , 8 pages.
Chinese Office Action for Application Serial No. 201480021009.9, dated Aug. 7, 2017 including English language summary, BP-405 CN II , 12 pages.
Chinese Office Action for Chinese App. No. 201480047976.2, BP-423 Cn I , 15 pages.
Australian First Patent Examination Report for Australian App. No. 2014311991 dated Oct. 4, 2017, BP-424 AU II , 4 pages.
Chinese Office Action for Application Serial No. 201480021009.9, dated Jan. 2, 2018 including English language summary, BP-405 CN I , 6 pages.
Chinese Office Action for Application Serial No. 201480021009.9, dated Apr. 20, 2018 including English language summary, BP-405 CN I , 6 pages.
First Substantive Examination Report for European App. No. 14768125.8 dated Mar. 21, 2019, BP-405 EP I , 6 pages.
First Examination Report for Indiana Patent App. No. 9302/DELNP/2015 dated May 6, 2019, BP-405 IN II , 7 pages.
Chinese Office Action for Chinese App. No. 20180039581.8 sent Feb. 23, 2018, BP-422 CN I , 13 pages.
Chinese Office Action for Chinese App. No. 20180039581.8 sent Jan. 14, 2019, BP-422 CN I , 10 pages.
Chinese Final Rejection for Chinese App. No. 201480047976.2, BP-423 CN II , 8 pages.
Chinese Office Action for Chinese App. No. 201480047978.1, BP-425 CN I , 11 pages.
Chinese Office Action for Chinese App. No. 20180042446.9 sent on Feb. 3, 2018, BP-432 CN I , 9 pages.
Chinese Office Action for Chinese App. No. 20180042446.9 sent on Oct. 31, 2018, BP-432 CN I , 5 pages.
Chinese Office Action for Chinese App. No. 201480047578.0 sent on Jan. 24, 2018, BP-424 CN II , 10 pages.
Office Action dated Apr. 16, 2018 for U.S. Appl. No. 15/061,070, BP-475 US-U I , (pp. 1-13).
Office Action dated Apr. 20, 2018 for U.S. Appl. No. 15/239,894, BP-422 US-CON1 I , (pp. 1-13).
Office Action dated Jun. 15, 2018 for U.S. Appl. No. 15/491,443, BP-432 US-U I , pp. 1-6.
Chinese Office Action for Chinese App. No. 201480047578.0 sent on Aug. 29, 2018, BP-424 CN I , 4 pages.
Office Action dated Sep. 7, 2018 for U.S. Appl. No. 15/239,894, BP422 US-CON I , (pp. 1-9).
Office Action dated Mar. 8, 2019 for U.S. Appl. No. 15/902,489, BP-473 US-CON II , (pp. 1-16).
Chinese Office Action for Chinese App. No. 20180039581.8 sent May 31, 2019, BP-422 CN I , 7 pages.
Chinese Reexamination Notification for Chinese App. No. 201480047976.2, BP-423 CN I , 12 pages.
Dingyi Hong, "Handbook of Plastic Industry: Polyolefin" Beijing Chemical Industry Press, First Edition, Mar. 1999, 17 pages, English translation included.
Office Action dated Jul. 15, 2019 for U.S. Appl. No. 15/902,489, BP-473 US-CON II , (pp. 1-24).
Office Action dated Jul. 26, 2019 for U.S. Appl. No. 16/149,351, BP-405 US-CON II , (pp. 1-6).
Office Action dated Oct. 4, 2019 for U.S. Appl. No. 15/713,799, BP-432 US-CON I , (pp. 1-5).
Indian First Examination Report for Indian Patent App. No. 2016/17003143 dated 11 Sep. 2020, BP-423 IN I , 5 pages.
First Examination Report for Indiana App. No. 201617007243 dated Dec. 16, 2019, BP-425 IN I , 6 pages.
Indian First Examination Report for Indian App. No. 201317001026, dated Mar. 20, 2020, BP-432 IN I , 6 pages.
First Examination Report for Indian App. No. 201617005271, sent Feb. 11, 2020, BP-424 IN II.
Office Action dated Jan. 6, 2020, for U.S. Appl. No. 15/902,489, BP-473 US-CON II , 22 pages.
Office Action dated Jul. 16, 2020 for U.S. Appl. No. 15/902,489, BP-473 US-CON I (pp. 1-20).
Office Action dated Aug. 31, 2020 for U.S. Appl. No. 16/356,423, BP-422 US-CON I (pp. 1-14).
Indian First Examination Report for Indian Patent App. No. 201617000386, dated Oct. 16, 2020, BP-422 IN I , 7 pages.
Canadian Office Action for Canadian Patent App. No. 2918306 dated Oct. 30, 2020, BP-423 CA II , 4 pages.
Mexican Office Action for MX/a/2016/002490 dated Oct. 22, 2020, BP-423 MX I , 7 pages.

(56) References Cited

OTHER PUBLICATIONS

First Mexican Office Action for Mexican Patent App. No. MX/a/ 2015/012702 dated Jun. 23, 2021, BP-405 MX ||, 17 pages, No English translation available.
Office Action (Final Rejection) dated Nov. 15, 2023 for U.S. Appl. No. 17/410,386, BP-527 US-U || (pp. 1-19).
English machine translation for JP2001-018943 (2001). (Year: 2001).
Office Action (Non-Final Rejection) dated Sep. 27, 2023 for U.S. Appl. No. 17/135,048 (pp. 1-13).
Jan-Erik Wegner, Affidavit regarding Hydrocerol, available at least by May 28, 2018, 22 pages.
Borealis HC600TF, 2008, 3 pages.
Borealis HC205TF, 2007, 3 pages.
Isplen codes, available at least by May 28, 2018, 1 page.
Quimica Chemicals—Isplen Polypropylene Compounds, brochure Apr. 2010, 20 pages.
Rychly, J. et al., "The effect of physical parameters of isotactic polypropylene on its oxidisability measured by chemiluminescence method. Contribution to the spreading phenomenon" Polymer Degradation and Stability, vol. 71, No. 2, 2001, 8 pages.
Tiemblo, P et al., "The autoacceleration of polypropylene thermooxidation in reduced coordinates: effect of the oxidation temperature and of polyolefin structure" Polymer Degradation and Stability, vol. 72, No. 1, 2001, 8 pages.
Bezati, F et al., "Addition of tracers into the polypropylene in view of automatic sorting of plastic wastes using X-ray fluorescence spectrometry" Waste Management, vol. 30, No. 4, May 2010, 6 pages.
Translation of CN101560307A, 19 pages.
Gotsis, A. D. et al., "The Effect of Long Chain Branching on the Processability of Polypropylene in Thermoforming" Polymer Engineering and Science, vol. 44, No. 5, May 2004, 10 pages.
"Product News" Daploy WB135HMS—High Melt Strength Polyproyplene for Foam Extrusion, 2004, 2 pages.
Naguib, Hani E. et al., "Effects of Blending of Branched and Linear Polypropylene Materials on the Foamability" Technical Papers of the Annual Technical Conference-Society of Plastics Engineers Incorporated, 2001, 8 pages.
Antunes, Marcelo et al., "Heat Transfer in Polypropylene-Based Foams Produced Using Different Foaming Processes" Advanced Engineering Materials, vol. 11, No. 1 0, May 2009, 7 pages.
ROhne Gunhild. Foaming of Soft Polyproyplene Blends. Conference Proceedings: Zlin Czech Republic, Aug. 16-18, 2000, 4 pages.
Mikell Knights, "Theres Plenty of Fizz in Foam Blow Molding" Plastics Technology, available from https:Ilwww.ptonline.com/ articles/there%27s-plenty-of-fizz-in-foam-blow-molding, 1999, 4 pages.
Crodamide brochure 02/00, 4 pages.
Tabatabaei, Seyed H et al., "Rheological and thermal properties of blends of a long-chain branched polypropylene and different linear polypropylenes" Chemical Engineering Science, vol. 64, No. 22, 2009, 13 pages.
Stange, Jens et al., "Rheological properties and foaming behavior of polypropylenes with different molecular structures" Journal of Rheology, vol. 50, No. 6, 2006, 18 pages.
Clariant, Cesa Slip, Sep. 2000, 6 pages.
Antunes, Marcelo et al., "Study of the cellular structure heterogeneity and anisotropy of polypropylene and polypropylene nanocomposite foams" Polymer Engineering and Science, vol. 49, No. 12, May 2009, 14 pages.
Office Action dated Jun. 22, 2018 for U.S. Appl. No. 15/004,263 (pp. 1-20).
Shutov, Fyodor, "Foamed Polymers. Cellular Structure and Properties", Springer Berlin Heidelberg, Industrial Developments vol. 51, Jun. 2005, p. 176-182, 8 pages.
Canadian office action for Canadian App. no. 2842325 dated Oct. 26, 2018, BP-362 CA ||, 4 pages.
First Examination Report for Indian Patent App. No. 111/DELNP/ 2014 dated Apr. 22, 2019, BP-352 IN ||, 7 pages.

First Examination Report for Indian Patent App. No. 110/DELNP/ 2014 sent on Dec. 26, 2019, BP-354 IN ||, 8 pages.
Taiwan Office Action for Taiwan App. No. 102146298 sent Oct. 26, 2016, BP-374 TW ||, 9 pages.
Canadian Examiner's Report for Canadian App. No. 2845225 dated Mar. 1, 2019, BP-356 CA ||, 3 pages.
Canadian Examiner's Report for Canadian App. No. 2845225 dated Nov. 18, 2019, BP-356 CA ||, 4 pages.
Canadian Examiner's Report for Canadian App. No. 2845225 dated Dec. 2, 2020, BP-356 CA ||, 4 pages.
Borealis Product Brochure, "DaployTM HMS Polypropylene for Foam Extrusion", 20 pages, 2010.
Canadian Examiner's Reprot for Canadian App. No. 2845225 dated Jun. 23, 2021, BP-356 CA ||, 4 pages.
Re-examination Notification for Chinese Patent App. No. 201280051426.9 received on Feb. 11, 2019, BP-356 CN ||, 19 pages.
Second Re-examination Notification for Chinese Patent App. No. 201280051426.9 received on Oct. 8, 2019, BP-356 CN ||, 21 pages.
German Office Action for German App. No. 11 2012 00 070.2 dated Oct. 20, 2020, BP-356 DE ||, 23 pages.
German Office Action for German App. No. 11 2012 00 070.2 dated Sep. 30, 2021, BP-356 DE ||, 7pages, (No English Translation Available).
Borealis: Product Data Sheet: Polypropylene DaployTM WB 140 HMS (Mar. 16, 2021), 2 pages.
English Translations of German Office Action for German App. No. 11 2012 00 070.2 dated Sep. 30, 2021, BP-356 DE ||, 6 pages.
German Office Action for German App. No. 11 2012 00 070.2 dated Dec. 23, 2022, BP-356 DE ||, 12 pages, (No English Translation Available).
Zweifel, Hans, "Plastics Additives Handbook" Carl Hanser Verlag, 2001, 6 pages.
Examination Report for GB1405600.6 dated Oct. 15, 2019, BP-356 GB ||, 4 pages.
Indian First Examination Report for Indian Pat. App. No. 2179/ DELNP/2014 date May 24, 2019, BP-356 In ||, 6 pages.
Chinese Rejection Decision for Chinese App. No. 201380065781.6 dated Jul. 12, 2018, BP-395 CN ||, 15 pages, (No English Translation available).
English Summary of Chinese Rejection Decision for Chinese App. No. 201380065781.6 dated Jul. 12, 2018, BP-395 CN ||, 4 pages.
Indian Examination Report for Indian App. No. 3919/DELNP/2015, sent Aug. 21, 2018, BP-395 IN ||, 5 pages.
Markus Gahleitner et al., "Heterophasic Copolymers of Polypropylene: Development, Design, Principles, and Future Challenges," Journal of Applied Polymer Science, 2013, Wiley Periodicals, 10 pages.
Sadiqali Cheruthazhekatt et al., "Multidimensional Analysis of the Complex Composition of Impact Polypropylene Copolymers: Combination of TREF, SEC-FTIR-HPer DSC, and High Temperature 2D-LC," Macromolecules 2012, 45, 2025-2305, ACS Publications, American Chemcial Society, 10 pages.
Office Action dated Sep. 26, 2018 for U.S. Appl. No. 15/651,284, BP-354 US-CON1 ||, (pp. 1-10).
Substantive Examination Report for European App. No. 17182869.2 sent on Nov. 12, 2018, BP-356 EP-DIV1 |, 5 pages.
Office Action dated Dec. 6, 2018 for U.S. Appl. No. 15/388,319, BP-428 US-CON1 || (pp. 1-10).
Office Action dateed Dec. 13, 2018 for U.S. Appl. No. 15/672,668, BP-352 US-Con ||, (pp. 1-13).
Office Action dated May 19, 2015 for Chinese Application No. 201280035667.4.
Office Action dated Aug. 18, 2015 for U.S. Appl. No. 14/106,212.
Office Action dated Aug. 27, 2015 for U.S. Appl. No. 14/106,358.
Third Party Observations filed with respect to European Patent Application No. 12727994.1, Aug. 17, 2015 (22 pages).
U.S. Appl. No. 61/498,455, filed Jun. 17, 2011, related to PCT Application No. PCT/US2012/041395, 46 pages.
"Slip Agents", Polypropylene Handbook, 2nd edition, 2005, pp. 285-286.
Certified English translation of JP2003292663.

(56) References Cited

OTHER PUBLICATIONS

Second Chinese Office Action dated Sep. 6, 2015 for Chinese Application Serial No. 201280034350.9.
Office Action dated Oct. 8, 2015 for U.S. Appl. No. 14/188,504.
Office Action dated Oct. 27, 2015 for U.S. Appl. No. 14/462,073.
English translation of Russian Office Action for Application Serial No. 2015127677, dated Sep. 16, 2015.
Inter Partes Review Petition for US. Pat. No. 8,883,280 (712 pages).
Gibson and Ashby, Cellular solids: structure and properties, 2nd ed., Cambridge University Press (1997) (7 pages).
C. Maier and T. Calafut, Polypropylene: the Definitive User's Guide and Databook, Plastics Design Library, William Andrew Inc. (1998) (19 pages).
Grant & Hackh's Chemical Dictionary, 5th ed., McGraw-Hill, Inc. (1987) (3 pages).
Merriam-Webster's Collegiate Dictionary, 11th ed. (2003), p. 70 (3 pages).
Merriam-Webster's Collegiate Dictionary, 11th ed. (2003), p. 1237 (3 pages).
Hawley's Condensed Chemical Dictionary, 14th Ed. (2001) (5 pages).
Reichelt et al., Abstract of PP-Blends with Tailored Foamability and Mechanical Properties, Cellular Polymers, (2003) available from http://www.polymerjournals.com/journals.asp?Page=111&JournalType=cp&Journalssue=cp22-5&JIP=, listing (4 pages).
Ratzsch et al., Abstract of Radical Reactions on Polypropylene in the Solid State, Progress in Polymer Science, vol. 27, Issue 7, (Sep. 2002), available from http://www.sciencedirect.com/science/article/pii/S0079670002000060 (3 pages).
"Borealis Dapoly™ HMS Polypropylene for Foam Extrusion" obtained from Borealis webpage obtained from the Internet Archive's "Wayback Machine" as of Nov. 16, 2008 (https://web.archive.org/web/20081116085125/http://www.borealisgroup.com/pdf/literature/borealis-borouge/brochure/K_IN0020_GB_FF_2007_10_BB.pdf)("Brochure '08") (20 pages).
Office Action dated Dec. 31, 2015 for U.S. Appl. No. 14/755,546.
Office Action dated Jan. 11, 2016 for U.S. Appl. No. 14/161,328.
Singapore Notice of Eligibility for Grant, Search Report, and Examination Report transmitted Dec. 10, 2015 for Singapore Application No. 11201503336V.
English translation of First Office Action for Taiwanese Application No. 101121656, Nov. 13, 2015.
English summary of Spanish Office Action for Application Serial No. P201490025, Feb. 9, 2016, 8 pages.
Extended European Search Report for European Application No. 13849152.7-1303/2912142 PCT/US2013/066811, dated Feb. 12, 2016.
Office Action dated Feb. 16, 2016 for U.S. Appl. No. 14/108,142.
United Kingdom Examination Report for Patent Application No. GB1400762.9 dated Feb. 11, 2016.
English Summary of Russian Office Action for Application Serial No. 2014111340, dated Feb. 25, 2016, 8 pages.
Supplemental European Search Report for European Application No. 12727994.-1302, dated Feb. 17, 2016.
Australian First Patent Examination Report for Application No. 2012271047, dated Feb. 29, 2016.
Extended European Search Report for European Application No. 13827981.5-1708/2888092 PCT/US2013/053935, dated Feb. 19, 2016.
N.N. Najib, N.M. Manan, A.A. Bakar, and C.S. Sipaut, Effect of Blowing Agent Concentration on Cell Morphology and Impact Properties of Natural Rubber Foam, Journal of Physical Science, vol. 20(1), 13-25, 2009 (13 pages).
Nigel Mills, Polymer Foams Handbook, Fig. 2.2, 1st ed. 2007 (2 pages).
University of Massachusetts, Advanced Plastics Processing Lecture, Lecture 11: Foam Processes, Slide 4 (Nov. 11, 2012) (2 pages).
English Summary of Chinese Office Action for Application Serial No. 201380041896.1, dated Mar. 18, 2016, 7 pages.

International Preliminary Report on Patentability dated Feb. 16, 2016, relating to International Application No. PCT/US2014/051508.
Australian Second Patent Examination Report for Application No. 2012302251, dated Feb. 26, 2016.
Japanese Office Action for Japanese Patent Application No. 2014-528384, dated Mar. 1, 2016.
English summary of Mexican Office Action for Application Serial No. MX/a/2013/014993, Apr. 27, 2016, 5 pages.
English summary of Chinese Office Action for Chinese Application Serial No. 201380065781.6, Apr. 19, 2016, 14 pages.
Doerpinghaus et al., 'Separating the effects of sparse long-chain branching on rheology from those due to molecular weight in polyethylenes', Journal of Rheology, 47, 717 (2003).
English Summary of Chinese Office Action for Application Serial No. 201280051426.9, Apr. 29, 2016, 5 pages.
Affidavit of Christopher Butler of Internet Archive, Borealis webpage dated Jan. 20, 2010 (https://web.archive.org/web/20100120102738/http://www.borealisgroup.com/industry-solutions/advancedpackaging/rigid-packaging/polyolefin-foam/daploy-hmspp-extruded-foam/).
Reichelt et al., 'PP-Blends with Tailored Foamability and Mechanical Properties', Cellular Polymers, vol. 22, No. 5, 2003, 14 pages.
Ratzsch et al., 'Radical reactions on polypropylene in the solid state', Prog. Polym. Sci. 27 (2002) 1195-1282, 88 pages.
Excerpts from Encyclopedia of Polymer Science and Technology: Plastics, Resins, Rubbers, and Fibers, 'Blowing Agents', vol. 2, John Wiley & Sons, Inc. (1965), 37 pages.
Excerpts from Polymer Foams: Science and Technology, Lee et al., 'Introduction to Polymeric Foams', CRC Press (2007) 51 pages.
Excerpts from Gibson and Ashby, Cellular solids: Structure and properties—Second edition, Cambridge University Press, 1997, 66 pages.
Office Action (Final Rejection) dated Apr. 12, 2024 for U.S. Appl. No. 17/135,048 (pp. 1-13).
International Search Report dated Jul. 29, 2013, relating to International Application No. PCT/US2012/043016, 25 pages.
International Search Report and Written Opinion dated Sep. 17, 2013, relating to International Application No. PCT/US2012/041395.
Daploy HMS Polypropylene for Foam Extrusion, 20 pages, BOREALIS Borouge Shaping the Future with Plastics, Published 2010, www.borealisgroup.com, www.borouge.com, Vienna, Austria.
Certified English translation of EP0086869.
English translation of Spanish Search Report of Application No. 201490025, dated Apr. 20, 2015.
European Search Report of Application No. 12861450.0, dated Nov. 21, 2014.
International Search Report and Written Opinion dated Apr. 16, 2014, relating to International Application No. PCT/US2013/075013.
International Search Report and Written Opinion dated Apr. 21, 2014, relating to International Application No. PCT/US2013/074923.
International Search Report and Written Opinion dated Apr. 22, 2014, relating to PCT/US2013/074965.
International Search Report and Written Opinion dated Apr. 25, 2014, relating to PCT/US2013/075052.
International Search Report and Written Opinion dated Jan. 19, 2015, relating to International Application No. PCT/US2014/059312.
International Search Report and Written Opinion dated Jul. 3, 2014, relating to International Application No. PCT/US2014/025697.
International Search Report dated Feb. 26, 2013, relating to International Application No. PCT/US2012/043018.
International Search Report dated Jan. 19, 2015, relating to International Application No. PCT/US2014/059216.
International Search Report dated Jan. 29, 2013, relating to International Application No. PCT/US2012/043017.
International Search Report dated Jan. 30, 2013, relating to International Application No. PCT/US2012/042737.
International Search Report dated Jul. 30, 2012, relating to International Application No. PCT/US2012/041397.

(56) References Cited

OTHER PUBLICATIONS

International Search Report dated Mar. 11, 2014, relating to International Application No. PCT/US2013/66811.
International Search Report dated Nov. 19, 2012, relating to International Application No. PCT/US2012/041395.
International Search Report dated Nov. 7, 2014, relating to International Application No. PCT/US2014/51508.
Jaakko I. Raukola, A New Technology to Manufacture Polypropylene Foam Sheet and Biaxially Oriented Foam Film, VTT Publications 361, Technical Research Centre of Finland, Apr. 1998, 100 pages.
Machine English translation of EP0086869.
Machine English translation of JP 2006-130814.
Naguib et al., "Fundamental Foaming Mechanisms Governing the vol. Expansion of Extruded Polypropylene Foams," Journal of Applied Polymer Science, vol. 91, pp. 2661-2668, 2004 (10 pages).
New Zealand First Examination Report for Application No. 619616 dated Oct. 10, 2014.
New Zealand First Examination Report for Application No. 621219 dated Nov. 17, 2014.
Office Action dated Apr. 10, 2015 for U.S. Appl. No. 14/106,358.
Office action dated Apr. 11, 2014 for U.S. Appl. No. 13/526,417.
Office Action dated Apr. 14, 2015 for U.S. Appl. No. 14/106,212.
Office Action dated Apr. 30, 2015 for U.S. Appl. No. 14/462,073.
Office Action dated Aug. 19, 2014 for Chinese Application No. 201280035667.4.
Office Action dated Aug. 21, 2014 for U.S. Appl. No. 13/526,454.
Office Action dated Feb. 2, 2015 for U.S. Appl. No. 14/106,114.
Office Action dated Jan. 6, 2015 for Chinese Application No. 201280034350.9 (11 pages).
Office Action dated Jan. 9, 2015 for Chinese Application No. 201280035667.4 (22 pages).
Office Action dated Jul. 25, 2014 for U.S. Appl. No. 13/525,640.
Office Action dated Jun. 23, 2015 for U.S. Appl. No. 13/525,640.
Office Action dated Oct. 10, 2014 for U.S. Appl. No. 14/106,358.
Office Action dated Oct. 16, 2014 for U.S. Appl. No. 14/106,212.
Office Action dated Sep. 25, 2014 for U.S. Appl. No. 13/526,417.
Singapore Office Action dated Dec. 18, 2014 for Singapore Application No. 2014002273.
Spanish Search Report for Application No. 201490025, dated Apr. 20, 2015.
Spanish Search Report of Application No. 201390099, dated Feb. 9, 2015.
Third-Party Submission Under 37 CFR 1.290 filed on Dec. 9, 2014 in U.S. Appl. No. 14/063,252.
Third-Party Submission Under 37 CFR 1.290 filed on Feb. 26, 2015 in U.S. Appl. No. 13/491,007.
Third Party Submission Under 37 CFR 1.290 in U.S. Appl. No. 14/188,504 submitted May 11, 2015 and May 27, 2015 (43 pages).
Wang et al., "Extending PP's Foamability Through Tailored Melt Strength and Crystallization Kinetics," paper 19 from the Conference Proceedings of the 8th International Conferences of Blowing Agents and Foaming Processes, May 16-17, 2006 in Munich, Germany Smithers Rapra Ltd, 2006 (14 pages).
Australian First Patent Examination Report for Application No. 2012302251 dated Jul. 9, 2015.
Office Action Chinese Patent Application No. 201280051426.9 dated Jul. 23, 2015.
Office Action dated Nov. 14, 2017 for U.S. Appl. No. 14/862,552 || (pp. 1-14).
"All You Need to Know About Polypropylene, Part 1," Creative Mechanisms Blog. (Year: 2016).
Rejection Decions for Chinese Patent App. No. 201280051426.9 received on Nov. 14, 2017, BP-356 CN || , 8 pages.
ASTM D883-17, an American Society for Testing and Materials "Standard Terminology Relating to Plastics," 2017, 16 pages.
ASTM D4101-14, an American Society for Testing and Materials "Standard Standard Specification for Polypropylene Injection and Extrusion Materials," 2014, 17 pages.

Lyondellbasell, Polypropylene, Impact Copolymer, https://www.lyondellbasell.com/en/products-technology/polymers/resin-type/polypropylene-impact-copolymer/, accessed on Nov. 29, 2017, 5 pages.
ASTM D883-12e1, an American Society for Testing and Materials "Standard Terminology Relating to Plastics," 2012, 16 pages.
Astm D4101-11, an American Society for Testing and Materials "Standard Standard Specification for Polypropylene Injection and Extrusion Materials," 2011, 17 pages.
Chinese Office Action for Chinese App. No. 201380065781.6 dated Nov. 28, 2017, BP-395 CN || , 10 pages.
European Examination Report for European App. No. 13849152.7 sent Jan. 4, 2018, BP-395 EP || , 3 pages.
Office Action dated Jan. 16, 2018 for U.S. Appl. No. 15/388,319; || (BP-428) (pp. 1-13).
Office Action dated Jan. 19, 2018 for U.S. Appl. No. 15/004,263; || (pp. 1-18).
Extended European Search Report for European App. No. 14836418.5 mailed Jan. 30, 2018, BP-428 EP || , 4 pages.
Canadian office action for Canadian App. No. 2,842,325 dated Jan. 24, 2018, BP-352 CA || , 4 pages.
Japanese Office Action for Japanese App. No. 2016-501945 sent Jan. 23, 2018, BP-392 JP || , 17 pages.
Canadian Examiner's Report for Canadian App. No. 2845225 datedFeb. 6, 2018, BP-356 CA || , 5 pages.
Taiwan Office Action for Taiwan App. No. 103128338 received on Feb. 21, 2018, BP-428 TW || , 9 pages.
Japanese Office Action for Japanese Patent App. No. 2015-539838 sent Feb. 27, 2018, BP-395 JP || , 10 pages.
Taiwan Office Action for Taiwan App. No. 102138786 received on Mar. 1, 2018, BP-395 TW || , 20 pages.
Chinese Office Action mailed Mar. 22, 18 for Chinese Patent Application 201480007369.3, BP-392 || 237578, 5 pages.
Office Action dated Mar. 29, 2018 for U.S. Appl. No. 14/862,552, BP-450 || (pp. 1-10).
Chinese Office Action for Chinese Application No. 201380065127.5, sent on Jul. 26, 2016, 11 pages.
Taiwan Office Action for Taiwan App. No. 101121655 received Apr. 25, 2018, BP-354 TW || , 6 pages, (No English translation available).
"All you need to know about Polypropylene, Part 1," Creative Mechanisms. (Year: 2017), 6 pages.
"Polypropylene, Impact Copolymer," Lyondell Basell. (Year: 2017).
Australian Notice of Acceptance for Australian App. No. 2016204692 received on Apr. 3, 2018, BP-356 AU-DIV1 || , 3 pages.
First Substantive Examiantion Report for European App. No. 14775300.8 sent Apr. 6, 2018, BP-392 EP || , 4 pages.
Office Action dated Jun. 6, 2018 for U.S. Appl. No. 15/388,319 (pp. 1-19).
Notice of Opposition for EP2751194 submitted May 28, 2018, BP-356 EP || , 11 pages.
Grounds of Opposition for EP2751194 submitted May 28, 2018, BP-356 EP || , 40 pages.
Pasquini, Nello, "Polypropylene Handbook," Carl Hanser Verlag, 2005, 7 pages.
Himont, Pro-fay PF814 brochure, 1992, 1 page.
Maier et al., "Polypropylene: The Definitive User's Guide and Databook" Plastics Design Library, 1998, 19 pages.
Gachter et al., "Taschenbuch der Kunststoff-Additive" Carl Hanser Verlag, 1983, 17 pages, (no English translation available).
Wypych, "Handbook of Antiblocking, Release, and Slip Additives" ChemTec Publishing, 2011, 10 pages.
Wiesner et al. "The Right Chemical Foaming Agent for Your Application" The Sixth International Conference "Blowing Agents and Foaming Processes 2004", 11 pages.
Hydrocerol—Chemical Foaming and Nucleating Agents, 2007, 8 pages.
Montell at K98—presentation of extrusion line, 1998, 2 pages.
Montell Polyolefins "PP meets foam in sheet—Pro-fax PF-814 paves the way to PP foam growth", available at least by May 28, 2018, 4 pages.
Glossary of Terms for the chemical Fabrics & Film Industry, available at least by May 28, 2018, 5 pages.

(56) References Cited

OTHER PUBLICATIONS

ASTM D 883-08, Standard Terminology Relating to Plastics, 2008, 15 pages.
ASTM D 1922-93, Standard Test Method for Propagation Tear Resistance of Plastic Film and Thin Sheeting by Pendulum Method, 1993, 5 pages.
ASTM D3763-02, Standard Test Method for High Speed Puncture Properties of Plastics Using Load and Displacement SEnsors, 2002, 10 pages.
Tolinski, "Additives for Polyolefins: Getting the Most Out of Polypropylene, Polyethylene, and TPO" Elsevier, 2009, 25 pages.
Borealis, DaployTM HMS Polypropylene for Foam Extrusion, 2007, 20 pages.
Borealis, DaployTM HMS Polypropylene for Foam Extrusion, 2010, 20 pages.
Documents from Inter Parte Review of U.S. Pat. No. 8,883,280, entered Jan. 26, 2016, 26 pages.
Clarian, Technical Product Information "Hydrocerol CF40E", 2004, 1 page.
Clariant, Technical Product Information "Hydrocerol CF20E", 2004, 6 pages.
Clariant, Data sheet Hydrocerol CT516, 2004, 5 pages.
Office Action dated Jan. 14, 2019 for U.S. Appl. No. 15/004,263, BP-472 US-U ||, (pp. 1-15).
Office Action dated Mar. 7, 2019 for U.S. Appl. No. 16/023,218, BP-356 US-CON5 ||, (pp. 1-5).
Rogers, "All you Need to Know About Polypropylene, Part 1," Creative Mechanisms Blog. (Year: 2014), 6 pages.
Office Action dated Aril 2, 2019 for U.S. Appl. No. 15/388,319, BP-428 US-CON || (pp. 1-17).
Office Action dated Apr. 30, 2019 for U.S. Appl. No. 15/004,263 (pp. 1-10).
Office Action dated Apr. 5, 2019 for U.S. Appl. No. 15/651,284, BP-354 US-CON1 || 2020, pp. 1-5.
Notice to Attend Hearing for Indian Patent App. No. 2179/DELNP/2014 dated Aug. 17, 2020, BP-356 IN ||, 2 pages.
Mexican Office Action for Mexican App. No. MX/a/2014/002373 issued Jul. 1, 2019, BP-356 MX ||, 7 pages.
ISO, "Plastics—Determination of drawing characteristics of thermoplastics in the molten state", ISO, First edition, Jun. 15, 2005, 22 pages.
Mexican Office Action for Mexican App. No. MX/a/2014/002373 issued Mar. 6, 2020, BP-356 MX ||, 10 pages.
Third Mexican Office Action for Mexican App. No. MX/a/2014/002373 issued Jan. 8, 2021, BP-356 MX ||, 9 pages.
Fourth Mexican Office Action for Mexican App. No. MX/a/2014/002373 received Nov. 2, 2021, BP-356 MX ||, 5 pages.
Canadian Examiner's Report and Examination Search Report for Canadian App. No. 2,889,280, dated Apr. 14, 2020, BP-395 CA ||, 5 pages.
Canadian Examiner's Report and Examination Search Report for Canadian App. No. 2,889,280, dated Oct. 27, 2020, BP-395 CA ||, 4 pages.
Mexican Office Action for Mexican Patent App. No. MX/a/2015005207 dated Jul. 22, 2020, BP-395 MX ||, 5 pages.
Examination Report for Indian Patent App. No. 5758/DELNP/2015 dated Aug. 28, 2019, BP-445 IN ||, 7 pages.
First Examination Report for Indian App. No. 5756/DELNP/2015 dated Dec. 12, 2019, BP-374 IN ||, 5 pages.
First Examination Report for Indian App. No. 5804/DELNP/2015, sent Aug. 5, 2019, BP-391 IN ||, 7 pages.
Indian First Examination Report for Indian Application No. 8947/DELNP/2015 dated Jul. 18, 2019, BP-392 IN ||, 7 pages.
Office ACtion dated Oct. 18, 2019 for U.S. Appl. No. 16/546,723, BP-356 US-CON ||, (pp. 1-6).
Office Action dated Nov. 29, 2019 for U.S. Appl. No. 15/651,284, BP-354 US-CON || (pp. 1-6).
Lyondellbasell Technical Data Sheet for Pro-fax SC204 dated Mar. 17, 2016, 3 pages.
Canadian Examiner's Report for Canadian App. No. 2896256, dated Feb. 6, 2020, BP-392 CA ||, 4 pages.
Canadian Examiner's Second Report for Canadian App. No. 2896256, dated Dec. 2, 2020, BP-392 CA ||, 4 pages.
Canadian Examiner's Third Report for Canadian App. No. 2896256, dated Aug. 5, 2021, BP-392 CA ||, 4 pages.
Hearing Notice for Indian Application No. 8947/DELNP/2015 dated Jul. 23, 2020, BP-392 IN ||, 3 pages.
Notice of Appeal Decision for Japanese App. No. 2016-501945 sent Aug. 18, 2020, BP-392 JP ||, 15 pages.
First Mexican Office Action for Mexican Patent App. No. MX/a/2015/008525 dated Nov. 5, 2020, BP-392 MX ||, 17 pages.
First Mexican Office Action for Mexican Patent App. No. MX/a/2015/008525 dated May 3, 21, BP-392 MX ||, 11 pages.
Korean Notice of Preliminary Rejection for Korean Pat. App. No. 10-2015-7021888 dated Apr. 21, 20, BP-392 KR ||, 11 pages.
Korean Second Notice of Preliminary Rejection for Korean Pat. App. No. 10-2015-7021888 dated Dec. 29, 20, BP-392 KR ||, 16 pages.
Korean Notice of Last Preliminary Rejection for Korean Pat. App. No. 10-2015-7021888 dated Sep. 5, 2021, BP-392 KR ||, 9 pages.
Office Action dated Jun. 12, 2020 for U.S. Appl. No. 15/651,284, BP-354 U-CON || (pp. 1-8).
Japanese Office Action for Japanese Patent App. No. 2019-045572 date Jan. 14, 2020, BP-392 JP ||, 6 pages.
Office Action dated Apr. 27, 2020 for US App. No. 16/058, 126, BP-512A US-U ||, (pp. 1-12).
Office Action dated Jun. 23, 2020 for US App. No. 16/058, 131, BP-512B US-U || (pp. 1-8).
Office Action dated Sep. 3, 2020 for U.S. Appl. No. 16/858,778 (pp. 1-10).
Office Action dated Sep. 30, 2020 for US App. No. 16/058, 126, BP-512A US-U ||, (pp. 1-11).
Office Action dated Sep. 30, 2020 for U.S. Appl. No. 16/531,530, BP-354 US-CON1 ||, (pp. 1-10).
Japanese Office Action for Japanese Patent App. No. 2019-045572 dated Oct. 30, 2020, BP-392 JP ||, 6 pages.
Office Action dated Dec. 24, 2020 for US App. No. 16/058,131, BP-512B US-U || (pp. 1-17).
Office Action dated Jan. 25, 2021 for US App. No. 16/058,126, BP-512A US-U || (pp. 1-13).
Combined Search and Examination Report for Great Britain App. No. GB2010642.3 dated Mar. 31, 2021, BP-356 GB-DIV1 ||, 3 pages.
Japanese Office Action for Japanese Patent App. No. 2019-045572 dated Apr. 13, 2021, BP-392 JP ||, 6 pages.
Office Action dated Jun. 8, 2021 for US App. No. 16/058,126, BP-512A US-U (pp. 1-16).
Indian First Examination Report for Indian App. No. 201918021005 dated Dec. 24, 2021, BP-354 IN ||, 7 pages.
Chinese Office Action for Chinese App. No. 202010558511.0 dated Jul. 20, 2022, BP-356 CN-DIV1 ||, 11 pages.
Chinese Rejection Decision Action for Chinese App. No. 202010558511.0 dated Feb. 16, 2023, BP-356 CN-DIV1 ||, 7 pages.
Canadian Examiner's Report for Canadian App. No. CA3170958 dated (Oct. 27, 2023), BP-356 CA-DIV1 ||, 4 pages.
Office Action (Non-Final Rejection) dated Oct. 27, 2022 for U.S. Appl. No. 17/528,650, BP-512A US-CON || (pp. 1-19).
Extended European Search Report for European Application No. 13863308.6 mailed Jul. 19, 2016, 8 pages.
Office Action dated Aug. 11, 2016 for U.S. Appl. No. 14/108,110.
Chinese Office Action mailed Aug. 3, 2016 for Chinese Patent Application 201480007369.3, 13 pages.
M. Antunes et al., 'Heat Transfer in Polyolefin Foams,' Heat Transfer in Multi-Phase Materials, A. Ochsner and G. E. Murch, Eds. Springer-Verlag Berlin Heidelberg, 2011, 131-161.
Office Action dated Sep. 1, 2016 for U.S. Appl. No. 14/106,212.
Australian First Patent Examination Report for Application No. 2013359097 sent Aug. 26, 2016, 3 pages.
Office Action dated Aug. 9, 2016 for U.S. Appl. No. 14/108,142.
Jacoby, Philip, "Recent Insights on the Use of Beta Nucleation to Improve the Thermoforming Characteristics of Polypropylene,"

(56) References Cited

OTHER PUBLICATIONS

Society of Plastics Engineers, Annual Technical Conference Proceedings, ANTEC 2012, Apr. 2012, pp. 2292-2296.
Singapore Written Opinion for Singapore Patent Application No. 11201504756T established Jul. 19, 2016, 7 pages.
Office Action dated Sep. 27, 2016 for U.S. Appl. No. 14/725,319.
Office Action dated Oct. 7, 2016 for U.S. Appl. No. 14/739,510.
Japanese Office Action for Japanese Application No. 2014-515882, dispatched Aug. 30, 2016, 6 pages.
Mexican Office Action for Mexican Application MX/a/2013/014993 received on Sep. 27 2016, 6 pages.
New Zealand Examination Report for New Zealand Application No. 708463 received Oct. 3, 2016, 3 pages.
New Zealand Examination Report for New Zealand Application No. 708552 received on Oct. 7, 2016, 4 pages.
New Zealand First Examination Report for New Zealand Application 708546 received Sep. 26, 2016, 4 pages.
Russian Office Action for Russian Application No. 2014101298 received Sep. 30, 2016, 6 pages.
European Examination Report for European App. No. 12727994.1 received on Sep. 23, 2016, 4 pages.
Chinese Office Action for Chinese App. No. 201380065089.3 received Sep. 30, 2016, 12 pages.
European Search Report for European App. No. 13849152.7 received Sep. 16, 2016, 3 pages.
Australian Patent Examination Report for Australian App. No. 2013334155 issued on Oct. 24, 2016, 7 pages.
Taiwan Office Action for Taiwan Pat. App. No. 102146299 received on Oct. 21, 2016, 7 pages.
Third Party Observation filed in European Patent App. No. 12727994.1 received on Nov. 4, 2016, 11 pages.
International Standard ISO 16790:2005(E), 20 pages.
S. Muke et al., The Melt Extensibility of Polypropylene, Polym. Int. 2001,515-523, 9 pages.
P. Spitael and C.W. Macosko, Strain Hardening in Polypropylenes and its Role in Extrusion Foaming, Polym. Eng. Sci. 2004, 2090-2100.
Combined Search and Examination Report for Great Britain App. No. GB1616321.4 received Oct. 12, 2016, 4 pages.
British Examination Report for GB App. No. 1400762.9 received Oct. 12, 2016, 2 pages.
Chinese Office Action for Chinese Applicaiton 201380065781.6 received Oct. 18, 2016, 33 pages.
Research Progress of Polypropylene Foamed Material, Baiquan Chen et al., Plastics Manufacture, No. 12, pp. 55-58.
Modification and Formulation of Polypropylene, Mingshan Yang edits, Chemical Industry Press, p. 43, the second paragraph from the bottom, Jan. 31, 2009, 17 pages.
Extended European Search Report for European App. No. 13863649.3 received Sep. 27, 2016, 9 pages.
Office Action dated November4, 2016 for U.S. Appl. No. 13/961,411.
Chinese Office Action for Chinese Application No. 201280051426.9 received Nov. 1, 2016, 9 pages.
English Summary of Chinese Office Action for Application Serial No. 201380041896.1, dated Nov. 11, 2016, 11 pages.
Extended European Search Report for European App. No. 14775300.8 sent Oct. 24, 2016, 9 pages.
Office Action dated Nov. 18, 2016 for U.S. Appl. No. 14/718,836.
Office Action dated Dec. 22, 2016 for U.S. Appl. No. 14/858,158.
Gulf Cooperation Council Examination Report for GCC Patent App. No. GC2012-21529 received on Nov. 14, 2016, 6 pages.
Office Action dated Dec. 28, 2016 for U.S. Appl. No. 14/106,276.
Office Action dated Jan. 4, 2017 for U.S. Appl. No. 14/108,110.
Spanish Search Report for Spanish App. No. 201490025 received Dec. 23, 2016, 5 pages.
Japanese Office Action for Japanese Patent App. 2014-516089 sent Dec. 20, 2016, 6 pages.
European Examination Report for European App. No. 12727994.1 received on Jan. 25, 2016, 4 pages.
Japanese Office Action for Japanese App. No. 2014-528384 received Dec. 6, 2016, 15 pages.
Singapore Office Action and Written Opinion received Feb. 6, 2017 for Singapore Application No. 11201504330U, 6 pages.
Office Action dated Feb. 7, 2017 for U.S. Appl. No. 13/491,007.
Office Action for Chinese Patent Application No. 201380064860.5, dated Jan. 25, 2017, 12 pages.
European Examination Report for European App. No. 13849152.7 sent Jan. 30, 2017, 3 pages.
Office Action dated Feb. 15, 2017 for US Appl. No. 14/858,193.
Singapore Office Action and Written Opinion dated Feb. 14, 2017 for Singapore Application No. 11201504327V, 6 pages.
Office Action dated Feb. 24, 2017 for U.S. Appl. No. 14/188,504.
Office Action dated Feb. 28, 2017 for U.S. Appl. No. 15/004,263.
Office Action dated Mar. 6, 2017 for U.S. Appl. No. 14/108,142.
Chinese Office Action for Chinese App. No. 201480052411.3 mailed Feb. 28, 2017, 16 pages.
New Zealand First Examination Report for New Zealand Application 708546 received Feb. 23, 2017, 2 pages.
Singapore Office Action and Written Opinion dated Dec. 13, 2016 and received on Feb. 28, 2017 for Singapore Application No. 11201504333Y, 6 pages.
Office Action for Chinese Patent Application No. 201380065116.7, dated Mar. 1, 2017, 9 pages.
Office Action dated Mar. 15, 2017 for U.S. Appl. No. 14/106,212.
Office Action dated Mar. 17, 2017 for U.S. Appl. No. 14/106,276.
Office Action dated Mar. 20, 2017 for U.S. Appl. No. 14/188,504.
Chinese Office Action mailed Mar. 10, 2017 for Chinese Patent Application 201480007369.3, 11 pages.
New Zealand Examination Report for New Zealand Application No. 708463 received Mar. 16, 2017, 3 pages.
Office Action dated Mar. 24, 2017 for U.S. Appl. No. 14/506,906.
Office Action dated Mar. 30, 2017 for U.S. Appl. No. 15/137,657.
Supplemental European Search Report for European Appl. No. 14836418 mailed Feb. 23, 2017, 6 pages.
Office Action dated Apr. 7, 2017 for U.S. Appl. No. 14/063,252.
Chinese Office Action for Chinese Application No. 201380065127.5 sent on Apr. 1, 2017, 14 pages.
Japanese Office Action for Japanese Application No. 2014-515882, dispatched Apr. 4, 2017, 6 pages.
New Zealand Examination Report for New Zealand Application No. 708552 received on Mar. 29, 2017, 2 pages.
Australian Search Report for Australian App. No. 2013359028, dated Apr. 10, 2017, 5 pages.
Australian Search Report for Australian App. No. 20133358988 dated Apr. 11, 2017, 4 pages.
Chinse Office Action for Chinese Patent App. No. 201511030247.9 mailed Apr. 5, 2017, 12 pages.
Chinese Office Action for Chinese App. No. 201380065089.3 received Apr. 21, 2017, 10 pages.
Applied Plastics Engineering Handbook, 1st edition, edited by Myer Kutz, published Jul. 20, 2011, 2 pages.
Chinese Office Action for Chinese App. No. 201380065781.6 dated May 10, 2017, 11 pages.
Office Action dated Jun. 7, 2017 for U.S. Appl. No. 15/388,319, (pp. 1-21).
Chinese Office Action for Chinese Application No. 201280051426.9 received May 15, 2017, 12 pages.
Chinese Office Action for Chinese App. No. 201380041896.1 mailed May 22, 2017, 9 pages.
Taiwan Office Action for Taiwan App. No. 101121655 received Jun. 14, 2017, 29 pages.
Australian Examiner's Report for Australian App. No. 2014244210 received Jun. 16, 2017, 4 pages.
European Examination Report for European App. No. 13863308.6 sent May 17, 2017, 3 pages.
Extended European Search Report for European App. No. 14836418.5 mailed Jun. 6, 2017, 14 pages.
Office Action dated Jun. 13, 2017 for U.S. Appl. No. 14/858,193; (pp. 1-21).
Japanese Office Action for Japanese Patent App. No. 2015-539838 sent Jun. 6, 2017, 19 pages.

(56) References Cited

OTHER PUBLICATIONS

New Zealand Examination Report for New Zealand Application 708546 received Jul. 11, 2017, 2 pages.
Office Action dated Jul. 19, 2017 for U.S. Appl. No. 15/004,263; (pp. 1-17).
European Examination Report for European App. No. 13849152.7 sent Jun. 29, 2017, 4 pages.
Taiwan Office Action for Taiwan App. No. 102138786 received on Aug. 9, 2017, 25 pages.
Office Action dated Aug. 22, 2017 for U.S. Appl. No. 14/188,504; (pp. 1-9).
Australian Examination REport for Australian App. No. 2016204692 received Aug. 15, 2017, 3 pages.
German Office Action for German App. No. 11 2012 002 042.1 received on Sep. 8, 2017, 20 pages.
Chinese Office Action mailed Sep. 21, 2017 for Chinese Patent Application 201480007369.3, 4 pages.
Taiwan Office Action for Taiwan Pat. App. No. 101121656 mailed Aug. 1, 2017, 16 pages.
Office Action dated Oct. 18, 2017 for U.S. Appl. No. 14/063,252; (pp. 1-17).
Chinese Office Action for Chinese Application No. 201380065127.5 sent on Sep. 27, 2017, 19 pages.
Office Action dated Oct. 26, 2017 for U.S. Appl. No. 15/139,573; (pp. 1-8).
Office Action dated Nov. 2, 2017 for U.S. Appl. No. 15/650,424; (pp. 1-6).
Extended European Search Report for European App. No. 17182869.2 sent on Oct. 19, 2017, 5 pages.
Extended European Search Report for European App. No. 17181231.6 sent on Nov. 7, 2017, 5 pages.
Office Action (Non-Final Rejection) dated Dec. 8, 2022 for U.S. Appl. No. 17/136,628, (pp. 1-20).
Office Action (Non-Final Rejection) dated Dec. 8, 2022 for U.S. Appl. No. 17/363,551, (pp. 1-19).
Office Action dated Apr. 27, 2023 for U.S. Appl. No. 17/136,628, (pp. 1-23).
Office Action (Non-Final Rejection) dated Apr. 27, 2023 for U.S. Appl. No. 17/136,628 (pp. 1-22).
Office Action (Final Rejection) dated Apr. 21, 2023 for U.S. Appl. No. 17/528,650, (pp. 1-20).
Office Action (Final Rejection) dated May 4, 2023 for U.S. Appl. No. 17/363,551 (pp. 1-19).
Office Action (Final Rejection) dated Sep. 7, 2023 for U.S. Appl. No. 17/136,628 (pp. 1-24).
Office Action (Non-Final Rejection) dated Sep. 13, 2023 for U.S. Appl. No. 17/363,551 (pp. 1-16).
Office Action (Non-Final Rejection) dated Sep. 20, 2023 for U.S. Appl. No. 17/366,728 (pp. 1-12).
Office Action (Final Rejection) dated Jan. 8, 2024 for U.S. Appl. No. 17/366,728, (pp. 1-16).
Office Action (Non-Final Rejection) dated Feb. 20, 2024 for U.S. Appl. No. 17/136,628, (pp. 1-13).
Office Action dated Mar. 8, 2024 for U.S. Appl. No. 17/363,551 (pp. 1-17).
Inter Partes Review Petition for US. Pat. 8,883,280 (712 pages) [Submitted in multiple parts].
Supplemental European Search Report for European Application No. 12727994.1-1302, dated Feb. 17, 2016.
Excerpts from Maier and Calafut, Polypropylene: the Definitive User's Guild and Databook, Plastics Design Library, William Andrew Inc. (1998), 35 pages.
ASTM D3763-86, an American Society for Testing of Materials (ASTM), 'Standard Method for High-Speed Puncture Properties of Plastics Using Load and Displacement Sensors' (1986 Edition), 5 pages.
ASTM D1922-93, an American Society for Testing of Materials (ASTM), "Standard Method for Propagation Tear Resistance of Plastic Film And Thin Sheeting by Pendulum Method" (1993 Edition), 5 pages.
Naguib et al., "Effect of Supercritical Gas on Crystallization of Linear and Branched Polypropylene Resins with Foaming Additives", Ind. Eng. Chem. Res., 44 (2005), 6685-6691.
Tabatabaei et al., "Rheological and thermal properties of blends of a long-chain branched polypropylene and different linear polypropylenes", Chemical Engineering Science, 64 (2009), 4719-4731.
Almanza et al., 'Applicability of the Transient Plane Source Method To Measure the Thermal Conductivity of Low- Density Polyethylene Foams', Journal of Polymer Science: Part B: Polymer Physics, vol. 42 (2004), 1226-1234.
The Burn Foundation, 'Scald Burns', available at https://web.archive.org/web/20080926114057/http:/wwwvii.burnfoundation.org/programs/resource.cfm?c=1&a=3, dated Sep. 26, 2008, accessed on Feb. 5, 2016.
AntiScald Inc. available at https://web.archive.org/web/20080517041952/http:/www.antiscald.com/prevention/general_info/table.php, dated May 17, 2008, accessed on Feb. 5, 2016.
"Fire Dynamics", available at http://www.nist.gov/fire/fire_behavior.cfm, accessed on Feb. 5, 2016.
'Power of a Microwave Oven', available at https://web.archive.org/web/20071010183358/http://hypertextbook.com/facts/2007/TatyanaNektalova.shtml, dated Oct. 10, 2007, accessed on Feb. 5, 2016.
Health Physics Society, 'Microwave Oven Q & A', available at https://web.archive.org/web/20090302090144/http://www.hps.org/publicinformation/ate/faqs/microwaveovenq&a.html, dated Mar. 2, 2009, accessed on Feb. 5, 2016.
Cook's Info, "Microwave Ovens", available at http://www.cooksinfo.com/microwave-ovens, accessed on Feb. 5, 2016.
Antunes et al., 'Heat Transfer in Polypropylene-Based Foams Produced Using Different Foaming Processes', Advanced Engineering Materials, 11, No. 10 (2009), 811-817.
Excerpts from Frank Kreith, Principles of Heat Transfer, 3rd ed., Intext Educational Publishers (1973).
Excerpts from James M. Gere, Mechanics of Materials, 5th ed., Brooks/Cole (2001).
Technical data sheet of Hifax Ca 60 A, obtained from https://www.lyondellbasell.com/en/polymers/p/Hifax-CA-60-A/d372c484-8f5a-4b2c-8674-8b7b781a1796, accessed on Feb. 4, 2016, 2 pages.
Michel Biron, "Chapter 4—Detailed Accounts of Thermoplastic Resins," Thermoplastics and Thermoplastic Composites, Technical Information for Plastics Users, Elsevier Ltd. (2007), 217-714.
Excerpts from Cornelia Vasile, "Mechanical Properties and Parameters of Polyolefins", Handbook of Polyolefins, 2nd ed., Marcel Dekker, Inc. (2000).
Williams et al., "Thermal Connectivity of Plastic Foams", Polymer Engineering and Science, Apr. 1983, vol. 23, No. 6., 293-298.
Excerpts from M.C. McCrum et al., Principles of Polymer Engineering, 2nd ed., Oxford Science Publications (1997).
Excerpts from Robert H. Perry, Perry's Chemical Engineers Handbook, 7th ed., The McGraw-Hill Companies, Inc. (1997).
Martinez-Diez et al., "The Thermal Conductivity of a Polyethylene Foam Block Produced by a Compression Molding Process", Journal of Cellular Plastics, vol. 37 (2001), 21-42.
R. Coquard and D. Baillis, Journal of Heat Transfer, 2006, 128(6): 538-549.
A. R. Katritzky et al., "Correlation and Prediction of the Refractive Indices of Polymers by Qspr," J. Chem. Inf. Comput. Sci., 38 (1998), 1171-1176.
Inter Partes Review Petition for U.S. Pat. No. 8,883,280 (2101 pages).
Third Party Submission Under 37 CFR 1.290 filed on May 12, 2016 in U.S. Appl. No. 14/739,510.
Lugao, A.B et al., HMSPP—New Developments, Chemical and Environmental Technology Center, IPEN—Progress Report, 2002-2004 (1 page).
Davesh Tripathi, Practical Guide to Polypropylene, 2002 (5 pages).
Jinghua Tian et al., The Preparation and Rheology Characterization of Long Chain Branching Polypropylene, Polymer, 2006 (9 pages).
Bc. Lukas Kovar, High Pressure Crystallization of Long Chain Branched Polypropylene, Master Thesis, Thomas Bata University in Zlin, 2010 (83 pages).

(56) References Cited

OTHER PUBLICATIONS

English translation of Japanese Office Action for Japanese Application No. 2014-516089, dated May 10, 2016.
Office Action dated Mar. 10, 2016 for U.S. Appl. No. 14/462,073.
Office Action dated Jun. 10, 2016 for U.S. Appl. No. 14/188,504.
Singapore Office Action and Written Opinion dated May 27, 2016 for Singapore Application No. 11201504327V.
Singapore Office Action and Written Opinion dated May 27, 2016 for Singapore Application No. 11201504330U.
Notice of Acceptance dated Jun. 10, 2016 for Australian Application No. 2012302251.
Singapore Office Action and Written Opinion dated May 26, 2016 for Singapore Application No. 11201504333Y.
Office Action for Chinese Patent Application No. 201380064860.5, dated Jun. 2, 2016 including English language summary, 13 pages.
Australian First Patent Examination Report for Application No. 2012363114, dated Jun. 15, 2016, 4 pages.
Office Action dated Jun. 30, 2016 for U.S. Appl. No. 14/106,276.
Extended European Search Report for European Application No. 13862331.9-1708/2931627 PCT/US2013/074923, dated Jul. 7, 2016.
English translation of Russian Office Action for Application Serial No. 2014101298, dated Jul. 22, 2016, 7 pages.
Australian First Patent Examination Report for Application No. 2013334155, dated May 23, 2016, 4 pages.
Office Action for Chinese Patent Application No. 201380065116.7, dated Jun. 28, 2016, including English language summary, 12 pages.
Office Action dated Jul. 28, 2016 for U.S. Appl. No. 14/211,553.
British Examination Report for GB Application No. GB1400762.9, sent on Aug. 8, 2016, 2 pages.
Extended European Search Report for European Application No. 13863546.1 established Jul. 12, 2016, 7 pages.
International (PCT) Search Report and Written Opinion for PCT/US21/47516 dated Jan. 24, 2022, 22 pages.
Unilever Says It Will Use Less Plastic Per Bottle, Yahoo News (Apr. 22, 2014, 10:20 AM), http://news.yahoo.com/unilever-says-less-plastic-per-bottle-142039401-finance.html (3 pages).
Chinese Office Action for Application Serial No. 201480021009.9, dated Aug. 7, 2017 including English language summary, 12 pages.
Chinese Office Action for Chinese App. No. 201480047976.2 received on Aug. 22, 2017, 15 pages.
Dongwu Yang, Plastic Material Selection Technology, Light Industry Press, Jan. 2008, 1 page.
Australian First Patent Examination Report for Australian App. No. 2014311991 dated Oct. 4, 2017, 4 pages.
Office Action dated Oct. 3, 2017 for U.S. Appl. No. 15/491,443; (pp. 1-6).
Office Action dated Oct. 6, 2017 for U.S. Appl. No. 15/383, 115; (pp. 1-5).
Office Action dated Oct. 27, 2017 for U.S. Appl. No. 15/239,894; (pp. 1-7).
Chinese Office Action for Application Serial No. 201480021009.9, dated Jan. 2, 2018 including English language summary, 6 pages.
Office Action dated Jan. 17, 2018 for U.S. Appl. No. 15/591,355; (pp. 1-5).
Chinese Office Action for Application Serial No. 201480021009.9, dated Apr. 20, 2018 including English language summary, 6 pages.
First Substantive Examination Report for European App. No. 14768125.8 dated Mar. 21, 2019, 6 pages.
First Examination Report for Indiana Patent App. No. 9302/DELNP/2015 dated May 6, 2019, 7 pages.
Chinese Office Action for Chinese App. No. 20180039581.8 sent Feb. 18, 2023, 13 pages.
Chinese Office Action for Chinese App. No. 20180039581.8 sent Jan. 14, 2019, 10 pages.
Chinese Final Rejection for Chinese App. No. 201480047976.2 received on Mar. 7, 2018, 8 pages.
Chinese Office Action for Chinese App. No. 201480047978.1 received Feb. 24, 2018, 11 pages.
Chinese Office Action for Chinese App. No. 20180042446.9 sent on Feb. 3, 2018, 9 pages.
Chinese Office Action for Chinese App. No. 20180042446.9 sent on Oct. 31, 2018, 5 bages.
Chinese Office Action for Chinese App. No. 201480047578.0 sent on Jan. 18, 2024, 10 pages.
Vasile et al., Practical Guide to Polyethylene, published by Smithers Rapra Press, 2008, p. 119, 3 pages.
Office Action dated Apr. 27, 2018 for U.S. Appl. No. 15/061,005 (pp. 1-7).
Office Action dated Apr. 16, 2018 for U.S. Appl. No. 15/061,070, (pp. 1-13).
Definition of "Base," Dictionary.com, available at http://www.dictionary.com/browse/base, retrieved on Apr. 16, 2018.
Office Action dated Apr. 20, 2018 for .S. Appl. No. 15/239,894, (pp. 1-13).
Office Action dated Jun. 15, 2018 for U.S. Appl. No. 15/491,443, pp. 1-6.
Lubrizol Advanced Materials, Inc., Extrusion Guide, 2014, 16 pages.
Chinese Office Action for Chinese App. No. 201480047578.0 sent on Aug. 29, 2018, 4 pages.
Office Action dated Sep. 7, 2018 for U.S. Appl. No. 15/239,894, (pp. 1-9).
Office Action dated Mar. 8, 2019 for U.S. Appl. No. 15/902,489, (pp. 1-16).
Chinese Office Action for Chinese App. No. 20180039581.8 sent May 31, 2019, 7 pages.
Chinese Reexamination Notification for Chinese App. No. 201480047976.2 received on Jul. 15, 2019, 12 pages.
Shunying Wu et al., "Foam Molding" Beijing Chemical Industry Press, Second Edition, Feb. 1999, 16 pages, English translation included.
Dingyi Hong, "Handbook of Plastic Industry: Polyolefin" Beijing Chemical Industry Press, First Edition, Mar. 1999, 17 bages, English translation included.
Shunyang Deng, "Chemical Formulation and Process Manual" Shanghai Science and Technology Press, First Edition, Jan. 2013, 11 pages, English translation included.
Office Action dated Jul. 15, 2019 for U.S. Appl. No. 15/902,489, (pp. 1-24).
Office Action dated Jul. 26, 2019 for U.S. Appl. No. 16/149,351, (pp. 1-6).
Office Action dated Oct. 4, 2019 for U.S. Appl. No. 15/713,799, (pp. 1-5).
Indian First Examination Report for Indian Patent App. No. 2016/17003143 dated Sep. 11, 2020, 5 pages.
First Examination Report for Indiana App. No. 201617007243 dated Dec. 16, 2019, 6 pages.
Indian First Examination Report for Indian App. No. 201317001026, dated Mar. 20, 2020, 6 pages.
First Examination Report for Indian App. No. 201617005271, sent Feb. 11, 2020.
Office Action dated Jan. 6, 2020, for U.S. Appl. No. 15/902,489, 22 pages.
Office Action dated Jul. 16, 2020 for U.S. Appl. No. 15/902,489, (pp. 1-20).
Office Action dated Aug. 31, 2020 for U.S. Appl. No. 16/356,423, (pp. 1-14).
Indian First Examination Report for Indian Patent App. No. 201617000386, dated Oct. 16, 2020, 7 pages.
International Search Report and Written Opinion, International Application No. PCT/US2016/020844, search completed Apr. 14, 2016.
International Search Report and Written Opinion, International Application No. PCT/US2016/020674, search completed Apr. 18, 2016.
Office Action dated Jun. 15, 2016 for U.S. Appl. No. 14/787,901.
International (PCT) Search Report for PCT/US16/20871, 20 pages.
International Search Report and Written Opinion dated Jan. 21, 2015, relating to International Application No. PCT/US2014/053665.
International Search Report and Written Opinion dated Jan. 27, 2015, relating to International Application No. PCT/US2014/53667.

(56) References Cited

OTHER PUBLICATIONS

International Search Report and Written Opinion dated Jul. 18, 2014, relating to International Application No. PCT/US2014/027551.
International Search Report dated Nov. 2, 2014, relating to International Application No. PCT/US2014/53666.
International Search Report dated Nov. 24, 2014, relating to International Application No. PCT/US2014/52606.
International Search Report dated Nov. 7, 2014, relating to International Application No. PCT/US2014/046518.
Office Action dated May 11, 2015 for U.S. Appl. No. 14/331,066.
International Preliminary Report on Patentability dated Mar. 1, 2016, relating to International Application No. PCT/US2014/053666.
International Preliminary Report on Patentability dated Mar. 1, 2016, relating to International Application No. PCT/US2014/053665.
International Preliminary Report on Patentability, dated Mar. 1, 2016, relating to International Application No. PCT/US2014/052606.
International Preliminary Report on Patentability, dated Mar. 1, 2016, relating to International Application No. PCT/US2014/053667.
English summary of Russian Office Action for Russian Patent Application Serial No. 2016104363, dated Jul. 5, 2016, 3 pages.
Chinese Office Action for Application Serial No. 201480021009.9, dated Jul. 5, 2016 including English language summary, 17 pages.
English Translation of JP404278340A which originally published Oct. 2, 1992, 23 pages.
Office Action dated Aug. 15, 2016 for U.S. Appl. No. 14/468,789.
Office Action dated Aug. 12, 2016 for U.S. Appl. No. 14/475,096.
Cheng et al., "Improving processability of polyethylenes by radiation-induced long-chain branching," Radiation Physics and Chemistry, 78 (2009) pp. 563-566.
European Search Report for European Application No. 14768125.8 sent Jul. 15, 2016, 8 pages.
US Office Action dated Sep. 15, 2016 for U.S. Appl. No. 15/239,894, 8 pages.
Typical Engineering Properties of Polypropylene information sheet, Ineos Olefins and Polymers USA, archived at https://web.archive.org/web/20160501000000*/http://www.ineos.com/globalassets/ineos-group/businesses/ineos-olefins-and-polymers-USA/products/technical-information—patents/ineos-engineering-properties-of-p.pdf, Mar. 2016, p. 1.
Office Action dated Dec. 14, 2016 for U.S. Appl. No. 14/211,553.
Australian Patent Examination Report for Australian App. No. 2014239318 issued on Nov. 25, 2016, 4 pages.
Chinese Office Action for Chinese App. No. 201480047976.2 received on Dec. 9, 2016, 11 pages.
Chinese Office Action for Chinese App. No. 201480047578.0 sent on Nov. 30, 2016, 10 pages.
Australian First Examination Report for Australian App. No. 2014311414 mailed Feb. 7, 2017, 3 pages.
Extended European Search Report for European App. No. 14823298.6 dated Jan. 25, 2017, 9 pages.
Office Action dated Feb. 16, 2017 for U.S. Appl. No. 15/239,894.
Chinese Office Action for Application Serial No. 201480021009.9, dated Jan. 22, 2017 including English language summary, 22 pages.
Chinese Office Action for Chinese App. No. 201480047978.1 received Feb. 20, 2017, 14 pages.
Office Action dated May 1, 2017 for U.S. Appl. No. 14/211,533.
Office Action dated Mar. 14, 2017 for U.S. Appl. No. 14/475,266.
Office Action dated Mar. 21, 2017 for U.S. Appl. No. 14/475,411.
Extended European Search Report for European App. No. 14840353.8 mailed Mar. 17, 2017, 6 pages.
Extended European Search Report for European App. No. 14838960.4 sent Mar. 17, 2017, 9 pages.
Extended European Search Report for European App. No. 14840262 sent on Mar. 23, 2017, 8 pages.
Extended European Search Report for European App. No. 14840734.9 mailed Apr. 4, 2017, 10 pages.
New Zealand Examination Report for New Zealand Patent App. No. 712687 mailed Mar. 30, 2017, 10 pages.
Office Action dated Apr. 21, 2017 for U.S. Appl. No. 14/475,411.
Taiwan Search Report for Taiwan Application No. 103109790 completed Apr. 20, 2017, 9 pages.
Australian Examination Report for Australian App. No. 2014286957 sent May 2, 2017, 3 pages.
Advisory Action dated Jun. 1, 2017 for U.S. Appl. No. 15/239,894; (pp. 1-6).
Office Action dated Jul. 10, 2017 for U.S. Appl. No. 15/239,894; (pp. 1-10).
Office Action dated Jul. 19, 2017 for U.S. Appl. No. 15/059,995; (pp. 1-10).
Chinese Office Action for Chinese App. No. 201480047578.0 sent on Jul. 4, 2017, 5 pages.
Chinese Office Action for Chinese App. No. 201480047978.1 received Jul. 21, 2017, 11 pages.
Unilever Launches Breakthrough Packaging Technology That Uses 15% Less Plastic, Unilever (Apr. 24, 2014), http:// www.unilever.com/mediacentre/pressreleases/2014/Unileverlaunchesbreakthroughpackagingtechnologythatuses15lessplastic.aspx (2 pages).
Extended European Search Report for European Patent App. No. EP21862640.6 received on Jul. 24, 2024, 6 pages.
Canadian Examiner's Report for Canadian App. No. 3013576 dated Aug. 15, 2024, 5 pages.

* cited by examiner

POLYMERIC MATERIAL FOR CONTAINER

PRIORITY CLAIM

This application is a continuation of U.S. Non-provisional application Ser. No. 15/902,489, filed Feb. 22, 2018, which is a continuation of U.S. Non-provisional application Ser. No. 15/059,995, filed Mar. 3, 2016, which claims priority under 35 U.S.C. § 119(e) to U.S. Provisional Application No. 62/128,195, filed Mar. 4, 2015, and U.S. Provisional Application No. 62/279,177, filed Jan. 15, 2016, each of which are expressly incorporated by reference herein.

BACKGROUND

The present disclosure relates to polymeric materials that can be formed to produce a container, and in particular, polymeric materials that insulate. More particularly, the present disclosure relates to polymer-based formulations that can produce an insulated non-aromatic polymeric material.

SUMMARY

According to the present disclosure, a polymeric material includes a polymeric resin and at least one cell-forming agent. In illustrative embodiments, a blend of polymeric resins and cell-forming agents is mixed and extruded or otherwise formed to produce an insulated cellular non-aromatic polymeric material. The insulated cellular non-aromatic polymeric material has a low density but is resistant to and/or can withstand impact forces. The low density, insulated cellular non-aromatic polymeric material can be used for improved containers.

In illustrative embodiments, an insulative cellular non-aromatic polymeric material comprises a cell-forming agent and at least one high-density polyethylene-based base resin. The cell-forming agent can include a chemical nucleating agent and a physical blowing agent. In an embodiment, a base resin can be HDPE, which can be virgin HDPE, regrind, or mixtures thereof.

In illustrative embodiments, the insulative cellular non-aromatic polymeric material has a density of less than about 0.9 grams per cubic centimeter. In illustrative embodiments, the insulative cellular non-aromatic polymeric material has a density in a range of about 0.1 grams per cubic centimeter to about 0.5 grams per cubic centimeter. In illustrative embodiments, the insulative cellular non-aromatic polymeric material has a density in a range of about 0.15 grams per cubic centimeter to about 0.4 grams per cubic centimeter. In illustrative embodiments, the insulative cellular non-aromatic polymeric material has a density of about 0.2 grams per cubic centimeter.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
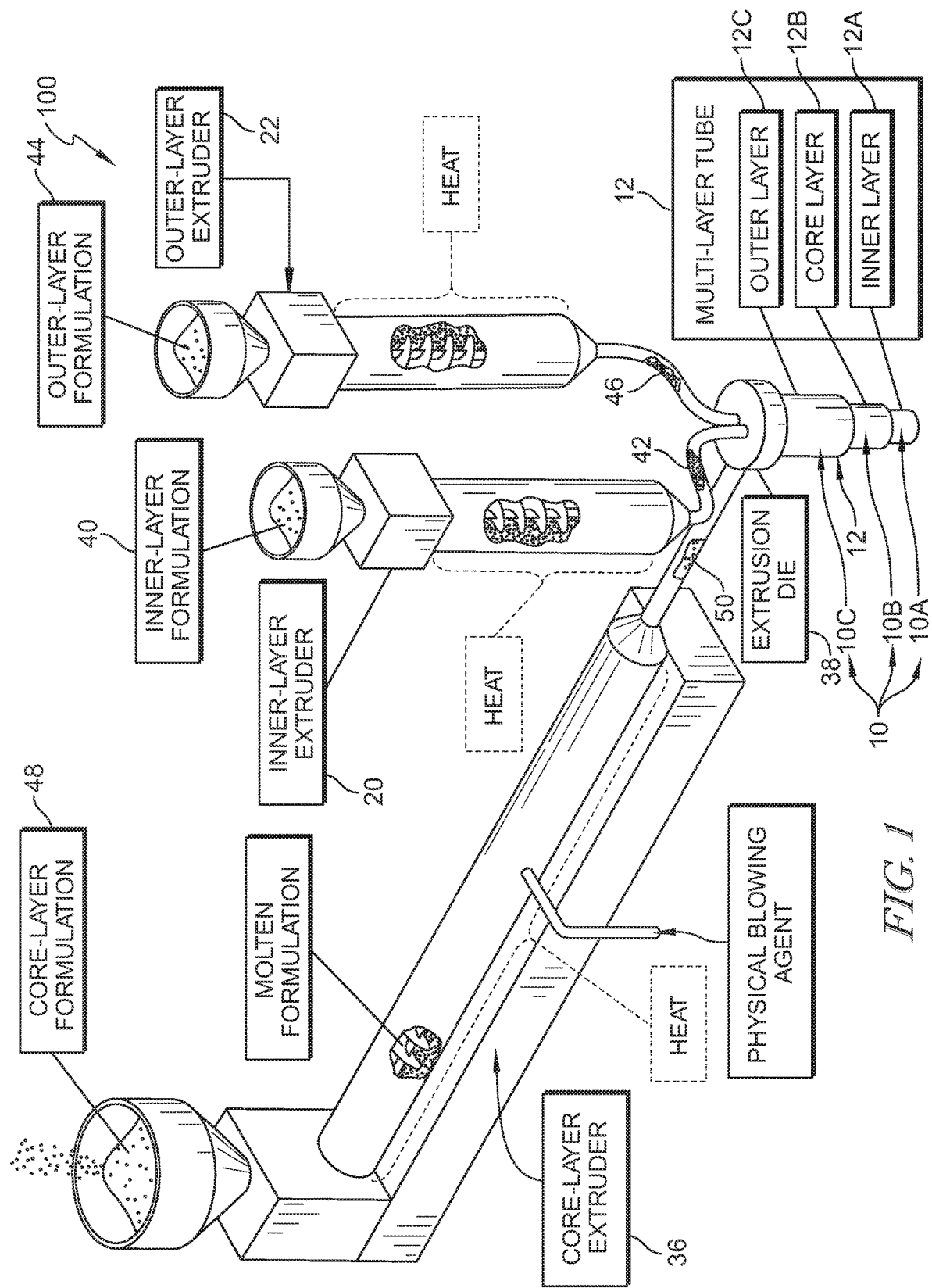
FIG. 1 is a perspective and diagrammatic view of the co-extrusion system used to prepare the insulative cellular non-aromatic polymeric material, showing that the co-extrusion system includes an outer-layer extruder configured to receive an outer-layer formulation and provide an outer-layer parison, an inner-layer extruder configured to receive an inner-layer formulation and provide an inner-layer parison, a core-layer extruder configured to receive a core-layer formulation and provide a core-layer parison, and a co-extrusion die coupled to each of the extruders to receive the associated parisons and configured to extrude the inner-layer, the core-layer, and the outer-layer parisons to establish a multi-layer tube.

A polymeric material 10 according to the present disclosure can be used to form insulative multi-layer containers 14, 214, 314 as shown for example, in FIGS. 1, 5, 7, and 8. As described herein, a core polymeric material 10B, sometimes called an insulative cellular non-aromatic polymeric material, includes at least one cell-forming agent and a polymeric resin (i.e., a thermoplastic polyolefin). To form core polymeric material 10B, a blend of polymeric resins and cell-forming agents are combined via blending and extruded, as shown for example as extrusion process 100 in FIG. 1. Polymeric material 10 can be co-extruded, as shown in FIG. 1, to form a multi-layer tube 12, which can then be blow molded to form insulative multi-layer containers 14, 214, 314.

Figure 2:
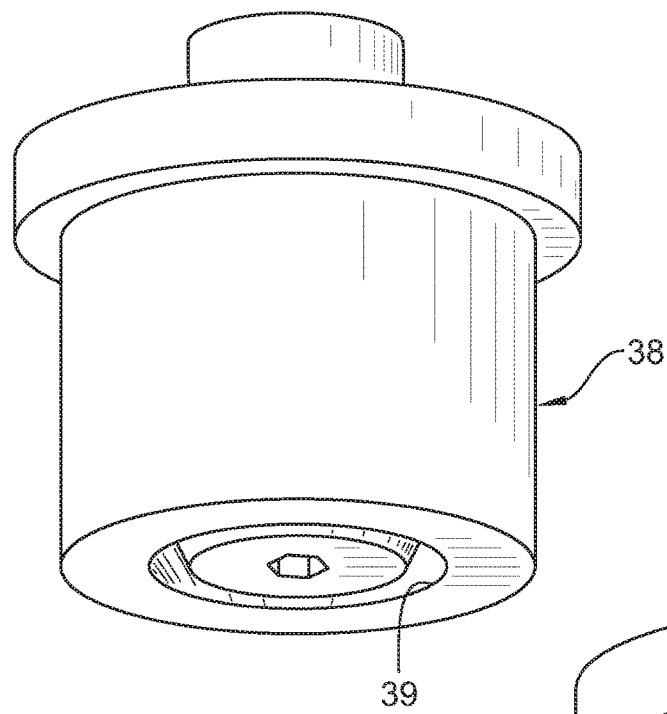
FIG. 2 is a partial perspective view taken from below the co-extrusion die of the co-extrusion system of FIG. 1 showing that the co-extrusion die includes an annular aperture configured to extrude the multi-layer tube.
Figure 3:
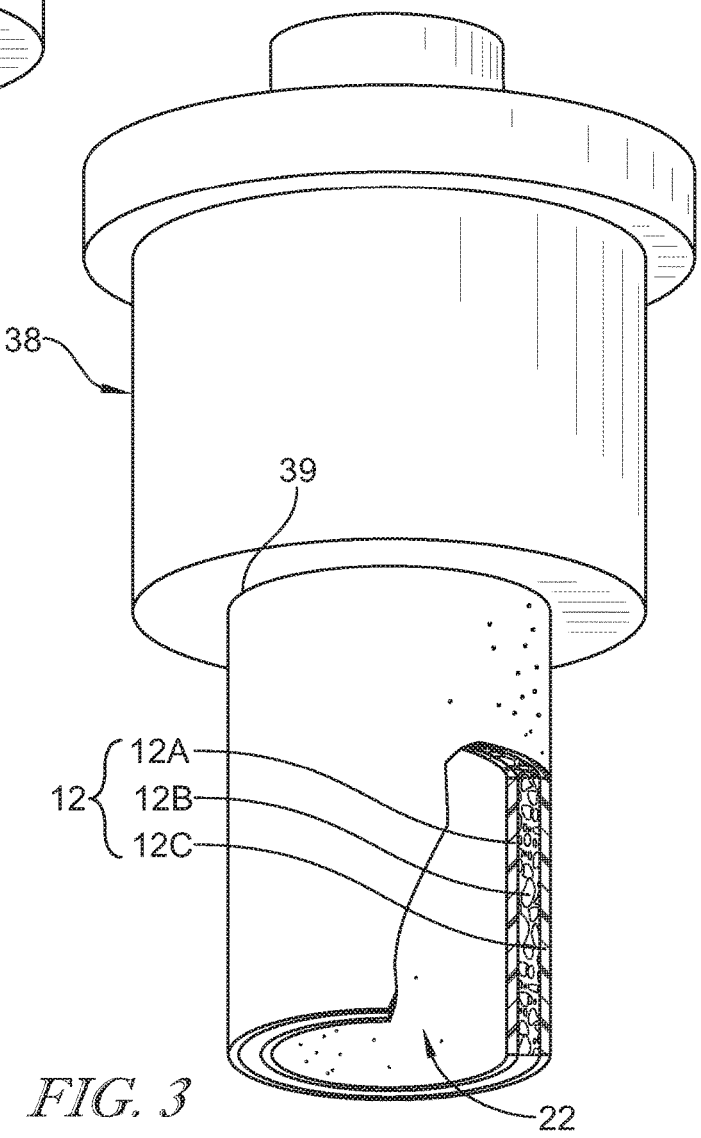
FIG. 3 is a view similar to FIG. 2 after co-extrusion of the insulative cellular non-aromatic polymeric material as a multi-layer tube has begun with portions of the multi-layer tube broken away to reveal that the inner layer is spaced apart from the outer layer and that the core layer is located therebetween.
Figure 6:
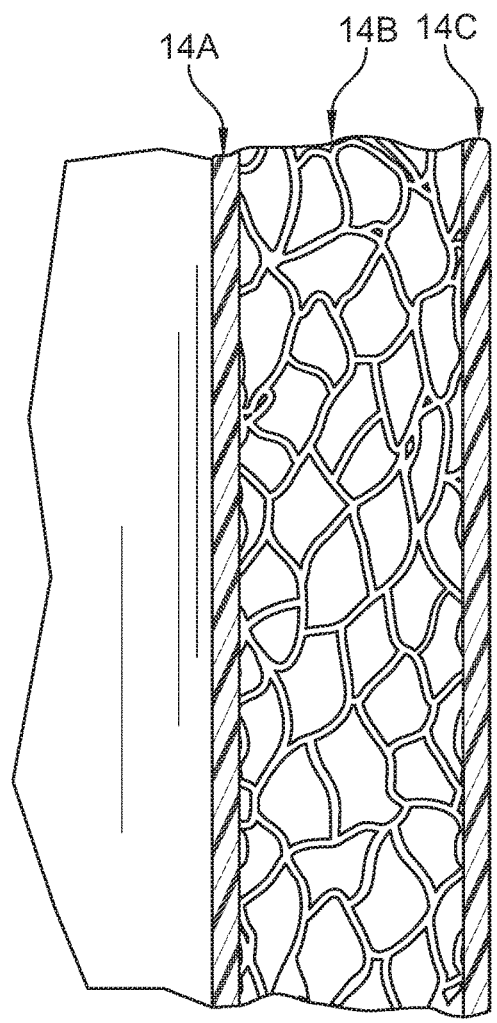
FIG. 6 is a sectional view taken along line 6-6 of FIG. 5 showing that the multi-layer container includes a side wall including the inner layer, the outer layer spaced apart from the inner layer, and a compressed core layer located therebetween and showing that some of the expanded cells have collapsed along the inner and outer layers to cause the compressed core layer to have a relatively greater density than the core layer of the multi-form tube.
Figure 7:
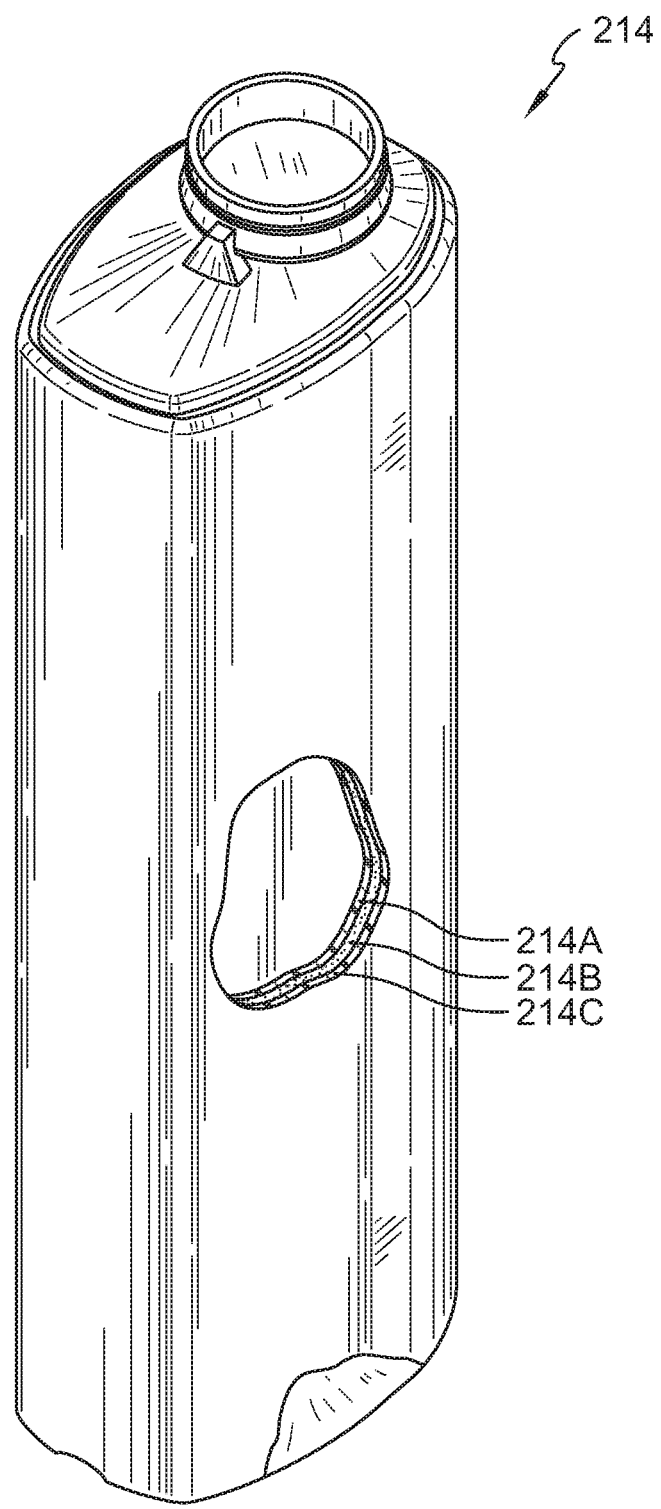
FIG. 7 is a perspective view of a multi-layer container made from insulative cellular non-aromatic material in accordance with the present disclosure with portions broken away to reveal that the multi-layer container includes an inner layer, a core layer, and an outer layer.

Co-extrusion process 100 can be used to form multi-layer tubes 12, sometimes called a parison, that include an inner layer 12A, a core layer 12B, and an outer layer 12C, each formed of a polymeric material 10A, 10B, 10C, as shown in FIG. 1. The molten formulations 42, 46, 50 for each of inner layer 12A, core layer 12B, and outer layer 12C pass through the extruders 20, 22, 36 to an annular extrusion die 38, as shown in FIGS. 1 and 3. The annular extrusion die 38 is configured to locate inner layer 12A around an interior space 23 and to locate core layer 12B between inner layer 12A and outer layer 12C through an annular aperture 39, as shown in FIG. 2. While three formulations are discussed herein, more or less formulations may be fed to associated extruders to produce a multiple layer tube having more or less layers. Reference is hereby made to U.S. patent application Ser. No. 14/475,411, filed Sep. 2, 2014 and titled MULTI-LAYER TUBE AND PROCESS OF MAKING THE SAME for disclosure relating to co-extrusion and multi-layer tube formation, which application is hereby incorporated in its entirety Multi-layer tube 12 can be blow molded to form multi-layer containers 14, 214, 314 as shown in FIGS. 5-8. As an example, multi-layer tube 12 can be inserted into a mold and have air forced into interior space 23 to cause the multi-layer tube 12 to expand to fit an interior surface of the mold. Throughout this process, the relative locations of polymeric material 10A, 10B, 10C of multi-layer tube 12 are maintained and form the inner layer 14A, core layer 14B, and outer layer 14C of multi-layer container 14 once blow molded, as shown in FIG. 6. Reference is hereby made to U.S. patent application Ser. No. 14/475,266, filed Sep. 2, 2014 and titled CONTAINER AND PROCESS FOR MAKING THE SAME for disclosure relating to container forming processes, which application is hereby incorporated in its entirety.

In one exemplary embodiment, polymeric material 10 comprises a formulation that includes at least one polymeric resin. The polymeric material 10 may include one or more base resins. As an example, core polymeric material 10B comprises at least one polyethylene base resin and one or more cell-forming agents. As described herein, the core polymeric material 10B may be called an insulative cellular non-aromatic polymeric material. Reference is hereby made to U.S. patent application Ser. No. 14/331,066, filed Jul. 14, 2014 and titled POLYMERIC MATERIAL FOR CONTAINER for disclosure relating to possible formulation options, which application is hereby incorporated in its entirety.

Cell-forming agents provide a means for decreasing the density of the polymeric material while maintaining advantageous physical properties. Cell-forming agents can be chemical agents, physical agents, or combinations of both. Cell-forming agents can be physical blowing agents, chemical blowing agents, or combinations of both. Cell-forming agents can include nucleating agents.

Insulative cellular material can be co-extruded with additional layers that have advantageous properties. For example, inner layer polymeric material 10A and outer-layer polymeric material 10C can contain a reinforcing fiber, a hardener, a color, or a combination thereof.

In one example, the base resin is high-density polyethylene (HDPE). A HDPE base resin can be a HDPE homopolymer or a HDPE copolymer. In another example, the base resin is a unimodal HDPE. In yet another example, the base resin is unimodal, high-melt strength HDPE. In still yet another example, the base resin is unimodal, high-melt strength HDPE such as DOW® DOWLEX™ IP 41 HDPE (available from The Dow Chemical Company) that has been electron-beam modified to provide long-chain branching and a melt index of about 0.25 g/10 min. Another example of a unimodal, high-melt strength HDPE is EQUISTAR® ALATHON® H5520 HDPE copolymer (available from Lyondell Chemical Company) that has been electron-beam modified to have long-chain branching and a melt index of about 0.25 g/10 min. Another example of a suitable unimodal HDPE is FORMOLENE® HB5502F HDPE hexene copolymer (available from Formosa Plastics Corporation). In another suitable embodiment of a HDPE hexene copolymer, the HDPE is Marlex® HHM 5502BN HDPE hexene copolymer (Chevron Phillips Chemical Company, The Woodlands, TX). In some embodiments, the HDPE has a melt index from about 0.1 g/10 min to about 0.4 g/10 min. In an example the HDPE has a melt index between 0.7 g/10 min and 0.9 g/10 min. In another example, the HDPE resin is DOW DMDA 6400 NT7.

Long-chain branching refers to the presence of polymer side chains (branches) that have a length that is comparable or greater than a length of the backbone which is coupled to the polymer side chains. Long-chain branching creates viscoelastic chain entanglements (polymer entanglements) that hamper flow during extensional or oriented stretching and provide for a strain hardening phenomenon.

The strain hardening phenomenon may be observed through two analytical methods. The first analytical method used to observe the presence of strain hardening on an extensional rheometer. During extensional or oriented flow on an extensional rheometer, strain hardening will occur when polymer entanglements do not allow the polymer to flow under Linear Viscoelastic (LVE) conditions. As a result, these polymer entanglements hamper flow and create a deviation from the LVE conditions as observed as a hook formation. The strain hardening phenomenon becomes more severe as strain and strain rate increase due to faster and more severe polymer chain entanglement motion. Virgin polymers without long-chain branching will exhibit LVE flow characteristics. In comparison, long-chain branched polymers will exhibit strain hardening and which causes a deviation from the LVE flow characteristics of the virgin polymer providing the hook formation under the same test conditions.

The second analytical method used to observe the presence of long-chain branching is evaluating melt strength data as tested per ISO 16790 which is incorporated by reference herein in its entirety. An amount of melt strength is known to be directly related to the presence of long-chain branching when compared to similar virgin polymers lacking long-chain branching. By way of example, Borealis DAPLOY™ WB140HMS Polypropylene (PP) (available from Borealis AG) is compared to other polymers having similar molecular weight, polydispersity index, and other physical characteristics. The DAPLOY™ WB140HMS PP has a melt strength which exceeds about 36 cN while other similar PP resins lacking long-chain branching have a melt strength of less than about 10 cN.

Melt flow index (MFI) is an indirect measure of the viscosity of a polymer when molten. The index is defined as the mass of polymer melt that will flow through a capillary of a specific diameter and length by a pressure applied in 10 minutes, as described in ASTM D1238. For example, the Marlex® HHM 5502BN HDPE hexene copolymer (Chevron Phillips) has a melt flow index of 0.35 g/10 min per ASTM D1238. A larger melt index value indicates a lower viscosity. Higher molecular weight polymers will be more viscous and less will flow under the same conditions so the melt index will be a smaller number.

In certain exemplary embodiments, the formulation may include two base resins that are HDPE. In some embodiments the HDPE base resin may include multiple HDPE resins. One illustrative example of the formulation includes a first base resin of FORMOLENE® HB5502F HDPE hexene copolymer (available from Formosa Plastics Corporation) and a second base resin of EQUISTAR® ALATHON® H5520 HDPE copolymer (available from Lyondell Chemical Company). In embodiments with more than one HDPE copolymer, different HDPE copolymers can be used depending on the attributes desired in the formulation. For example, a formulation may include both electron-beam modified EQUISTAR® ALATHON® H5520 and FORMOLENE® HB5502F HDPE. In such an embodiment, the EQUISTAR® ALATHON® H5520 provides higher melt strength which increases foaming potential, and has less flexural modulus or brittleness. The FORMOLENE® HB5502F HDPE provides wide unimodal polydispersity index of the molecular weight distribution and maximizes economic advantage.

In another example, a formulation includes about 50% electron-beam modified EQUISTAR® ALATHON® H5520 and about 50% FORMOLENE® HB5502F HDPE. The combination provides a material having drop resistance capability associated with a non-modified HDPE resin and increased melt strength of an electron-beam modified long-chain branched HDPE. Depending on the desired characteristics, the percentage of the HDPE base resin between the two HDPE base resins may be varied, e.g., 25%/75%, 30%/70%, 35%/65%, 40%/60%, 45%/55%, 50%/50%, etc., by weight of the base resins. In an embodiment, a formulation includes three HDPE base resins. Again, depending on the desired characteristics, the percentage of three HDPE copolymers can be varied, 33%/33%/33%, 30%/30%/40%, 25%/25%/50%, etc., by weight of the base resins.

In certain exemplary embodiments, the formulation may include two base resins wherein the first base resin is an HDPE resin and the second base resin is a Low-Density Polyethylene (LDPE). In an example the LDPE resin has a melt index between 0.7 g/10 min and 0.9 g/10 min as measured by ASTM D1238. In another example, the LDPE resin is DOW™ LDPE 692 LDPE HEALTH+™ available from The Dow Chemical Company®.

In certain exemplary embodiments, the formulation may include two base resins wherein the first base resin is an HDPE resin and the second base resin is a Low-Density Polyethylene (LDPE) resin. Without being bound by theory, LDPE may be added to improve the compression resistance of the core layer during container-molding process 100. In an example the HDPE has a melt index between 0.7 g/10 min and 0.9 g/10 min. In another example, the HDPE resin is DOW DMDA 6400 NT7. In an example the LDPE resin has a melt index between 0.7 g/10 min and 0.9 g/10 min as measured by ASTM D1238. In another example, the LDPE resin is DOW™ LDPE 692 LDPE HEALTH+™ available from The Dow Chemical Company®.

In an illustrative example, the formulation comprises a blend of a certain percentage by weight of an HDPE resin and the remainder of the blend is an LDPE resin. In embodiments described herein, the percentage amount of HDPE in the blend may be 100%, 90%, 80%, 70%, 60%, 50%, 40%, 30%, 20%, 10% or 0 and the remainder of the blend is LDPE. It is within the present disclosure for the amount of HDPE in the blend to fall within one of many different ranges. In a set of ranges, the amount of HDPE in the blend can be about 0% to about 100%, about 20% to about 100%, about 40% to about 100%, about 60% to about 100%, about 70% to about 100%, about 80% to about 100%, about 80% to about 95%, and about 85% to about 95% of the blend. Polymeric material as disclosed herein includes at least one base resin. In illustrative embodiments, the at least one base resin can be HDPE. The amount of a base resin may be one of several different values or fall within one of several different ranges. It is within the scope of the present disclosure to select an amount of base resin to be one of the following values: about 20%, about 25%, about 30%, about 35%, about 40%, about 45%, about 50%, about 55%, about 60%, about 65%, about 70%, about 75%, about 80%, about 85%, about 86%, about 87%, about 88%, about 89%, about 90%, about 91%, about 92%, about 93%, about 94%, about 95%, about 96%, about 97%, about 98%, about 99%, about 99.5%, about 99.9%, and about 100% of the total formulation of the polymeric layer by weight percentage. It is within the present disclosure for the amount of base resin in the formulation to fall within one of many different ranges. In a first set of ranges, the range of base resin is one of the following ranges: about 20% to about 99.9%, about 25% to about 99.9%, about 50% to about 99.9%, about 85% to about 99.9%, about 90% to about 99.9%, about 95% to about 99.9%, about 98% to about 99.9%, and about 99% to about 99.9% of the total formulation of the polymeric layer by weight percentage. In a second set of ranges, the range of base resin is one of the following ranges: about 85% to about 99%, about 85% to about 98%, about 85% to about 95%, and about 85% to about 90% of the total formulation of the polymeric layer by weight percentage. In a third set of ranges, the range of base resin is one of the following ranges: about 90% to about 99%, and about 95% to about 98% of the total formulation by weight percentage. Each of these values and ranges is embodied in Examples 1 to 33.

In some embodiments, the core-layer formulation comprises an impact modifier to improve the performance of the container. In an embodiment the core-layer formulation comprises about 5% of an impact modifier. In some embodiments, the core-layer formulation comprises Vistamaxx™ available from the ExxonMobil™ Corporation.

In an embodiment, the base resin can be 100% virgin base resin. In an embodiment, the base resin can be a mixture of virgin base resin and regrind base resin. For example, the base resin can be about 100%, about 90%, about 80%, about 75%, about 70%, about 60%, about 50%, about 40%, about 30%, about 25%, about 20%, or about 10% virgin base resin with the remainder being a regrind. In an exemplary embodiment, the base resin is about 50% virgin HDPE and about 50% regrind.

In some embodiments, the HDPE base resin comprises up to about 90% regrind, up to about 80% regrind, up to about 60% regrind, up to about 40% regrind, up to about 20% regrind, about 20% to about 90% regrind, about 30% to about 90% regrind, about 40% to about 90% regrind, about 50% to about 90% regrind, about 20% to about 75% regrind, about 30% to about 75% regrind, about 40% to about 75% regrind, about 50% to about 75% regrind, about 20% to about 60% regrind, about 30% to about 60% regrind, about 40% to about 60% regrind, or about 50% to about 60% regrind. The regrind may be first pass regrind, second pass regrind, third pass regrind, and the like.

The term polymeric layer refers to a polymeric monolayer, a polymeric core layer in a multi-layer material, or a non-core polymeric layer in a multi-layer material.

The formulation used to produce the insulative cellular non-aromatic polymeric material may further include one or more cell-forming agents. Cell-forming agents include nucleating agents and blowing agents. A nucleating agent is used to provide and control nucleation sites within a molten formulation to promote formation of cells, bubbles, or voids in the molten formulation during extrusion. A blowing agent is used to grow cells in the molten material at nucleation sites. Blowing agents may be used alone in the formulation or with nucleating agents.

Nucleating agent means a chemical or physical agent that provides sites for cells to form in a molten material. Nucleating agents may include chemical nucleating agents and physical nucleating agents. The nucleating agent may be blended with the formulation that is introduced into the hopper of the extruder. Alternatively, the nucleating agent may be added to the molten resin mixture in the extruder.

Formulations used to produce insulative cellular non-aromatic polymeric materials may include one or more cell-forming agents. The amount of a nucleating agent may be one of several different values or fall within one of several different ranges. It is within the scope of the present disclosure to select an amount of a nucleating agent to be one of the following values: about 0%, about 0.05%, about 0.1%, about 0.2%, about 0.3%, about 0.5%, about 1%, about 1.5%, about 2%, about 3%, about 4%, about 5%, about 6%, about 7%, about 8%, about 9%, about 10%, about 11%, about 12%, about 13%, about 14%, and about 15%, of the total formulation of the polymeric layer by weight percentage. It is within the scope of the present disclosure for the amount of a nucleating agent in the formulation to fall within one of many different ranges. In a first set of ranges, the percentage (w/w) range of a nucleating agent is one of the following ranges: about 0% to about 15%, about 0.05% to about 15%, about 0.1% to about 15%, about 0.25% to about 15%, about 0.5% to about 15%, about 0.75% to about 15%, about 1% to about 15%, about 2% to about 15%, about 3% to about 15%, about 4% to about 15%, and about 5% to about 15% of the total formulation of the polymeric layer by weight percentage. In a second set of ranges, the percentage (w/w) range of a nucleating agent is one of the following ranges: about 0.05% to about 10%, about 0.1% to about 10%, about 0.25% to about 10%, about 0.5% to about 10%, about 0.75% to about 10%, about 1% to about 10%, about 2% to about 10%, about 3% to about 10%, about 4% to about 10%, and about 5% to about 10% of the total formulation of the polymeric layer by weight percentage. In a third set of ranges, the percentage (w/w) range of a nucleating agent is one of the following ranges: about 0.05% to about 5%, about 0.1% to about 5%, about 0.25% to about 5%, about 0.5% to about 5%, about 0.75% to about 5%, about 1% to about 5%, about 1.5% to about 5%, about 2% to about 5%, about 2.5% to about 5%, about 3% to about 5%, about 3.5% to about 5%, about 4% to about 5%, and about 4.5% to about 5% of the total formulation of the polymeric layer by weight percentage.

Suitable physical nucleating agents have desirable particle size, aspect ratio, and top-cut properties. Examples include, but are not limited to, talc, $CaCO_3$, mica, and mixtures of at least two of the foregoing. One representative example is Heritage Plastics HT6000 Linear Low Density Polyethylene (LLDPE) Based Talc Concentrate.

Formulations used to produce insulative cellular non-aromatic polymeric materials may include one or more cell-forming agents. The amount of a physical nucleating agent may be one of several different values or fall within one of several different ranges. It is within the scope of the present disclosure to select an amount of physical nucleating agent, such as talc, to be one of the following values: about 0%, about 0.05%, about 0.1%, about 0.3%, about 0.5%, about 1%, about 2%, about 3%, about 4%, about 5%, about 6%, and about 7% of the total formulation of the polymeric layer by weight percentage. It is within the scope of the present disclosure for the amount of a physical nucleating agent in the formulation to fall within one of many different ranges. In a first set of ranges, the range of a physical nucleating agent is one of the following ranges: about 0% to about 7% (w/w), about 0.1% to about 7%, about 0.25% to about 7%, about 0.5% to about 7%, about 0.75% to about 7%, about 1.0% to about 7%, about 1.25% to about 7%, about 1.5% to about 7%, about 1.75% to about 7%, about 2.0% to about 7%, about 2.25% to about 7%, about 2.5% to about 7%, about 3% to about 7%, about 4% to about 7%, about 5% to about 7%, and about 6% to about 7% of the total formulation of the polymeric layer. In a second set of ranges, the range of a physical nucleating agent is one of the following ranges: about 0% to about 6%, about 0% to about 5%, about 0% to about 4%, about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation of the polymeric layer. In a third set of ranges, the range of a physical nucleating agent is one of the following ranges: about 0.1% to about 6%, about 0.5% to about 5%, about 1% to about 4%, and about 2% to about 3% of the total formulation of the polymeric layer. In an embodiment, the formulation lacks talc.

Suitable chemical nucleating agents decompose to create cells in the molten formulation when a chemical reaction temperature is reached. These small cells act as nucleation sites for larger cell growth from a physical or other type of blowing agent. In one example, the chemical nucleating agent is citric acid or a citric acid-based material. One representative example is HYDROCEROL™ CF-40E (available from Clariant Corporation), which contains citric acid and a crystal nucleating agent.

Formulations used to produce insulative cellular non-aromatic polymeric materials can include a chemical nucleating agent. The amount of a chemical nucleating agent may be one of several different values or fall within one of several different ranges. It is within the scope of the present disclosure to select an amount of a chemical nucleating agent and be one of the following values: about 0.1%, about 0.25%, about 0.5%, about 0.75%, about 1%, about 1.5%, about 2%, about 2.5%, about 3%, about 3.5%, about 4%, about 5%, 1 about 0%, and about 15% of the total formulation by weight percentage. It is within the scope of the present disclosure for the amount of a chemical nucleating agent in the formulation to fall within one of many different ranges. In a first set of ranges, the range of a chemical nucleating agent is one of the following ranges: about 0.1% to about 15%, about 0.25% to about 15%, about 0.5% to about 15%, about 1% to about 15%, about 1.5% to about 15%, about 2% to 1 about 5%, about 2.5% to about 15%, about 3% to about 15%, about 3.5% to about 15%, about 4% to about 15%, about 4.5% to about 15%, and about 5% to about 15% of the total formulation by weight percentage. In a second set of ranges, the range of a chemical nucleating agent is one of the following ranges: about 0.1% to about 10%, about 0.25% to about 10%, about 0.5% to about 10%, about 0.75% to about 10%, about 1% to about 10%, about 1.5% to about 10%, about 2% to about 10%, about 2.5% to about 10%, about 3% to about 10%, about 3.5% to about 10%, about 4% to about 10%, about 4.5% to about 10%, and about 5% to about 10% of the total formulation by weight percentage. In a third set of ranges, the range of a chemical nucleating agent is one of the following ranges: about 0.1% to about 5%, about 0.25% to about 5%, about 0.5% to about 5%, about 0.75% to about 5%, about 1% to about 5%, about 1.5% to about 5%, about 2% to about 5%, about 2.5% to about 5%, about 3% to about 5%, about 3.5% to about 5%, about 4% to about 5%, and about 4.5% to about 5% of the total formulation by weight percentage. Each of these values and ranges is embodied in the Examples.

A blowing agent refers to a physical or a chemical material (or combination of materials) that acts to expand nucleation sites. Blowing agents may include only chemical blowing agents, only physical blowing agents, combinations thereof, or several types of chemical and physical blowing agents. The blowing agent acts to reduce density by forming cells in the molten formulation at the nucleation sites. The blowing agent may be added to the molten resin mixture in the extruder.

Chemical blowing agents are materials that degrade or react to produce a gas. Chemical blowing agents may be endothermic or exothermic. Chemical blowing agents typically degrade at a certain temperature to decompose and release gas. One example of a chemical blowing agent is citric acid or citric-based material. One representative example is HYDROCEROL™ CF-40E (available from Clariant Corporation), which contains citric acid and a crystal nucleating agent. Here, the citric acid decomposes at the appropriate temperature in the molten formulation and forms a gas which migrates toward the nucleation sites and grows cells in the molten formulation. If sufficient chemical blowing agent is present, the chemical blowing agent may act as both the nucleating agent and the blowing agent. However, a chemical blowing agent does not always act as a nucleating agent.

In another example, chemical blowing agents may be selected from the group consisting of azodicarbonamide; azodiisobutyro-nitrile; benzenesulfonhydrazide; 4,4-oxybenzene sulfonylsemicarbazide; citric acid; citric-based material; p-toluene sulfonyl semi-carbazide; barium azodicarboxylate; N,N'-dimethyl-N,N'-dinitrosoterephthalamide; trihydrazino triazine; methane; ethane; propane; n-butane; isobutane; n-pentane; isopentane; neopentane; methyl fluoride; perfluoromethane; ethyl fluoride; 1,1-difluoroethane; 1,1,1-trifluoroethane; 1,1,1,2-tetrafluoroethane; pentafluoroethane; perfluoroethane; 2,2-difluoropropane; 1,1,1-trifluoropropane; perfluoropropane; perfluorobutane; perfluorocyclobutane; methyl chloride; methylene chloride; ethyl chloride; 1,1,1-trichloroethane; 1,1-dichloro-1-fluoroethane; 1-chloro-1,1-difluoroethane; 1,1-dichloro-2,2,2-trifluoroethane; 1-chloro-1,2,2,2-tetrafluoroethane; trichloromonofluoromethane; dichlorodifluoromethane; trichlorotrifluoroethane; dichlorotetrafluoroethane; chloroheptafluoropropane; dichlorohexafluoropropane; methanol; ethanol; n-propanol; isopropanol; sodium bicarbonate; sodium carbonate; ammonium bicarbonate; ammonium carbonate; ammonium nitrite; N,N'-dimethyl-N,N'-dinitrosoterephthalamide; N,N'-dinitrosopentamethylene tetramine; azodicarbonamide; azobisisobutylonitrile; azocyclohexylnitrile; azodiaminobenzene; bariumazodicarboxylate; benzene sulfonyl hydrazide; toluene sulfonyl hydrazide; p,p'-oxybis(benzene sulfonyl hydrazide); diphenyl sulfone-3,3'-disulfonyl hydrazide; calcium azide; 4,4'-diphenyl disulfonyl azide; p-toluene sulfonyl azide, and combinations thereof.

In one aspect of the present disclosure, where a chemical blowing agent is used, the chemical blowing agent may be introduced into the material formulation that is added to the hopper.

Formulations used to produce insulative cellular non-aromatic polymeric materials may include one or more chemical blowing agents. The amount of a chemical blowing agent may be one of several different values or fall within one of several different ranges. It is within the scope of the present disclosure to select an amount of a chemical blowing agent to be one of the following values: about 0%, about 0.05%, about 0.1%, about 0.5%, about 0.75%, about 1%, about 1.5%, about 2%, about 3%, about 4%, and about 5%, of the total formulation of the polymeric layer by weight percentage. It is within the scope of the present disclosure for the amount of a chemical blowing agent in the formulation to fall within one of many different ranges. In a first set of ranges, the range of a chemical blowing agent is one of the following ranges: about 0.1% to about 5% (w/w), about 0.25% to about 5%, about 0.5% to about 5%, about 0.75% to about 5%, about 1% to about 5%, about 1.5% to about 5%, and about 2% to 5 about % of the total formulation of the polymeric layer by weight percentage. In a second set of ranges, the range of a chemical blowing agent is one of the following ranges: about 0.1% to about 2%, about 0.1% to about 3%, about 0.25% to about 2%, about 0.5% to about 2%, about 0.75% to about 2%, about 1% to about 2%, and about 1.5% to about 2% of the total formulation by weight percentage. In a third set of ranges, the range of a chemical blowing agent is one of the following ranges: about 0.1% to about 1%, about 0.25% to about 1%, about 0.5% to about 1%, and about 0.75% to about 1%, of the total formulation of the polymeric layer by weight percentage.

One example of a physical blowing agent is nitrogen ($N_2$). The $N_2$ is pumped into the molten formulation via a port in the extruder as a supercritical fluid. The molten material with the $N_2$ in suspension then exits the extruder via a die where a pressure drop occurs. As the pressure drop happens, $N_2$ moves out of suspension toward the nucleation sites where cells grow. Excess gas blows off after extrusion with the remaining gas trapped in the cells formed in the extrudate. Other suitable examples of physical blowing agents include, but are not limited to, carbon dioxide ($CO_2$), helium, argon, air, pentane, butane, or other alkane mixtures of the foregoing and the like.

In an illustrative example, a physical blowing agent may be introduced at a rate of about 0.02 pounds per hour (lbs/h) to about 1.3 (lbs/h). In another illustrative example, the physical blowing agent may be introduced at a rate of about 0.03 (lbs/h) to about 1.25 (lbs/h). In another illustrative example, the physical blowing agent may be introduced at a rate of about 0.02 (lbs/h) to about 0.15 (lbs/h). In another illustrative example, the physical blowing agent may be introduced at a rate of about 0 (lbs/h) to about 0.15 (lbs/h). In another illustrative example, the physical blowing agent may be introduced at a rate of about 0.02 (lbs/h) to about 0.22 (lbs/h). In another illustrative example, the physical blowing agent may be introduced at a rate of about 0.02 (lbs/h) to about 0.25 (lbs/h). In still yet another illustrative example the physical blowing agent may be introduced at a rate of about 0.07 (lbs/h) to about 0.27 (lbs/h). In some embodiments, the physical blowing agent is used between about 0.01 lbs/h to about 0.2 lbs/h, about 0.01 lbs/h to about 0.17 lbs/h, about 0.01 lbs/h to about 0.15 lbs/h, about 0.01 lbs/h to about 0.1 lbs/h, about 0.05 lbs/h to about 0.2 lbs/h, about 0.05 lbs/h to about 0.17 lbs/h, about 0.05 lbs/h to about 0.15 lbs/h, about 0.05 lbs/h to about 0.1 lbs/h, about 0.1 lbs/h to about 0.2 lbs/h, about 0.1 lbs/h to about 0.17 lbs/h, or about 0.1 lbs/h to about 0.15 lbs/h.

In further embodiments, the physical blowing agent is measured in saturation percentage (%). In exemplary embodiments, physical blowing agent saturation can have a range that is about 0.1% to about 0.4%, about 0.1% to about 0.35%, about 0.1% to about 0.3%, about 0.1% to about 0.25%, 0.15% to about 0.4%, about 0.15% to about 0.35%, about 0.15% to about 0.3%, about 0.15% to about 0.25%, 0.2% to about 0.4%, about 0.2% to about 0.35%, about 0.2% to about 0.3%, or about 0.2% to about 0.25%.

In one aspect of the present disclosure, at least one slip agent may be incorporated into the formulation to aid in increasing production rates. Slip agent (also known as a process aid) is a term used to describe a general class of materials that is added to a formulation to provide surface lubrication to the polymer during and after conversion. Slip agents may also reduce or eliminate die drool. Representative examples of slip agents include amides of fats or fatty acids, such as, but not limited to, erucamide and oleamide. In one exemplary aspect, amides from oleyl (single unsaturated C-18) through erucyl (C-22 single unsaturated) may be used. Other representative examples of a slip agent include low molecular weight amides and fluoroelastomers. Combinations of two or more slip agents can be used. Slip agents may be provided in a master batch pellet form and blended with the resin formulation. One example of a suitable slip agent is Ampacet 102823 Process Aid PE MB LLDPE.

Formulations used to produce insulative cellular non-aromatic polymeric materials may include one or more slip agents. The amount of a slip agent may be one of several different values or fall within one of several different ranges. It is within the scope of the present disclosure to select an amount of a slip agent to be one of the following values: about 0%, about 0.1%, about 0.25%, about 0.5%, about 0.75%, about 1%, about 1.25%, about 1.5%, about 1.75%, about 2%, about 2.25%, about 2.5%, about 2.75%, about 3%, and about 4% of the total formulation of the polymeric layer by weight percentage. It is within the scope of the present disclosure for the amount of a slip agent in the formulation to fall within one of many different ranges. In a first set of ranges, the range of a slip agent is one of the following ranges: about 0% to about 4% (w/w), about 0.1% to about 4%, about 0.25% to about 4%, about 0.5% to about 4%, about 0.75% to about 4%, about 1% to about 4%, about 1.25% to about 4%, about 1.5% to about 4%, about 1.75% to about 4%, about 2% to about 4%, about 2.25% to about 4%, and about 2.5% to about 4% of the total formulation of the polymeric layer by weight percentage. In a second set of ranges, the range of a slip agent is one of the following ranges: about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation of the polymeric layer by weight percentage. In a third set of ranges, the range of a slip agent is one of the following ranges: about 0.1% to about 2.5%, about 0.25% to about 2.25%, about 0.5% to about 2%, about 0.75%, to about 1.75%, and 1 about % to about 1.5% of the total formulation by weight percentage. In an embodiment, the formulation lacks a slip agent.

In another aspect of the present disclosure, an impact modifier may be incorporated into a formulation to minimize fracturing of the insulative cellular non-aromatic polymeric material when subjected to an impact such as a drop test. One representative example of a suitable impact modifier is DOW® AFFINITY™ PL 1880G polyolefin plastomer.

Formulations used to produce insulative cellular non-aromatic polymeric materials may include one or more colorants. The colorants can be supplied in a masterbatch mixture and combined via blending with the formulation. In an example, Ampacet 112761 White Polyethylene Masterbatch is used as a colorant. The amount of a colorant may be one of several different values or fall within one of several different ranges. It is within the scope of the present disclosure to select an amount of a colorant to be one of the following values: about 0%, about 0.1%, about 0.25%, about 0.5%, about 0.75%, about 1%, about 2%, about 3%, about 4% about 5%, about 6%, and about 7% of the total formulation of the polymeric layer by weight percentage. It is within the scope of the present disclosure for the amount of a colorant in the formulation to fall within one of many different ranges. In a first set of ranges, the range of a colorant is one of the following ranges: about 0% to about 5% (w/w), about 0.1% to about 5%, about 0.25% to about 5%, about 0.5% to about 5%, about 0.75% to about 5%, about 1% to about 5%, about 1.25% to about 5%, about 1.5% to about 5%, about 1.75% to about 5%, about 2% to about 5%, about 2.25% to about 5%, about 2.5% to about 5%, about 3% to about 5%, and about 4% to about 5% of the total formulation of the polymeric layer by weight percentage. In a second set of ranges, the range of a colorant is one of the following ranges: about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation of the polymeric layer by weight percentage. In a third set of ranges, the range of a colorant is one of the following ranges: about 0.1% to about 3.5%, about 0.5% to about 3%, about 0.75% to about 2.5%, and about 1% to about 2% of the total formulation by weight percentage. In an embodiment, the formulation lacks a colorant.

A material-formulation process in accordance with the present disclosure uses a polyethylene-based formulation to produce a strip of insulative cellular non-aromatic polymeric material. Raw material according to the polyethylene-based material is gravity fed into the barrel of an extruder where it is heated to produce a molten material. A cell-forming agent is then introduced into the molten material prior to extrusion. As the molten materials exit the extruder, cells nucleate in the molten material, and the molten material expands and cools to form a sheet of insulative cellular non-aromatic polymeric material.

An insulative cellular non-aromatic polymeric material produced in accordance with the present disclosure can be formed to produce an insulative cup or an insulative container. In another illustrative example, the insulative cellular non-aromatic polymeric material produces a monolayer tube or monolayer parison that is blow molded to form an insulative container (e.g., bottle). In an embodiment, a monolayer foamed bottle further includes an extruded second layer (i.e., skin layer). In illustrative embodiments, a second layer can be linear low density polyethylene (LLDPE), low density polyethylene (LDPE), medium density polyethylene (MDPE), high density polyethylene (HDPE), polypropylene homopolymer, polypropylene impact copolymer, polypropylene random polymer, polystyrene, polyethylene terephthalate (PET), or polyvinyl chloride (PVC).

In an example, multi-layer container 14, 214, 314 includes a core layer 14B and at least one non-core layer. In an illustrative example, a core layer 14B is sandwiched between an inner polymeric layer 14A and an outer polymeric layer 14C. In an example, each layer (core and non-core layers) of multi-layer container 14, 214, 314 includes at least one HDPE base resin. In an embodiment, a non-core layer can include fiber. A suitable fiber can be a synthetic fiber that reinforces polyolefin formulations to provide, e.g., higher stiffness to the material and better feeding and handling during extrusion or blow molding process. A suitable fiber for a polymeric layer includes a synthetic, mineral based fiber, such as Hyperform® HPR- 803i (Milliken & Co., Spartanburg, SC). Another suitable fiber blend contains about 15% Hyperform® HPR-803i (available from Milliken Chemical) and about 85% Braskem F020HC High Crystallinity Polypropylene (available from Braskem). In an embodiment, one or more non-core polymeric layers includes fiber. In an illustrative embodiment, a multi-layer container has fiber in an outer polymeric layer but an inner polymeric layer does not include fiber.

The amount of fiber may be one of several different values or fall within one of several different ranges. It is within the scope of the present disclosure to select an amount of fiber to be one of the following values: about 5%, about 10%, about 15%, about 20%, and about 25% of the layer by weight percentage. It is within the scope of the present disclosure for the amount of fiber in the layer to fall within one of many different ranges. In a first set of ranges, the range of fiber is one of the following ranges: about 0% to about 25% (w/w), about 5% to about 25%, about 10% to about 25%, about 15% to about 25%, and about 20% to about 25 of the total layer by weight percentage. In a second set of ranges, the range of fiber is one of the following ranges: about 0% to about 25%, about 0% to about 20%, about 0% to about 15%, about 0% to about 10%, and about 0% to about 5% of the total layer by weight percentage. In a third set of ranges, the range of a colorant is one of the following ranges: about 5% to about 20%, about 5% to about 15%, and about 5% to about 10%. In a fourth set of ranges, the range of fiber is one of the following ranges: about 10% to about 20%, and about 10% to about 15% of the total layer by weight percentage. In an embodiment, non-core layers lack fiber.

In an embodiment, one of the non-core layers can include a colorant. The colorants can be supplied in a masterbatch mixture and combined via blending with the formulation. In an example, Ampacet 112761 White Polyethylene Masterbatch is used as a colorant. The amount of a colorant may be one of several different values or fall within one of several different ranges. It is within the scope of the present disclosure to select an amount of a colorant to be one of the following values: about 0%, about 0.1%, about 0.25%, about 0.5%, about 0.75%, about 1%, about 2%, about 3%, about 4% about 5%, about 6%, and about 7% of the total formulation of the polymeric layer by weight percentage.

It is within the scope of the present disclosure for the amount of a colorant in the formulation to fall within one of many different ranges. In a first set of ranges, the range of a colorant is one of the following ranges: about 0% to about 7% (w/w), about 0.1% to about 7%, about 0.25% to about 7%, about 0.5% to about 7%, about 0.75% to about 7%, about 1% to about 7%, about 1.25% to about 7%, about 1.5% to about 7%, about 1.5% to about 6%, about 1.5% to about 5%, about 1.75% to about 5%, about 2% to about 5%, about 2.25% to about 5%, about 2.5% to about 5%, about 3% to about 5%, and about 4% to about 5% of the total formulation of the polymeric layer by weight percentage. In a second set of ranges, the range of a colorant is one of the following ranges: about 0% to about 3%, about 0% to about 2.5%, about 0% to about 2.25%, about 0% to about 2%, about 0% to about 1.75%, about 0% to about 1.5%, about 0% to about 1.25%, about 0% to about 1%, about 0% to about 0.75%, and about 0% to about 0.5% of the total formulation of the polymeric layer by weight percentage. In a third set of ranges, the range of a colorant is one of the following ranges: about 0.1% to about 3.5%, about 0.5% to about 3%, about 0.75% to about 2.5%, and about 1% to about 2% of the total formulation by weight percentage. In an embodiment, the formulation lacks a colorant.

In an illustrative example, multi-layer container 14, 214, 314 is a bottle having a) a core layer comprising HDPE, a chemical blowing agent, and talc; b) an outer polymeric layer comprising HDPE, a colorant, and fiber; and c) an inner polymeric layer comprising HDPE and fiber. In one example, the density of multi-layer container 14 is less than about 0.75 g/cm$^3$. In one example, the density of multi-layer container 14 is less than about 0.7 g/cm$^3$. In one example, the density of multi-layer container 14 is less than about 0.75 g/cm$^3$. In one example, the density of multi-layer container 14 is less than about 0.7 g/cm$^3$. In one example, the density of multi-layer container 14 is less than about 0.65 g/cm$^3$. In one example, the density of multi-layer container 14 is less than about 0.6 g/cm$^3$. In another example, the density of multi-layer container 14 is less than about 0.55 g/cm$^3$. In another example, the density of multi-layer container 14 is less than about 0.5 g/cm$^3$. In another example, the density of multi-layer container 14 is less than about 0.45 g/cm$^3$. In another example, the density of multi-layer container 14 is less than about 0.4 g/cm$^3$. In one example, the density of multi-layer container 14 is one of the following ranges: about 0.4 g/cm$^3$ to about 0.8 g/cm$^3$, about 0.4 g/cm$^3$ to about 0.7 g/cm$^3$, about 0.4 g/cm$^3$ to about 0.55 g/cm$^3$, about 0.4 g/cm$^3$ to about 0.5 g/cm$^3$, or about 0.4 g/cm$^3$ to about 0.45 g/cm$^3$.

In an embodiment, the insulative cellular non-aromatic polymeric material is located between and coupled to an inner polymeric layer and an outer polymeric layer to produce a multi-layer tube 12. The density of the multi-layer tube 12 may be one of several different values or fall within one several different ranges. It is within the scope of the present disclosure for the density of the multi-layer tube 12 to fall within one of many different ranges. In a first set of ranges, the density is one of the following ranges: about 0.5 g/cm$^3$ to about 0.92 g/cm$^3$, about 0.6 g/cm$^3$ to about 0.92 g/cm$^3$, about 0.65 g/cm$^3$ to about 0.92 g/cm$^3$, about 0.7 g/cm$^3$ to about 0.92 g/cm$^3$, about 0.75 g/cm$^3$ to about 0.92 g/cm$^3$, about 0.8 g/cm$^3$ to about 0.92 g/cm$^3$, about 0.85 g/cm$^3$ to about 0.92 g/cm$^3$, and about 0.9 g/cm$^3$ to about 0.92 g/cm$^3$. In a second set of ranges, the density is one of the following ranges: about 0.5 g/cm$^3$ to about 0.9 g/cm$^3$, about 0.6 g/cm$^3$ to about 0.9 g/cm$^3$, about 0.65 g/cm$^3$ to about 0.9 g/cm$^3$, about 0.7 g/cm$^3$ to about 0.9 g/cm$^3$, about 0.75 g/cm$^3$ to about 0.9 g/cm$^3$, about 0.8 g/cm$^3$ to about 0.9 g/cm$^3$, and about 0.85 g/cm$^3$ to about 0.9 g/cm$^3$. In a third set of ranges, the density is one of the following ranges: about 0.6 g/cm$^3$ to about 0.85 g/cm$^3$, about 0.65 g/cm$^3$ to about 0.8 g/cm$^3$, and about 0.7 g/cm$^3$ to about 0.75 g/cm$^3$.

In an embodiment, the insulative cellular non-aromatic polymeric material is located between and coupled to an inner polymeric layer 12A and an outer polymeric 12C layer to produce a multi-layer parison. The density of the multi-layer parison 12 may be one of several different values or fall within one several different ranges. It is within the scope of the present disclosure for the density of the multi-layer parison 10 to fall within one of many different ranges. In a first set of ranges, the density is one of the following ranges: about 0.4 g/cm$^3$ to about 0.8 g/cm$^3$, about 0.45 g/cm$^3$ to about 0.8 g/cm$^3$, about 0.5 g/cm$^3$ to about 0.8 g/cm$^3$, about 0.55 g/cm$^3$ to about 0.8 g/cm$^3$, about 0.6 g/cm$^3$ to about 0.8 g/cm$^3$, about 0.65 g/cm$^3$ to about 0.8 g/cm$^3$, about 0.7 g/cm$^3$ to about 0.8 g/cm$^3$, and about 0.75 g/cm$^3$ to about 0.8 g/cm$^3$. In a second set of ranges, the density of a multi-layer parison is one of the following ranges: about 0.4 g/cm$^3$ to about 0.75 g/cm$^3$, about 0.4 g/cm$^3$ to about 0.7 g/cm$^3$, about 0.4 g/cm$^3$ to about 0.65 g/cm$^3$, about 0.4 g/cm$^3$ to about 0.6 g/cm$^3$, about 0.4 g/cm$^3$ to about 0.55 g/cm$^3$, about 0.4 g/cm$^3$ to about 0.5 g/cm$^3$, and about 0.4 g/cm$^3$ to about 0.45 g/cm$^3$. In a third set of ranges, the density of a multi-layer parison is one of the following ranges: about 0.45 g/cm$^3$ to about 0.7 g/cm$^3$, about 0.5 g/cm$^3$ to about 0.65 g/cm$^3$, and about 0.55 g/cm$^3$ to about 0.6 g/cm$^3$. Density was determined according to the density test procedure outlined in Example 14 using the apparatus in FIG. 4.

In an embodiment, the density of multi-layer tube 12 may be one of several different values or fall within one of several different ranges. It is within the scope of the present disclosure to select a density and be one of the following values: about 0.1 g/cm$^3$, about 0.15 g/cm$^3$, about 0.2 g/cm$^3$, about 0.25 g/cm$^3$, about 0.3 g/cm$^3$, about 0.35 g/cm$^3$, about 0.4 g/cm$^3$ about 0.45 g/cm$^3$, about 0.5 g/cm$^3$, about 0.55 g/cm$^3$, about 0.6 g/cm$^3$, about 0.65 g/cm$^3$, about 0.7 g/cm$^3$, about 0.75 g/cm$^3$, about 0.785 g/cm$^3$, and about 0.8 g/cm$^3$. It is within the scope of the present disclosure for the density of the formulation to fall within one of many different ranges. In a first set of ranges, the range of density is one of the following ranges: about 0.1 g/cm$^3$ to about 0.8 g/cm$^3$, about 0.15 g/cm$^3$ to about 0.8 g/cm$^3$, about 0.2 g/cm$^3$ to about 0.8 g/cm$^3$, about 0.25 g/cm$^3$ to about 0.8 g/cm$^3$, about 0.3 g/cm$^3$ to about 0.8 g/cm$^3$, about 0.35 g/cm$^3$ to about 0.8 g/cm$^3$, about 0.4 g/cm$^3$ to about 0.8 g/cm$^3$, about 0.45 g/cm$^3$ to about 0.8 g/cm$^3$, about 0.5 g/cm$^3$ to about 0.8 g/cm$^3$, about 0.55 g/cm$^3$ to about 0.8 g/cm$^3$, about 0.6 g/cm$^3$ to about 0.8 g/cm$^3$, about 0.65 g/cm$^3$ to about 0.8 g/cm$^3$, about 0.7 g/cm$^3$ to about 0.8 g/cm$^3$, and about 0.75 g/cm$^3$ to about 0.8 g/cm$^3$. In a second set of ranges, the range of density is one of the following ranges: about 0.1 g/cm$^3$ to about 0.75 g/cm$^3$, about 0.1 g/cm$^3$ to about 0.7 g/cm$^3$, about 0.1 g/cm$^3$ to about 0.65 g/cm$^3$, about 0.1 g/cm$^3$ to about 0.6 g/cm$^3$, about 0.1 g/cm$^3$ to about 0.55 g/cm$^3$, about 0.1 g/cm$^3$ to about 0.5 g/cm$^3$, about 0.1 g/cm$^3$ to about 0.45 g/cm$^3$, about 0.1 g/cm$^3$ to about 0.4 g/cm$^3$, about 0.1 g/cm$^3$ to about 0.35 g/cm$^3$, about 0.1 g/cm$^3$ to about 0.3 g/cm$^3$, about 0.1 g/cm$^3$ to about 0.25 g/cm$^3$, about 0.1 g/cm$^3$ to about 0.2 g/cm$^3$, and about 0.1 g/cm$^3$ to about 0.15 g/cm$^3$. In a third set of ranges, the range of density is one of the following ranges: about 0.3 g/cm$^3$ to about 0.8 g/cm$^3$, about 0.35 g/cm$^3$ to about 0.8 g/cm$^3$, about 0.35 g/cm$^3$ to about 0.75 g/cm$^3$, about 0.4 g/cm$^3$ to about 0.75 g/cm$^3$, about 0.4 g/cm$^3$ to about 0.7 g/cm$^3$, about 0.4 g/cm$^3$ to about 0.65 g/cm$^3$, and about 0.4 g/cm$^3$ to about 0.6 g/cm$^3$. Each of these values and ranges is embodied in the Examples. Density was determined according to the density test procedure outlined in Example 14 using the apparatus in FIG. 4.

In an embodiment, the density of the insulative cellular non-aromatic polymeric material may be one of several different values or fall within one of several different ranges. It is within the scope of the present disclosure to select a density and be one of the following values: about 0.1 g/cm$^3$, about 0.15 g/cm$^3$, about 0.2 g/cm$^3$, about 0.25 g/cm$^3$, about 0.3 g/cm$^3$, about 0.35 g/cm$^3$, about 0.4 g/cm$^3$ about 0.45 g/cm$^3$, about 0.5 g/cm$^3$, about 0.55 g/cm$^3$, about 0.6 g/cm$^3$, about 0.65 g/cm$^3$, about 0.7 g/cm$^3$, about 0.75 g/cm$^3$, about 0.785 g/cm$^3$, and about 0.8 g/cm$^3$. It is within the scope of the present disclosure for the density of the insulative cellular non-aromatic polymeric material to fall within one of many different ranges. In a first set of ranges, the range of density is one of the following ranges: about 0.1 g/cm$^3$ to about 0.8 g/cm$^3$, about 0.15 g/cm$^3$ to about 0.8 g/cm$^3$, about 0.2 g/cm$^3$ to about 0.8 g/cm$^3$, about 0.25 g/cm$^3$ to about 0.8 g/cm$^3$, about 0.3 g/cm$^3$ to about 0.8 g/cm$^3$, about 0.35 g/cm$^3$ to about 0.8 g/cm$^3$, about 0.4 g/cm$^3$ to about 0.8 g/cm$^3$, about 0.45 g/cm$^3$ to about 0.8 g/cm$^3$, about 0.5 g/cm$^3$ to about 0.8 g/cm$^3$, about 0.55 g/cm$^3$ to about 0.8 g/cm$^3$, about 0.6 g/cm$^3$ to about 0.8 g/cm$^3$, about 0.65 g/cm$^3$ to about 0.8 g/cm$^3$, about 0.7 g/cm$^3$ to about 0.8 g/cm$^3$, and about 0.75 g/cm$^3$ to about 0.8 g/cm$^3$. In a second set of ranges, the range of density is one of the following ranges: about 0.1 g/cm$^3$ to about 0.75 g/cm$^3$, about 0.1 g/cm$^3$ to about 0.7 g/cm$^3$, about 0.1 g/cm$^3$ to about 0.65 g/cm$^3$, about 0.1 g/cm$^3$ to about 0.6 g/cm$^3$, about 0.1 g/cm$^3$ to about 0.55 g/cm$^3$, about 0.1 g/cm$^3$ to about 0.5 g/cm$^3$, about 0.1 g/cm$^3$ to about 0.45 g/cm$^3$, about 0.1 g/cm$^3$ to about 0.4 g/cm$^3$, about 0.1 g/cm$^3$ to about 0.35 g/cm$^3$, about 0.1 g/cm$^3$ to about 0.3 g/cm$^3$, about 0.1 g/cm$^3$ to about 0.25 g/cm$^3$, about 0.1 g/cm$^3$ to about 0.2 g/cm$^3$, and about 0.1 g/cm$^3$ to about 0.15 g/cm$^3$. In a third set of ranges, the range of density is one of the following ranges: about 0.1 g/cm$^3$ to about 0.8 g/cm$^3$, about 0.15 g/cm$^3$ to about 0.75 g/cm$^3$, about 0.2 g/cm$^3$ to about 0.6 g/cm$^3$, about 0.2 g/cm$^3$ to about 0.5 g/cm$^3$, about 0.2 g/cm$^3$ to about 0.45 g/cm$^3$, about 0.25 g/cm$^3$ to about 0.45 g/cm$^3$, and about 0.25 g/cm$^3$ to about 0.4 g/cm$^3$. Each of these values and ranges is embodied in the Examples. Density of the insulative cellular non-aromatic polymeric material may be determined by any suitable method. One example of determining density includes measuring a density of the multi-layer tube or multi-layer container, determining relative thicknesses of each layer, and calculating the density of the insulative cellular non-aromatic polymeric material using the relative thicknesses of the layers, the known density of the other layers, and the known density of the multi-layer tube or container.

In an embodiment, the insulative cellular non-aromatic polymeric material is located between and coupled to an inner polymeric layer and an outer polymeric layer to produce a multi-layer parison. The outer layer thickness of the multi-layer parison may be one of several different values or fall within one several different ranges. It is within the scope of the present disclosure for the thickness of the outer layer of the multi-layer parison to fall within one of many different ranges. In a first set of ranges, the thickness of the outer layer is one of the following ranges: about 5 mils to about 26 mils, about 6 mils to about 24 mils, about 8 mils to about 24 mils, and about 10 mils to about 24 mils. In a second set of ranges, the thickness of the outer layer of a multi-layer parison is one of the following ranges: about 5 mils to about 26 mils, about 6 mils to about 24 mils, about 8 mils to about 24 mils, and about 10 mils to about 24 mils. In another set of ranges, the outer layer thickness can be a percentage of the overall thickness of the multi-layer parison. In a set of ranges, the percentage thickness of the outer layer can be about 4% to about 9%, about 5% to about 9%, about 5% to about 8%, about 5.5% to about 8%, and about 5.5% to about 7% of the overall thickness of the multi-layer parison.

In an embodiment, the insulative cellular non-aromatic polymeric material is located between and coupled to an inner polymeric layer and an outer polymeric layer to produce a multi-layer parison. The core layer thickness of the multi-layer parison may be one of several different values or fall within one several different ranges. It is within the scope of the present disclosure for the thickness of the core layer of the multi-layer parison to fall within one of many different ranges. In a first set of ranges, the thickness is one of the following ranges: about 14 mils to 130 mils, about 20 mils to about 130 mils, about 40 mils to about 130 mils, and about 50 mils to about 130 mils. In a second set of ranges, the thickness of the core layer is one of the following ranges: about 60 mils to about 130 mils, about 70 mils to about 130 mils, about 80 mils to about 130 mils, about 90 mils to about 130 mils, and about 100 mils to about 130 mils, and about 6.5 mils to about 8 mils. In another set of ranges, the core layer thickness can be a percentage of the overall thickness of the multi-layer parison. In a first set of ranges, the percentage thickness of the outer layer can be about 4% to about 9%, about 5% to about 9%, about 5% to about 8%, about 5.5% to about 8%, and about 5.5% to about 7% of the overall thickness of the multi-layer parison.

In an embodiment, the insulative cellular non-aromatic polymeric material is located between and coupled to an inner polymeric layer and an outer polymeric layer to produce a multi-layer parison. The inner layer thickness of the multi-layer parison may be one of several different values or fall within one several different ranges. It is within the scope of the present disclosure for the thickness of the inner layer of the multi-layer parison to fall within one of many different ranges. In a first set of ranges, the thickness is one of the following ranges: about 3.0 mils to about 15.5 mils.

In an embodiment, a throughput system includes a multi-parison drop. For example, an extrusion line starts as a single line and then splits into 2, 3, 4, 5, or more lines for multiple parison drops. In an embodiment, the RPMs for the extrusion stream start at a particular level (e.g., 48 RPM) and splits evenly into 2 (e.g., 24 RPM each), 3 (e.g., 16 RPM each), 4 (12 RPM each), or more multi-parison drops splitting the RPMs. A more efficient output can be achieved by splitting the extrusion stream into multiple parison drop streams. Thereby, an embodiment includes a system comprising an extrusion stream that splits into multiple parison streams. In an embodiment, the system provides multiple foamed parison drops. Such a system that splits the extrusion line into multiple parison drops can produce foamed bottle. In an embodiment, the foamed bottles have densities as described herein.

Containers (e.g., bottles) can be subjected to a drop test, which is a test to determine a container's ability to withstand free-fall impact forces. Containers that do not pass the drop test are not suitable for commercial applications. In an illustrative embodiment, the insulative cellular non-aromatic polymeric material is coupled and located between two polymeric layers to form a multi-layer parison. The multi-layer parison is then formed, for example, via blow molding into container 14, 214, 314. The container is then filled with water and closed off with, for example, a lid. The sample container is then held at about 73 degrees Fahrenheit (22.8 degrees Celsius) and about 50% relative humidity. The filled, capped containers are then subjected to the following drop test procedure: (a) the filled, capped container is located at about five feet above a hard surface such as concrete or tile; (b) the filled, capped container is then oriented such that a bottom of the filled, capped container is arranged to lie in substantially parallel relation to the hard surface; (c) each of ten capped, filled containers are dropped; (d) upon impact, each filled, capped container is examined for any break or shattering of the wall that causes water to leak out of the bottle; and (e) the total number of bottles showing any sign of leakage after the drop test are counted as failures.

A method of producing a container or parison as described herein includes extruding or blow-molding any of the formulations described herein. An illustrative embodiment of a blow molded container 14 is FIG. 5. Another illustrative embodiment of a blow molded container 214 is FIG. 7. Another illustrative embodiment of a blow molded container 314 is FIG. 8.

In an illustrative embodiment, a formulation for producing an insulative cellular non-aromatic polymeric material includes about 98% HDPE, about 0.5% chemical blowing agent (CBA), and about 1.5% nucleating agent (e.g., talc). The formulation can be used to produce a material that is a) a monolayer forming a container or parison or b) the core layer in a multi-layer container or parison. In an illustrative multi-layer embodiment, a core layer of about 98% HDPE, about 0.5% CBA, and about 1.5% nucleating agent can be sandwiched between at least one inner polymeric layer and at least one outer polymeric layer. An illustrative outer polymeric layer includes i) about 80% HDPE, ii) 5 about % colorant, and iii) about 15% fiber. An illustrative inner polymeric layer includes about 85% HDPE and about 15% fiber.

In an illustrative embodiment, a formulation for producing an insulative cellular non-aromatic polymeric material includes about 98.75% HDPE, about 0.75% chemical blowing agent (CBA), and about 0.2% nucleating agent (e.g., talc).

In an illustrative embodiment, a formulation for producing an insulative cellular non-aromatic polymeric material includes about 98% HDPE and about 2.0% chemical blowing agent (CBA).

In an illustrative embodiment, a formulation for producing an insulative cellular non-aromatic polymeric material includes about 96.5% HDPE, about 0.5% chemical blowing agent (CBA), about 2% slip agent, and about 1% colorant.

In an illustrative embodiment, a formulation for producing an insulative cellular non-aromatic polymeric material includes about 95% HDPE, about 1.5% chemical blowing agent (CBA), about 2% slip agent, about 0.5% nucleating agent (e.g., talc) and about 1% colorant, wherein the about 95% is about a 50%/50% blend of two separate HDPE resins. Thus, each HDPE resin is about 47.5% of the total formulation of the polymeric layer by weight percentage.

In an illustrative embodiment, a formulation for producing an insulative cellular non-aromatic polymeric material includes about 82.54% HDPE, about. 62% chemical blowing agent (CBA), about 2.49% slip agent, about 11.16% nucleating agent (e.g., talc) and 3.19% colorant.

Figure 8:
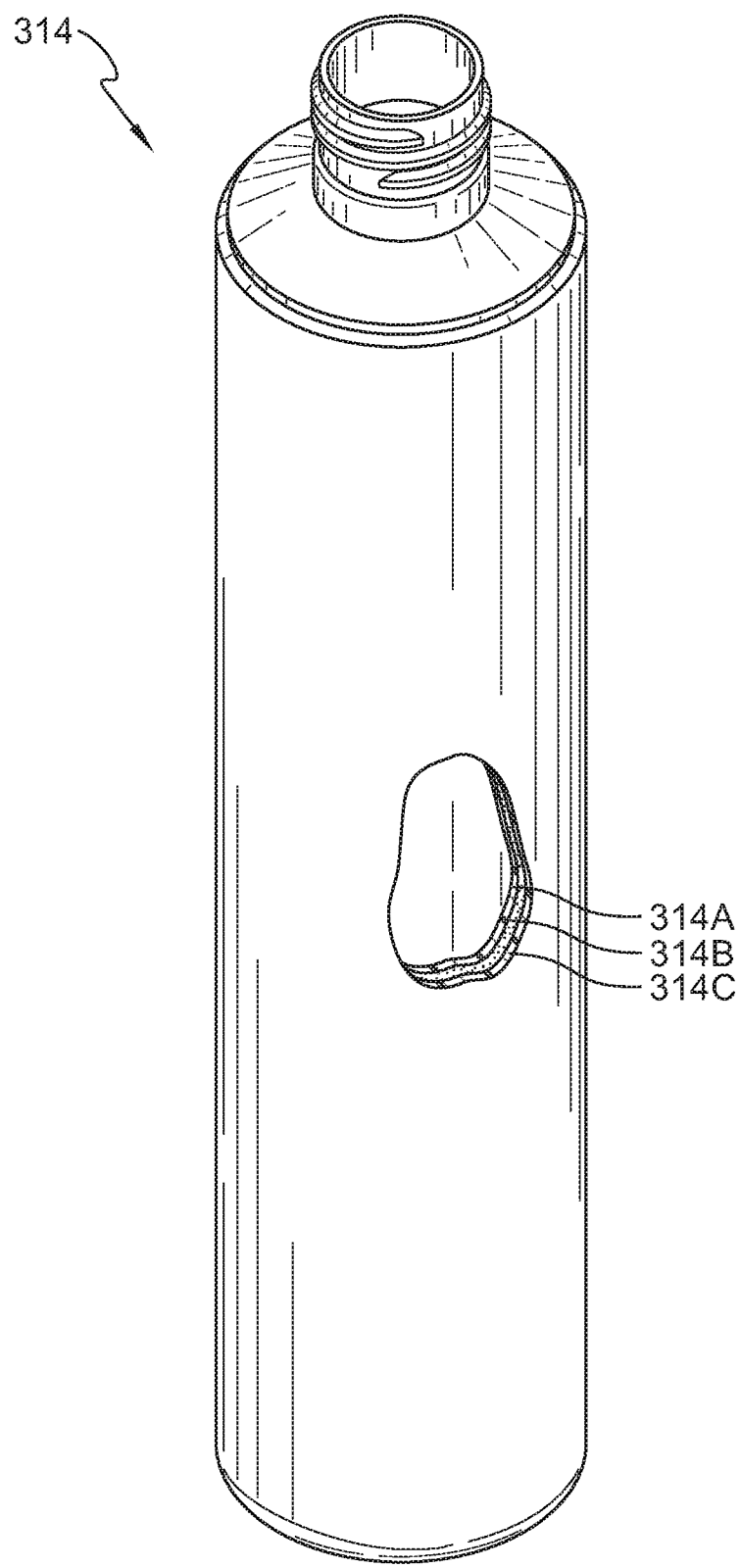
FIG. 8 is a perspective view of another embodiment of a multi-layer container made insulative cellular non-aromatic material in accordance with the present disclosure with portions broken away to reveal that the multi-layer container includes an inner layer, a core layer, and an outer layer.

In illustrative embodiments the formulation may be used to form a multi-layer container 314, as shown in FIG. 8. Multi-layer container 314 includes a floor 388, a cylindrical container wall 390, and cylindrical neck 392 as shown in FIG. 8. Multi-layer container 314 is formed of an outer layer 390A, an inner layer 390C, and a core layer 390B located therebetween that has a thickness 390D.

The following numbered paragraphs define particular embodiments of the insulative cellular non-aromatic polymeric material formulation of the invention:

1) about 80-about 99.9 wt % of at least one HDPE polymeric resin; about 0.1-about 12 wt % of at least one nucleating agent selected from physical nucleating agents and chemical nucleating agents; and optionally, the balance of the formulation comprising one or more additives selected from slip agents, colorants and impact modifiers.

2) about 80-about 99.9 wt % of at least one HDPE polymeric resin;

about 0.1-about 12 wt % of at least one nucleating agent selected from physical nucleating agents and chemical nucleating agents;

about 0.5-about 3 wt % of at least one slip agent; and optionally the balance of the formulation comprising one or more additives selected from colorants and impact modifiers.

3) about 84-about 99.9 wt % of at least one HDPE polymeric resin;

about 0.1-about 3 wt % of at least one nucleating agent selected from physical nucleating agents and chemical nucleating agents; and
optionally the balance of the formulation comprising one or more additives selected from slip agents, colorants and impact modifiers.
4) about 84-99.9 wt % of at least one HDPE polymeric resin;
about 0.1-about 3 wt % of at least one nucleating agent selected from physical nucleating agents and chemical nucleating agents;
about 0.5-about 3 wt % of at least one slip agent; and optionally the balance of the formulation comprising one or more additives selected from colorants and impact modifiers.
5) about 85-about 99.9 wt % of at least one HDPE polymeric resin;
about 0.1-about 2.5 wt % of at least one nucleating agent selected from physical nucleating agents and chemical nucleating agents; and
optionally the balance of the formulation comprising one or more additives selected from slip agents, colorants and impact modifiers.
6) about 85-about 99.9 wt % of at least one HDPE polymeric resin;
about 0.1-about 2.5 wt % of at least one nucleating agent selected from physical nucleating agents and chemical nucleating agents;
about 0.5-about 3 wt % of at least one slip agent; and optionally the balance of the formulation comprising one or more additives selected from colorants and impact modifiers.
7) about 85-about 99.7 wt % of at least one HDPE polymeric resin;
about 0.1-about 2.5 wt % of at least one nucleating agent selected from physical nucleating agents and chemical nucleating agents; and
optionally the balance of the formulation comprising one or more additives selected from slip agents, colorants and impact modifiers.
8) about 85-about 99.7 wt % of at least one HDPE polymeric resin;
about 0.1-about 2.5 wt % of at least one nucleating agent selected from physical nucleating agents and chemical nucleating agents;
about 0.5-about 2.5 wt % of at least one slip agent; and
optionally the balance of the formulation comprising one or more additives selected from colorants and impact modifiers.
9) about 87-about 99.7 wt % of at least one HDPE polymeric resin;
about 0.1-about 2.5 wt % of at least one nucleating agent selected from physical nucleating agents and chemical nucleating agents; and
optionally the balance of the formulation comprising one or more additives selected from slip agents, colorants and impact modifiers.
10) about 87-about 99.7 wt % of at least one HDPE polymeric resin;
about 0.1-about 2.5 wt % of at least one nucleating agent selected from physical nucleating agents and chemical nucleating agents;
about 0.8-about 2.5 wt % of at least one slip agent; and optionally the balance of the formulation comprising one or more additives selected from colorants and impact modifiers.
11) about 90-about 99.7 wt % of at least one HDPE polymeric resin;
about 0.1-about 2.5 wt % of at least one nucleating agent selected from physical nucleating agents and chemical nucleating agents; and
optionally the balance of the formulation comprising one or more additives selected from slip agents, colorants and impact modifiers.
12) about 90-about 99.7 wt % of at least one HDPE polymeric resin;
about 0.1-about 2.5 wt % of at least one nucleating agent selected from physical nucleating agents and chemical nucleating agents;
about 0.8-about 2.5 wt % of at least one slip agent; and optionally the balance of the formulation comprising one or more additives selected from colorants and impact modifiers.
13) about 90-about 99.7 wt % of at least one HDPE polymeric resin;
about 0.1-about 2.2 wt % of at least one nucleating agent selected from physical nucleating agents and chemical nucleating agents; and
optionally the balance of the formulation comprising one or more additives selected from slip agents, colorants and impact modifiers.
14) about 90-about 99.7 wt % of at least one HDPE polymeric resin;
about 0.1-about 2.2 wt % of at least one nucleating agent selected from physical nucleating agents and chemical nucleating agents;
about 0.8-about 2.5 wt % of at least one slip agent; and optionally the balance of the formulation comprising one or more additives selected from colorants and impact modifiers.
15) about 92-about 99.7 wt % of at least one HDPE polymeric resin;
about 0.1-about 2.2 wt % of at least one nucleating agent selected from physical nucleating agents and chemical nucleating agents; and
optionally the balance of the formulation comprising one or more additives selected from slip agents, colorants and impact modifiers.
16) about 92-about 99.7 wt % of at least one HDPE polymeric resin;
about 0.1-about 2.2 wt % of at least one nucleating agent selected from physical nucleating agents and chemical nucleating agents;
about 0.8-about 2.5 wt % of at least one slip agent; and optionally the balance of the formulation comprising one or more additives selected from colorants and impact modifiers.
17) about 95-about 99.7 wt % of at least one HDPE polymeric resin;
about 0.1-about 2.0 wt % of at least one nucleating agent selected from physical nucleating agents and chemical nucleating agents; and
optionally the balance of the formulation comprising one or more additives selected from slip agents, colorants and impact modifiers.
18) about 95-about 99.7 wt % of at least one HDPE polymeric resin;
about 0.1-about 2.0 wt % of at least one nucleating agent selected from physical nucleating agents and chemical nucleating agents;

about 0.8-about 2.5 wt % of at least one slip agent; and optionally the balance of the formulation comprising one or more additives selected from colorants and impact modifiers.

19) about 95-about 99.5 wt % of at least one HDPE polymeric resin;

0.1-2.0 wt % of at least one nucleating agent selected from physical nucleating agents and chemical nucleating agents; and optionally the balance of the formulation comprising one or more additives selected from slip agents, colorants and impact modifiers.

20) about 95-about 99.5 wt % of at least one HDPE polymeric resin;

about 0.1-about 2.0 wt % of at least one nucleating agent selected from physical nucleating agents and chemical nucleating agents;

about 0.8-about 2.5 wt % of at least one slip agent; and optionally the balance of the formulation comprising one or more additives selected from colorants and impact modifiers.

In any of the numbered paragraphs (1)-(20) above, the one or more HDPE polymeric resin may be selected from HDPE homopolymer or HDPE copolymer. Suitably, the one or more HDPE polymeric resin is selected from DOW® DOWLEX™ IP 41 HDPE (available from The Dow Chemical Company) that has been electron-beam modified to provide long-chain branching and a melt index of about 0.25 g/10 min, EQUISTAR® ALATHON® H5520 HDPE copolymer (available from Lyondell Chemical Company) that has been electron-beam modified to have long-chain branching and a melt index of about 0.25 g/10 min, FORMOLENE® HB5502F HDPE hexene copolymer (available from Formosa Plastics Corporation), and Marlex® HHM 5502BN HDPE hexene copolymer. In one embodiment, the one or more HDPE polymeric resin is DOW® DOWLEX™ IP 41 HDPE. In another embodiment, the one or more HDPE polymeric resin is DOW® DOWLEX™ IP 41 HDPE and FORMOLENE® HB5502F HDPE hexene copolymer. In another embodiment, the one or more HDPE polymeric resin is FORMOLENE® HB5502F HDPE hexene copolymer and EQUISTAR® ALATHON® H5520 HDPE copolymer. In one embodiment, the one or more HDPE polymeric resin is DOW® DOWLEX™ IP 41 HDPE and Marlex® HHM 5502BN HDPE hexene copolymer.

In any of the numbered paragraphs (1)-(20) above, the at least one nucleating agent may be a physical nucleating agent selected from talc, CaCO$_3$ and/or mica, and/or a chemical nucleating agent selected from citric acid or a citric acid-based material (e.g. HYDROCEROL™ CF-40E, available from Clariant Corporation). In one embodiment, the at least one nucleating agent is a mixture of talc and HYDROCEROL™ CF-40E. In another embodiment, the at least one nucleating agent is talc. In another embodiment, the at least one nucleating agent is HYDROCEROL™ CF-40E.

In any of the numbered paragraphs (1)-(20) above, the at least one slip agent may be selected from amides, fluoroelastomers, amides of fats or fatty acids, such as erucamide and oleamide, and amides from oleyl (single unsaturated C-18) through erucyl (C-22 single unsaturated). In one embodiment, the at least one slip agent is Ampacet 102823 Process Aid PE MB LLDPE.

In any of the numbered paragraphs (1)-(20) above, the colorant(s) may be selected from any suitable colorant. In one embodiment, the colorant is COLORTECH® 11933-19 Titanium Oxide Colorant.

In any of the numbered paragraphs (1)-(20) above, the impact modifier(s) may be selected from any suitable impact modifier. In one embodiment, the impact modifier is DOW® AFFINITY™ PL 1880G polyolefin plastomer.

The following numbered paragraphs define particular embodiments of the insulative cellular non-aromatic polymeric material formulation of the invention:

21) about 80-about 99.9 wt % of at least one HDPE polymeric resin selected from DOW® DOWLEX™ IP 41 HDPE, EQUISTAR® ALATHON® H5520 HDPE copolymer, FORMOLENE® HB5502F HDPE hexene copolymer, and Marlex® HHM 5502BN HDPE hexene copolymer;

about 0.1-about 7 wt % of at least one nucleating agent selected from talc, CaCO$_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

22) about 80-about 99.9 wt % of at least one HDPE polymeric resin selected from DOW® DOWLEX™ IP 41 HDPE, EQUISTAR® ALATHON® H5520 HDPE copolymer, FORMOLENE® HB5502F HDPE hexene copolymer, and Marlex® HHM 5502BN HDPE hexene copolymer;

about 0.1-about 7 wt % of at least one nucleating agent selected from talc, CaCO$_3$, mica, and/or a chemical nucleating agent selected from citric acid or a citric acid-based material (e.g. HYDROCEROL™ CF-40E);

about 0.5-about 3 wt % of at least one slip agent; and optionally the balance of the formulation comprising one or more additives selected from colorants and impact modifiers.

23) about 84-about 99.9 wt % of at least one HDPE polymeric resin selected from DOW® DOWLEX™ IP 41 HDPE, EQUISTAR® ALATHON® H5520 HDPE copolymer, FORMOLENE® HB5502F HDPE hexene copolymer, and Marlex® HHM 5502BN HDPE hexene copolymer;

about 0.1-about 3 wt % of at least one nucleating agent selected from talc, CaCO$_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

24) about 84-about 99.9 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 3 wt % of at least one nucleating agent selected from talc, CaCO$_3$, mica, and/or a chemical nucleating agent selected from citric acid or a citric acid-based material (e.g. HYDROCEROL™ CF-40E);

about 0.5-about 3 wt % of at least one slip agent; and optionally the balance of the formulation comprising one or more additives selected from colorants and impact modifiers.

25) about 85-about 99.9 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.5 wt % of at least one nucleating agent selected from talc, CaCO₃, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

26) about 85-about 99.9 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.5 wt % of at least one nucleating agent selected from talc, CaCO₃, mica, and/or a chemical nucleating agent selected from citric acid or a citric acid-based material (e.g. HYDROCEROL™ CF-40E);

about 0.5-about 3 wt % of at least one slip agent; and optionally the balance of the formulation comprising one or more additives selected from colorants and impact modifiers.

27) about 85-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.5 wt % of at least one nucleating agent selected from talc, CaCO₃, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

28) about 85-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.5 wt % of at least one nucleating agent selected from talc, CaCO₃, mica, and/or a chemical nucleating agent selected from citric acid or a citric acid-based material (e.g. HYDROCEROL™ CF-40E);

about 0.5-about 2.5 wt % of at least one slip agent; and optionally the balance of the formulation comprising one or more additives selected from colorants and impact modifiers.

29) about 87-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.5 wt % of at least one nucleating agent selected from talc, CaCO₃, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

30) about 87-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.5 wt % of at least one nucleating agent selected from talc, CaCO₃, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

31) about 90-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.5 wt % of at least one nucleating agent selected from talc, CaCO₃, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

32) about 90-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.5 wt % of at least one nucleating agent selected from talc, CaCO₃, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

33) about 90-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.2 wt % of at least one nucleating agent selected from talc, CaCO₃, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

34) about 90-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.2 wt % of at least one nucleating agent selected from talc, CaCO₃, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

35) about 92-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.2 wt % of at least one nucleating agent selected from talc, $CaCO_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

36) about 92-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.2 wt % of at least one nucleating agent selected from talc, $CaCO_3$, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

37) about 95-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.0 wt % of at least one nucleating agent selected from talc, $CaCO_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

38) about 95-about 99.7 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.0 wt % of at least one nucleating agent selected from talc, $CaCO_3$, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

39) about 95-about 99.5 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.0 wt % of at least one nucleating agent selected from talc, $CaCO_3$, mica, and/or a chemical nucleating agent selected from citric acid or a citric acid-based material (e.g. HYDROCEROL™ CF-40E); and optionally the balance of the formulation comprising one or more additives selected from slip agents, colorants and impact modifiers.

40) about 95-about 99.5 wt % of at least one HDPE polymeric resin selected from DOW® DOWLEX™ IP 41 HDPE, EQUISTAR® ALATHON® H5520 HDPE copolymer, and FORMOLENE® HB5502F HDPE hexene copolymer, and Marlex® HHM 5502BN HDPE hexene copolymer;

about 0.1-about 2.0 wt % of at least one nucleating agent selected from talc, $CaCO_3$, mica, and/or a chemical nucleating agent selected from citric acid or a citric acid-based material (e.g. HYDROCEROL™ CF-40E);

about 0.8-about 2.5 wt % of at least one slip agent; and optionally the balance of the formulation comprising one or more additives selected from colorants and impact modifiers.

In any of the numbered paragraphs (21)-(40) above, the at least one slip agent may be selected from amides, fluoroelastomers, amides of fats or fatty acids, such as erucamide and oleamide, and amides from oleyl (single unsaturated C-18) through erucyl (C-22 single unsaturated). In one embodiment, the at least one slip agent is Ampacet 102823 Process Aid PE MB LLDPE.

In any of the numbered paragraphs (21)-(40) above, the colorant(s) may be selected from any suitable colorant. In one embodiment, the colorant is COLORTECH® 11933-19 Titanium Oxide Colorant.

In any of the numbered paragraphs (21)-(40) above, the impact modifier(s) may be selected from any suitable impact modifier. In one embodiment, the impact modifier is DOW® AFFINITY™ PL 1880G polyolefin plastomer.

One or more additional components and additives optionally may be incorporated, such as, but not limited to, colorants (such as, but not limited to, titanium dioxide), and compound regrind.

EXAMPLES

Example 1

Formulation and Extrusion

DOW® DOWLEX™ IP 41 HDPE was used as the polyethylene base resin. The polyethylene base resin was blended with HYDROCEROL® CF 40E as a nucleating agent and $N_2$ as a blowing agent. Ampacet 102823 Process Aid PE MB LLDPE was added as a slip agent and COLORTECH® 11933-19 was added as a colorant. The percentages were about:

| | |
|---|---|
| 96.5% | DOW ® DOWLEX ™ IP 41 HDPE |
| 0.5% | HYDROCEROL ® CF 40E |
| 2.0% | Ampacet 102823 Process Aid PE MB LLDPE |
| 1.0% | COLORTECH ® 11933-19 Titanium Oxide Colorant |

The HDPE, nucleating agents, slip agent, and colorant were added to an extruder hopper and blended to provide a formulation. The formulation was then heated in the extruder to form a molten material. The blowing agent was then added to the molten material at a rate of about:

| | |
|---|---|
| 0.092 | lbs/hr $N_2$ |

The $N_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which was then blow molded to form the insulative container.

Test Results

The insulative cellular non-aromatic polymeric material was mated to inner and outer polymeric layers to form a multi-layer parison having a density of about 0.480 grams per cubic centimeter. The multi-layer parison was then blow molded to establish an insulative container having a density of about 0.695 grams per cubic centimeter.

Example 2

Formulation and Extrusion

DOW® DOWLEX™ IP 41 HDPE was used as the polyethylene base resin. The polyethylene base resin was blended with Heritage Plastics HT6000 LLDPE talc as a nucleating agent, HYDROCEROL® CF 40E as another nucleating agent, and $N_2$ as a blowing agent. Ampacet 102823 Process Aid PE MB LLDPE was added as a slip agent and COLORTECH® 11933-19 was added as a colorant. The percentages were about:

| | |
|---|---|
| 87.4% | DOW® DOWLEX™ IP 41 HDPE |
| 5.33% | Heritage Plastics HT6000 LLDPE Based Talc Concentrate |
| 3.88% | COLORTECH® 11933-19 Titanium Oxide Colorant |
| 1.45% | HYDROCEROL® CF 40E |
| 1.94% | Ampacet 102823 Process Aid PE MB LLDPE |

The HDPE, nucleating agents, slip agent, and colorant were added to an extruder hopper and blended to provide a formulation. The formulation was then heated in the extruder to form a molten material. The blowing agent was then added to the molten material at a rate of about:

| | |
|---|---|
| 0.092 | lbs/hr $N_2$ |

The $N_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers and blow molded to establish an insulative container. The insulative container has a density of about 0.770 grams per cubic centimeter.

Example 3

Formulation and Extrusion

DOW® DOWLEX™ IP 41 HDPE was used as the polyethylene base resin. The polyethylene base resin was blended with Heritage Plastics HT6000 LLDPE talc as a nucleating agent, HYDROCEROL® CF 40E as another nucleating agent, and $N_2$ as a blowing agent. Ampacet 102823 Process Aid PE MB LLDPE was added as a slip agent and COLORTECH® 11933-19 was added as a colorant. The percentages were about:

| | |
|---|---|
| 87.4% | DOW® DOWLEX™ IP 41 HDPE |
| 6.3% | Heritage Plastics HT6000 LLDPE Based Talc Concentrate |
| 3.19% | COLORTECH® 11933-19 Titanium Oxide Colorant |
| 0.62% | HYDROCEROL® CF 40E |
| 2.49% | Ampacet 102823 Process Aid PE MB LLDPE |

The HDPE, nucleating agents, slip agent, and colorant were added to an extruder hopper and blended to provide a formulation. The formulation was then heated in the extruder to form a molten material. The blowing agent was then added to the molten material at a rate of about:

| | |
|---|---|
| 0.092 | lbs/hr $N_2$ |

The $N_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers and blow molded to establish an insulative container. The insulative container has a density of about 0.750 grams per cubic centimeter.

Example 4

Formulation and Extrusion

DOW® DOWLEX™ IP 41 HDPE was used as the polyethylene base resin. The polyethylene base resin was blended with HYDROCEROL® CF 40E as a nucleating agent and $CO_2$ as a blowing agent. Ampacet 102823 Process Aid PE MB LLDPE was added as a slip agent and COLORTECH® 11933-19 was added as a colorant. The percentages were about:

| | |
|---|---|
| 98.25% | DOW® DOWLEX™ IP 41 HDPE |
| 0.25% | HYDROCEROL® CF 40E |
| 0.5% | COLORTECH® 11933-19 Titanium Oxide Colorant |
| 1.0% | Ampacet 102823 Process Aid PE MB LLDPE |

The HDPE, nucleating agent, slip agent, and colorant were added to an extruder hopper and blended to provide a formulation. The formulation was then heated in the extruder to form a molten material. The blowing agent was then added to the molten material at a rate of about:

| | |
|---|---|
| 0.09 | lbs/hr $CO_2$ |

The $CO_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers and blow molded to establish an insulative container. The insulative container has a density of about 0.794 grams per cubic centimeter.

Example 5

Formulation and Extrusion

FORMOSA PLASTICS® FORMOLENE™ HB5502F HDPE hexene copolymer was used as the polyethylene base resin. The polyethylene base resin was blended with HYDROCEROL® CF 40E as a nucleating agent, Heritage Plastics HT6000 LLDPE talc as another nucleating agent, and $N_2$ as a blowing agent. The percentages were about:

| | |
|---|---|
| 98.75% | FORMOLENE(T) HB5502F HDPE hexene copolymer |
| 0.2% | Heritage Plastics HT6000 LLDPE Based Talc Concentrate |
| 0.75% | HYDROCEROL ® CF 40E |

The HDPE and nucleating agents were added to an extruder hopper and blended to provide a formulation. The formulation was then heated in the extruder to form a molten material. The blowing agent was then added to the molten material at a rate of about:

| | |
|---|---|
| 0.125 | lbs/hr $N_2$ |

The $N_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers to form a multi-layer parison having a density of about 0.399 grams per cubic centimeter. The multi-layer parison was then blow molded to establish an insulative container having a density of about 0.610 grams per cubic centimeter.

Example 6

Formulations and Test Results

FORMOSA PLASTICS® FORMOLENE® HB5502F HDPE hexene copolymer was used as the polyethylene base resin. To that polyethylene base resin, one or more nucleating agents such as HYDROCEROL® CF 40E, Heritage Plastics HT6000 LLDPE talc, or Heritage Plastics HT4HP were added. In addition, $N_2$ or $CO_2$ were added as a blowing agent. Furthermore, in some examples, Ampacet 102823 Process Aid PE MB LLDPE was added as a slip agent and COLORTECH® 11933-19 was added as a colorant. The various formulations and resulting multi-layer parison and insulative container densities are shown below in Table 1.

TABLE 1

Comparison of different insulative cellular non-aromatic polymeric material formulations to create various multi-layer parison and insulative container densities

| Trial | Formosa Base Resin [%] | CF-40E [%] | Additive #2 | Colortech [%] | HT4HP [%] | Gas [lbs/hr] | Bottle Density [g/cm³] | Parison Density [g/cm³] |
|---|---|---|---|---|---|---|---|---|
| 6.1 | 96.5 | 0.5 | 2% Ampacet | 1 | 0 | 0.09 $CO_2$ | 0.797 | 0.481 |
| 6.2 | 95 | 1.5 | 2% Ampacet | 1 | 0.5 | 0.08 $CO_2$ | 0.806 | 0.455 |
| 6.3 | 95 | 1.5 | 2% Ampacet | 1 | 0.5 | 0.11 $CO_2$ | 0.753 | 0.451 |
| 6.4 | 95 | 1.5 | 2% Ampacet | 1 | 0.5 | 0.09 $N_2$ | 0.690 | 0.455 |
| 6.5 | 95 | 1.5 | 2% Ampacet | 1 | 0.5 | 0.09 $N_2$ | 0.693 | 0.447 |
| 6.6 | 95 | 1.5 | 2% Ampacet | 1 | 0.5 | 0.09 $N_2$ | 0.718 | 0.467 |
| 6.7 | 96 | 0.5 | 2% Ampacet | 1 | 0.5 | 0.09 $N_2$ | 0.785 | 0.503 |
| 6.8 | 96 | 0.5 | 2% Ampacet | 1 | 0.5 | 0.09 $N_2$ | 0.788 | 0.516 |
| 6.9 | 96 | 0.5 | 2% Ampacet | 1 | 0.5 | 0.09 $N_2$ | 0.736 | 0.495 |
| 6.10 | 96 | 0.5 | 2% Ampacet | 1 | 0.5 | 0.09 $N_2$ | 0.752 | 0.496 |
| 6.11 | 96 | 0.5 | 2% Ampacet | 1 | 0.5 | 0.09 $N_2$ | 0.749 | 0.473 |
| 6.12 | 96.5 | 0.5 | 2% Ampacet | 1 | 0 | 0.09 $N_2$ | 0.779 | 0.498 |
| 6.13 | 99.9 | 0.1 | | | 0 | 0.03 $N_2$ | 0.918 | 0.785 |
| 6.14 | 99.4 | 0.1 | 0.5% HT6000 | | 0 | 0.1 $N_2$ | 0.730 | 0.502 |
| 6.15 | 97.4 | 0.1 | 2.5% HT6000 | | 0 | 0.125 $N_2$ | 0.632 | 0.434 |
| 6.16 | 99.25 | 0.75 | | | 0 | 0.1 $N_2$ | 0.723 | 0.688 |
| 6.17 | 98.75 | 0.75 | 0.5% HT6000 | | 0 | 0.125 $N_2$ | 0.606 | 0.568 |
| 6.18 | 96.75 | 0.75 | 2.5% HT6000 | | 0 | 0.03 $N_2$ | 0.892 | 0.470 |
| 6.19 | 98 | 2.0 | | | 0 | 0.125 $N_2$ | 0.481 | 0.416 |
| 6.20 | 97.5 | 2.0 | 0.5% HT6000 | | 0 | 0.03 $N_2$ | 0.846 | 0.478 |
| 6.21 | 95.5 | 2.0 | 2.5% HT6000 | | 0 | 0.1 $N_2$ | 0.597 | 0.411 |
| 6.22 | 98.75 | 0.75 | 0.4% HT6000 | | 0 | 0.125 $N_2$ | 0.573 | 0.414 |

Example 7

Formulations and Test Results

FORMOSA PLASTICS® FORMOLENE® HB5502F HDPE hexene copolymer was used as the polyethylene base resin. To that polyethylene base resin, HYDROCEROL® CF 40E and Heritage Plastics HT6000 LLDPE talc as nucleating agents were added. In addition, $N_2$ was added as a blowing agent. The percentages were about:

| | |
|---|---|
| 98.75% | FORMOLENE(T) HB5502F HDPE hexene copolymer |
| 0.75% | HYDROCEROL ® CF 40E |
| 0.3% | Heritage Plastics HT6000 LLDPE Based Talc Concentrate |

The HDPE and nucleating agents were added to an extruder hopper and blended to provide a formulation. The formulation was then heated in the extruder to form a molten material. A blowing agent was then added to the molten material at a rate of about:

| | |
|---|---|
| 0.12 | lbs/hr $N_2$ |

The $N_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers to form a multi-layer parison having a density of about 0.407 grams per cubic centimeter. The multi-layer parison was then blow molded to establish an insulative container having a density of about 0.577 grams per cubic centimeter.

Example 8

Formulation and Extrusion

FORMOSA PLASTICS® FORMOLENE® HB5502F HDPE hexene copolymer and EQUISTAR® ALATHON® H5520 HDPE copolymer were used as polyethylene base resins. The polyethylene base resins were blended with HYDROCEROL® CF 40E as a nucleating agent and Heritage Plastics HT6000 LLDPE talc as another nucleating agent, and $N_2$ as a blowing agent. Ampacet 102823 Process Aid PE MB LLDPE was added as a slip agent and COLORTECH® 11933-19 was added as a colorant. The percentages were about:

| | |
|---|---|
| 47.5% | FORMOLENE ® HB5502F HDPE hexene copolymer |
| 47.5% | EQUISTAR ® ALATHON ® H5520 HDPE copolymer |
| 0.5% | Heritage Plastics HT4HP Talc |
| 1.5% | HYDROCEROL ® CF 40E |
| 2.0% | Ampacet 102823 Process Aid PE MB LLDPE |
| 1.0% | COLORTECH ® 11933-19 Titanium Oxide Colorant |

The HDPE, nucleating agents, slip agents, and colorants were added to an extruder hopper and blended to provide a formulation. The formulation was then heated in the extruder to form a molten material. The blowing agent was then added to the molten material at a rate of about:

| | |
|---|---|
| 0.12 | lbs/hr $N_2$ |

The $N_2$ was injected into the molten material to expand the molten material and reduce density of the insulative cellular non-aromatic polymeric material. The resulting mixture was then extruded through a die head to establish a parison. Inner and outer polymeric layers were also extruded to locate the insulative cellular non-aromatic polymeric material therebetween to form a multi-layer parison which is then blow molded to form the insulative container.

Test Results

The insulative cellular non-aromatic polymeric material was mated to inner and outer polymeric layers to form a multi-layer parison having a density of about 0.396 grams per cubic centimeter. The multi-layer parison was then blow molded to establish an insulative container having a density of about 0.519 grams per cubic centimeter.

Example 9

Formulations and Test Results

FORMOSA PLASTICS® FORMOLENE® HB5502F HDPE hexene copolymer and EQUISTAR® ALATHON® H5520 HDPE copolymer were used as polyethylene base resins. The polyethylene base resins were used in various percentages from about 23.875% to about 74.925% of the formulation. The polyethylene base resins were blended with HYDROCEROL® CF 40E as a nucleating agent and Heritage Plastics HT6000 LLDPE talc as another nucleating agent, and $CO_2$ or $N_2$ as a blowing agent. The blowing agent was used at levels between about 0.3 lbs/hr to about 1.25 lbs/hour. Ampacet 102823 Process Aid PE MB LLDPE was added as a slip agent and COLORTECH® 11933-19 was added as a colorant. In some examples, DOW® AFFINITY™ PL 1880G polyolefin elastomer was added as an impact modifier to the formulation. The various formulations and resulting multi-layer parison and insulative container densities are shown below in Table 2.

TABLE 2

Comparison of different insulative cellular non-aromatic polymeric material formulations to create various multi-layer parison and insulative container densities

| Trial | Formosa Base Resin [%] | Base Resin #2 | Additive #1 | Additive #2 | Additive #3 | Additive #4 | $N_2$ [lbs/hr] | Bottle Density [g/cm³] | Parison Density [g/cm³] |
|---|---|---|---|---|---|---|---|---|---|
| 9.1 | 47.5 | 47.5% LBI | 1.5% CF-40E | 2% Ampacet | 1% Colortech | 0.5% HT4HP | 0.092 | 0.649 | 0.423 |
| 9.2 | 24.98 | 74.925% LBI 0.25MI | 0.1% CF-40E | | | | 0.03 | 0.906 | 0.771 |

TABLE 2-continued

Comparison of different insulative cellular non-aromatic polymeric material formulations to create various multi-layer parison and insulative container densities

| Trial | Formosa Base Resin [%] | Base Resin #2 | Additive #1 | Additive #2 | Additive #3 | Additive #4 | $N_2$ [lbs/hr] | Bottle Density [g/cm³] | Parison Density [g/cm³] |
|---|---|---|---|---|---|---|---|---|---|
| 9.3 | 24.7 | 74.0625% LBI 0.25MI | 0.75% CF-40E | 0.5% HT6000 | | | 0.1 | 0.668 | 0.611 |
| 9.4 | 23.875 | 71.625% LBI 0.25MI | 2% CF-40E | 2.5% HT6000 | | | 0.125 | 0.851 | 0.720 |
| 9.5 | 49.7 | 49.7% LBI 0.25MI | 0.1% CF-40E | 0.5% HT6000 | | | 0.125 | 0.668 | 0.436 |
| 9.6 | 48.375 | 48.375% LBI 0.25MI | 0.75% CF-40E | 2.5% HT6000 | | | 0.03 | 0.903 | 0.711 |
| 9.7 | 49 | 49% LBI 0.25MI | 2% CF-40E | | | | 0.1 | 0.626 | 0.425 |
| 9.8 | 73.05 | 24.35% LBI 0.25MI | 0.1% CF-40E | 2.5% HT6000 | | | 0.1 | 0.751 | 0.495 |
| 9.9 | 74.44 | 24.8125% LBI 0.25MI | 0.75% CF-40E | | | | 0.125 | 0.578 | 0.422 |
| 9.10 | 73.125 | 24.375% LBI 0.25MI | 2% CF-40E | 0.5% HT6000 | | | 0.03 | 0.858 | 0.566 |
| 9.11 | 42.25 | 42.25% LBI 0.25MI | 15% Dow Impact Mod | 0.1% CF-40E | 0.4% HT6000 | | 0.125 | 0.640 | 0.441 |
| 9.12 | 42.25 | 42.25% LBI 0.25MI | 15% Dow Impact Mod | 0.1% CF-40E | 0.4% HT6000 | | 0.1 | 0.742 | 0.502 |
| 9.13 | 42.25 | 42.25% LBI 0.25MI | 15% Dow Impact Mod | 0.1% CF-40E | 0.4% HT6000 | | 0.1 | 0.735 | 0.508 |
| 9.14 | 42.25 | 42.25% LBI 0.25MI | 15% Dow Impact Mod | 0.1% CF-40E | 0.4% HT6000 | | 0.1 | 0.766 | 0.512 |

Example 10

Formulations and Test Results

FORMOSA PLASTICS® FORMOLENE® HB5502F HDPE hexene copolymer was used as polyethylene base resin. The polyethylene base resin was used in various percentages from about 97.95% to about 100% of the formulation. In some examples, the polyethylene base resin was blended with HYDROCEROL® CF 40E as a nucleating agent and Heritage Plastics HT6000 LLDPE talc as another nucleating agent, and $N_2$ as a blowing agent. The blowing agent was used at levels between about 0.05 lbs/hr to about 0.15 lbs/hour. COLORTECH® 11933-19 was added as a colorant in some examples. The various formulations and resulting multi-layer parison and insulative container densities are shown below in Table 3.

TABLE 3

Comparison of different insulative cellular non-aromatic polymeric material formulations to create various multi-layer parison and insulative container densities

| Trial | Formosa 5502F [%] | Colortech [%] | CF-40E [%] | HT6000 [%] | $N_2$ [lbs/hr] | Bottle Density [g/cm³] | Parison Density [g/cm³] |
|---|---|---|---|---|---|---|---|
| 10.1 | 97.95 | 1 | 0.75 | 0.3 | 0.1222 | 0.7183 | * |
| 10.2 | 98 | 0 | 2 | 0 | 0.0529 | 0.6950 | * |
| 10.3 | 99.25 | 0 | 0.75 | 0 | 0.0534 | 0.7296 | * |
| 10.4 | 99 | 0 | 1.0 | 0 | 0.0511 | 0.7404 | 0.4292 |
| 10.5 | 98.7 | 0 | 1.0 | 0.3 | 0.0514 | 0.7316 | 0.4272 |
| 10.6 | 98.45 | 0 | 1.25 | 0.3 | 0.0521 | 0.7309 | 0.4276 |
| 10.7 | 98.75 | 0 | 1.25 | 0 | 0.0529 | 0.7303 | 0.4236 |
| 10.8 | 98.75 | 0 | 1.25 | 0 | 0.0522 | 0.7136 | 0.4234 |
| 10.9 | 98.75 | 0 | 1.25 | 0 | 0.0538 | 0.7214 | 0.4304 |
| 10.10 | 100 | 0 | 0 | 0 | 0.1468 | * | * |
| 10.11 | 100 | 0 | 0 | 0 | 0.1392 | * | * |
| 10.12 | 99.9 | 0 | 0 | 0 | 0.1393 | * | * |

TABLE 3-continued

Comparison of different insulative cellular non-aromatic polymeric material formulations to create various multi-layer parison and insulative container densities

| Trial | Formosa 5502F [%] | Colortech [%] | CF-40E [%] | HT6000 [%] | $N_2$ [lbs/hr] | Bottle Density [g/cm³] | Parison Density [g/cm³] |
|---|---|---|---|---|---|---|---|
| 10.13 | 99.5 | 0 | 0 | 0.5 | 0.0656 | * | * |
| 10.14 | 99.4 | 0 | 0.1 | 0.5 | 0.0702 | * | * |
| 10.15 | 99.3 | 0 | 0.2 | 0.5 | 0.0692 | * | * |
| 10.16 | 99.7 | 0 | 0.1 | 0.2 | 0.0673 | * | * |
| 10.17 | 99.7 | 0 | 0.1 | 0.2 | 0.0892 | * | * |
| 10.18 | 99.7 | 0 | 0.1 | 0.2 | 0.105 | * | * |
| 10.19 | 99.7 | 0 | 0.1 | 0.2 | 0.1188 | * | * |
| 10.20 | 99.7 | 0 | 0.1 | 0.2 | 0.0915 | * | * |
| 10.21 | 99.05 | 0 | 0.75 | 0.2 | 0.0906 | * | * |

* Data not available

Example 11

Formulations and Test Results

Bottles were formed from 99.4 wt % FORMOSA PLASTICS® FORMOLENE® HB5502F HDPE hexene copolymer as the polyethylene base resin blended with 0.1 wt % HYDROCEROL® CF 40E as a nucleating agent and 0.5 wt % Heritage Plastics HT6000 LLDPE talc as another nucleating agent with 0.04 lbs/hr of $N_2$ blowing agent. The resulting bottles and parisons were a single layer (i.e., monolayer). The resulting monolayer parison and monolayer container densities are shown under the various process conditions.

TABLE 4

Comparison of process parameters on bottle and parison densities.

| Run [#] | Cycle [s] | Air [psi] | Vacuum | Parison ρ [g/cm³] | Bottle ρ [g/cm³] |
|---|---|---|---|---|---|
| 1 | 14 | 40 | Off | 0.546 | 0.748 |
| 2 | 14 | 40 | On | 0.570 | 0.795 |
| 3 | 14 | 60 | Off | 0.542 | 0.706 |
| 4 | 14 | 60 | On | 0.538 | 0.724 |
| 5 | 15 | 40 | Off | 0.553 | 0.792 |
| 6 | 15 | 40 | On | 0.559 | 0.789 |
| 7 | 15 | 60 | Off | 0.542 | 0.844 |
| 8 | 15 | 60 | On | 0.550 | 0.798 |
| 9 | 16 | 40 | Off | 0.536 | 0.649 |
| 10 | 16 | 40 | On | 0.549 | 0.788 |
| 11 | 16 | 60 | Off | 0.540 | 0.825 |
| 12 | 16 | 60 | On | 0.555 | 0.840 |
| 13 | 17 | 40 | Off | 0.548 | 0.791 |
| 14 | 17 | 40 | On | 0.544 | 0.789 |
| 15 | 17 | 60 | Off | 0.543 | 0.716 |
| 16 | 17 | 60 | On | 0.548 | 0.707 |
| 17 | 18 | 40 | Off | 0.546 | 0.806 |
| 18 | 18 | 40 | On | 0.540 | 0.792 |
| 19 | 18 | 60 | Off | 0.533 | 0.833 |
| 20 | 18 | 60 | On | 0.547 | 0.829 |

Example 12

Formulations and Test Results

FORMOSA PLASTICS® FORMOLENE® HB5502F HDPE hexene copolymer was used as polyethylene base resin. The polyethylene base resin was used in 99.4 wt % of the formulation. The polyethylene base resin was either 100% virgin HDPE (i.e., the control) or a combination of virgin HDPE and regrind. The regrind was a foam bottle produced according to Example 11, ground up, and then put back into the system. The polyethylene base resin was blended with 0.1 wt % HYDROCEROL® CF 40E as a nucleating agent and 0.5 wt % Heritage Plastics HT6000 LLDPE talc as another nucleating agent, and $N_2$ as a blowing agent. The blowing agent was used at about 0.04 lbs/hr. The various formulations and resulting monolayer parison and insulative container densities are shown below in Table 5.

TABLE 5

Comparison of percent virgin and percent regrind on bottle and parison densities.

| Run [#] | Virgin [%] | Regrind [%] | Cycle Time [s] | Parison ρ [g/cm³] | Bottle ρ [g/cm³] |
|---|---|---|---|---|---|
| Control | 100 | 0 | 15 | 0.617 | 0.757 |
| 1 | 80 | 20 | 14 | 0.524 | 0.769 |
| 2 | 80 | 20 | 15 | 0.493 | 0.728 |
| 3 | 80 | 20 | 16 | 0.499 | 0.747 |
| 4 | 60 | 40 | 14 | 0.519 | 0.747 |
| 5 | 60 | 40 | 15 | 0.531 | 0.751 |
| 6 | 60 | 40 | 16 | 0.523 | 0.742 |
| 7 | 40 | 60 | 14 | 0.493 | 0.718 |
| 8 | 40 | 60 | 15 | 0.435 | 0.697 |
| 9 | 40 | 60 | 16 | 0.444 | 0.682 |
| 10 | 20 | 80 | 14 | 0.442 | 0.690 |
| 11 | 20 | 80 | 15 | 0.483 | 0.726 |
| 12 | 20 | 80 | 16 | 0.493 | 0.728 |

The bottles produced with regrind as part of the base polyethylene maintained densities of about 80%.

Another set of bottles was produced as described immediately above except that the regrind was a 2nd pass regrind.

TABLE 6

Comparison of percent virgin and percent 2nd pass regrind on bottle and parison densities.

| Run [#] | Virgin [%] | Regrind [%] | Cycle Time [s] | Parison ρ [g/cm³] | Bottle ρ [g/cm³] |
|---|---|---|---|---|---|
| 1 | 80 | 20 | 14 | 0.536 | 0.773 |
| 2 | 80 | 20 | 15 | 0.502 | 0.764 |
| 3 | 80 | 20 | 16 | 0.496 | 0.778 |

Even with 2nd pass regrind, bottle characteristics were very similar to the characteristics of bottles produced with virgin HDPE.

Example 13

Effect of RPM on Bottle Formation

FORMOSA PLASTICS® FORMOLENE® HB5502F HDPE hexene copolymer was used as polyethylene base resin, at about 99.4%. The polyethylene base resin was blended with 0.1% HYDROCEROL® CF 40E as a nucleating agent and Heritage Plastics HT6000 LLDPE talc as another nucleating agent, and $N_2$ as a blowing agent. The blowing agent was used at about 0.04 lbs/hr. This formulation was processed at various RPMs to produce bottles. Thus, the only variable in the bottle formation of these different runs was the RPMs of the throughput system.

TABLE 7

Effect of RPMs on Drop Test results.

| Run [#] | RPM | Parison ρ [g/cm³] | Bottle ρ [g/cm³] | Weight [g] | Thickness [mils] | Top Load [lbs-F] | Drop Test [Pass %] |
|---|---|---|---|---|---|---|---|
| 5 | 48 | 0.711 | 0.892 | 54.5 | 41.2 | 87.562 | 100 |
| 1 | 36 | 0.660 | 0.842 | 50.2 | 37.7 | 92.696 | 100 |
| 1A | 36 | 0.638 | 0.780 | 51.5 | 43.6 | 89.578 | 100 |
| 2 | 27 | 0.577 | 0.817 | 53.4 | 42.1 | 105.806 | 100 |
| 3 | 18 | 0.495 | 0.756 | 45.0 | 37.0 | 73.94 | 20 |
| 4 | 11 | 0.396 | 0.601 | 32.0 | 30.7 | 36.764 | 0 |

Changing the RPM in the throughput system produced changes to bottle and parison characteristics. For example, higher RPMs produced a higher density parison and higher density bottle. Thereby, using a lower RPM in the throughput system produced lower density bottles. Although these systems utilized a single drop, this shows that a multi-parison drop system is possible. For example, a throughput system can start at a particular RPM (e.g., 48 RPM) for the extrusion stream and then and then split into multiple parison streams at lower RPMs. In an illustrative example, one extrusion stream can start at 48 RPM and split into 4 parison drop streams running at 12 RPM. This would produce a more efficient foaming system to produce bottles.

Example 14

Density Measurements

This Example demonstrates the test used to measure the density of filled and unfilled polymer parts.

Procedure

Figure 4:
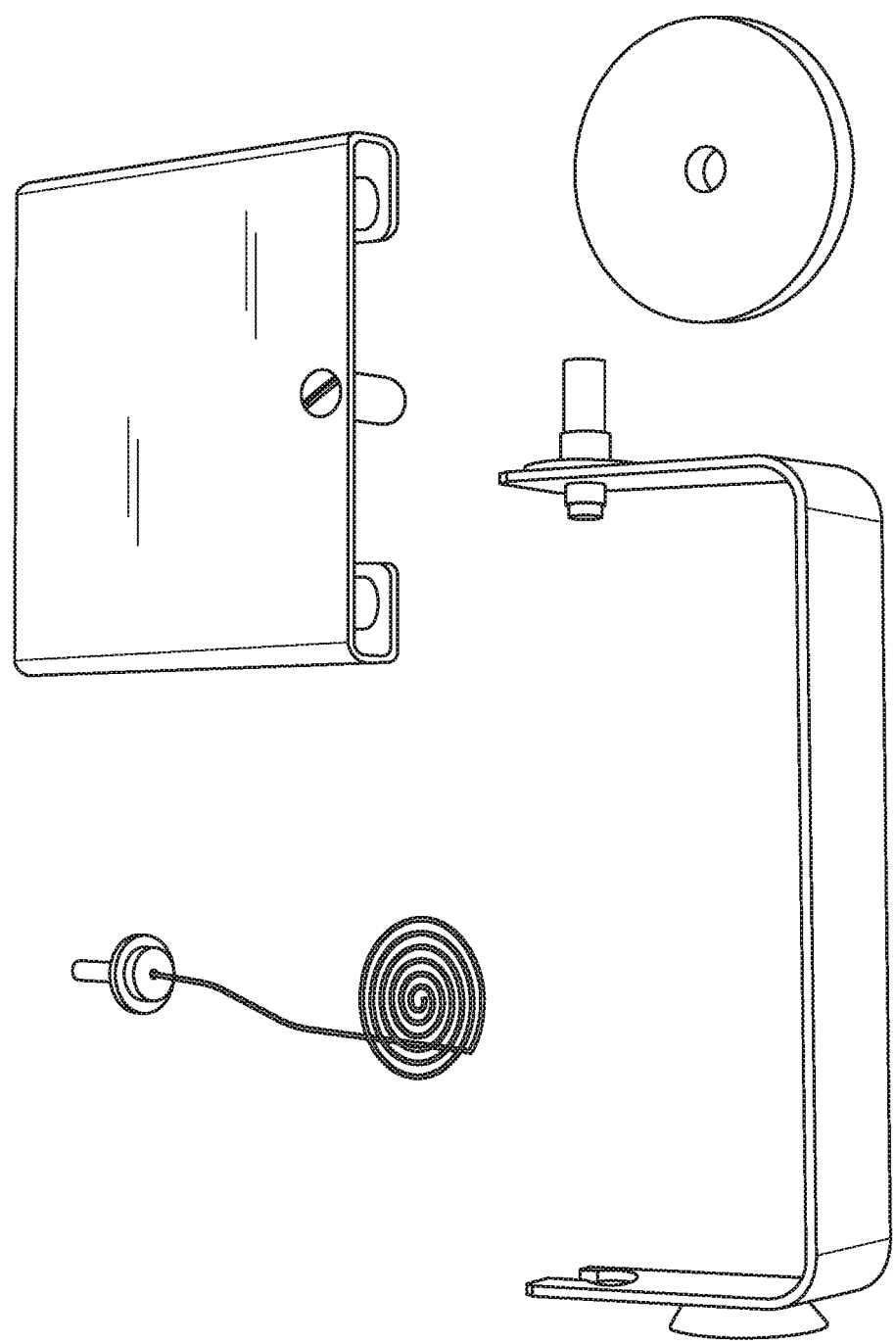
FIG. 4 is a perspective view of an unassembled density determination apparatus showing the components (clockwise starting in the upper left) gem holder, platform, suspension bracket, and suspension spacer.
Figure 5:
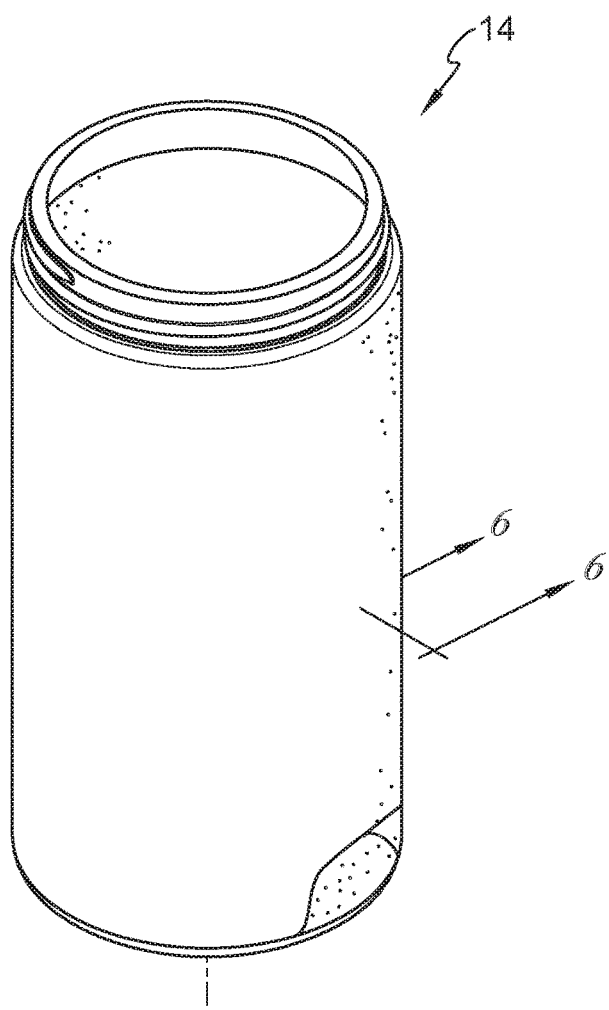
FIG. 5 is a perspective view of the multi-layer container formed from the insulative cellular non-aromatic polymeric material using a container-molding process.

The density was determined by the apparatus shown, unassembled, in FIG. 4. Although not shown in FIG. 4, the apparatus also included a thermometer to measure the suspension liquid temperature. A suspension liquid is a fluid with a density lower than that of the sample to be measured. The sample must sink in the suspension fluid to determine the sample density. Water has a density of 1 g/cm³, so most unfilled polymers require some other suspension fluid such as isopropyl alcohol, density=0.8808 g/cm³. A Mettler AT400 balance (Mettler-Toledo LLC, Columbus, OH) was also used.

The density of a limestone-filled HDPE bottle was measured. After taring the balance to zero, the dry solid sample was weighed after placing it in the cup of the Mettler balance. The dry weight was 0.3833 g. After weighing the dry sample and before removing the sample from the cup, the balance was tared again. The sample was removed from the cup and placed on the gem holder in the suspension fluid. The sample was weighed providing the weight with a negative number (−0.3287 g). The number was converted to its absolute value (0.3287 g); the positive value is the sample buoyancy. The sample density was calculated by multiplying the dry weight (0.3833 g) by the sample buoyancy (0.3287 g) by the suspension fluid density (0.8808 g/cc), which equaled 1.0272 g/cc.

Example 15

Formulations and Test Results

Marlex® HHM 5502BN HDPE hexene copolymer (Chevron Phillips Chemical Company, The Woodlands, TX) was used as polyethylene base resin in the core layer. The polyethylene base resin was used in various percentages from about 98% to about 100% of the formulation. In some examples, the polyethylene base resin was blended with HYDROCEROL® CF 40E as a chemical blowing agent in all non-control samples and Heritage Plastics HT4HP talc as another nucleating agent, and $N_2$ as a blowing agent. The blowing agent was used at about 11 kg/hr. The various formulations and resulting multi-layer parison and insulative container densities are shown below in Table 3.

The extruded material was a multi-layer material where the core layer was sandwiched between an outer and inner polymeric layer. The outer and inner layer were comprised of various amounts of Marlex® HHM 5502BN HDPE hexene copolymer (Chevron Phillips). The outer polymeric layer also included 5 wt % colorant (COLORTECH® 11933-19 titanium oxide). The inner polymeric layer did not include a colorant. Some embodiments of the formulations included inner and/or outer polymeric layers comprising a reinforcing fiber (Hyperform® HPR-803i, Milliken & Co., Spartanburg, SC).

TABLE 8

Comparison of different insulative cellular non-aromatic polymeric material formulations to create various multi-layer parison and insulative container densities

| | Core Layer | | | Outer Layer | | | Inner Layer | |
|---|---|---|---|---|---|---|---|---|
| Sample | HDPE | CBA | Talc | HDPE | Color | Fiber | HDPE | Fiber |
| Control | 100% | 0% | 0% | 95% | 5% | 0% | 100% | 0% |
| 1-1 | 100% | 0.10% | 0.30% | 95% | 5% | 0% | 100% | 0% |
| 1-2 | 100% | 0.10% | 0.30% | 95% | 5% | 0% | 100% | 0% |
| 1-3 | 100% | 0.10% | 0.30% | 95% | 5% | 0% | 100% | 0% |
| 1-4 | 98.4% | 0.10% | 1.50% | 95% | 5% | 0% | 100% | 0% |
| 1-5 | 98.4% | 0.10% | 1.50% | 95% | 5% | 0% | 100% | 0% |
| 1-6 | 98.4% | 0.10% | 1.50% | 95% | 5% | 0% | 100% | 0% |
| 1-7 | 99.2% | 0.50% | 0.30% | 95% | 5% | 0% | 100% | 0% |
| 1-8 | 99.2% | 0.50% | 0.30% | 95% | 5% | 0% | 100% | 0% |
| 1-9 | 99.2% | 0.50% | 0.30% | 95% | 5% | 0% | 100% | 0% |
| 1-10 | 98.0% | 0.50% | 1.50% | 95% | 5% | 0% | 100% | 0% |
| 1-10A | 98.0% | 0.50% | 1.50% | 80% | 5% | 15% | 85% | 15% |
| 1-11 | 98.0% | 0.50% | 1.50% | 95% | 5% | 0% | 100% | 0% |
| 1-12 | 98.0% | 0.50% | 1.50% | 95% | 5% | 0% | 100% | 0% |
| 1-13 | 99.6% | 0.10% | 0.30% | 85% | 5% | 10% | 100% | 0% |
| 1-14 | 99.6% | 0.10% | 0.30% | 80% | 5% | 15% | 100% | 0% |
| 1-15 | 99.6% | 0.10% | 0.30% | 75% | 5% | 20% | 100% | 0% |

TABLE 9

Effect of formulation on Physical Characteristics, Bottle and Parison Density, and Performance

| Sample | Bottle ρ [g/cm³] | Parison ρ [g/cm³] | Weight [g] | Density [g/cm³] | Water Drop [% passed test] |
|---|---|---|---|---|---|
| Control | | | 23.0 | 0.934 | 100 |
| 1-1 | 0.58 | 0.46 | 17.1 | 0.710 | 70 |
| 1-2 | 0.655 | 0.46 | 16.9 | 0.734 | 80 |
| 1-3 | 0.79 | 0.46 | 17.1 | 0.760 | 70 |
| 1-4 | 0.58 | 0.45 | 17.7 | 0.644 | 90 |
| 1-5 | 0.70 | 0.45 | 17.2 | 0.685 | 100 |
| 1-6 | 0.80 | 0.45 | 16.8 | 0.744 | 80 |
| 1-7 | 0.60 | 0.5 | 17.4 | 0.612 | 60 |
| 1-8 | 0.69 | 0.5 | 17.3 | 0.697 | 100 |
| 1-9 | 0.74 | 0.5 | 17.1 | 0.760 | 100 |
| 1-10 | 0.61 | | 17.0 | 0.625 | 100 |
| 1-10A | 0.47 | | 17.0 | 0.479 | 60 |
| 1-11 | 0.67 | | 17.1 | 0.693 | 100 |
| 1-12 | 0.82 | | 17.5 | 0.784 | 100 |
| 1-13 | 0.61 | | 17.0 | 0.624 | 100 |
| 1-14 | 0.67 | | 17.5 | 0.656 | 90 |
| 1-15 | 0.62 | | 17.1 | 0.665 | 90 |

Example 16

Multi-Layer Tubes Comprising Various Amounts of Chemical Blowing Agent and Formed at Various Temperatures Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company). Core-layer formulation 48 comprised between about 99.2% and about 99.6% Marlex® HHM 5502BN HDPE (available from Chevron Phillips Chemical Company), as shown in Table 10, which was used as a polyethylene base resin. The polyethylene base resin was blended with between about 0.1% and about 0.5% HYDROCEROL® CF 40E as a chemical blowing agent (CBA) and nucleating agent, as shown in Table 10, and about 0.3% Heritage Plastics HT6000 LLDPE talc as another nucleating agent. $N_2$ was used as a blowing agent and was injected into the rest of the molten core-layer formulation 48 at a level of about 0.044 kg/h.

The extruder head temperature was varied between about 180° C. and about 190° C., and the core layer extruder barrel temperature was varied between about 180° C. and about 190° C., as shown in Table 10. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. For each formulation, density was measured for six tubes according to the procedure of Example 2, as shown in Table 11 as Density. The average of the six densities for each formulation is shown as Average Density in Table 11. The melt temperature for each formulation was also determined and is reported in Table 11 as Melt Temp.

TABLE 10

Amount of CBA, amount of HDPE, head temperature, and barrel temperature for tubes of Example 16.

| Trial [#] | CBA [%] | HDPE [%] | Head Temp [° C.] | Barrel Temp [° C.] |
|---|---|---|---|---|
| 12.A.0 | 0.10 | 99.6 | 180 | 180 |
| 12.A.1 | 0.50 | 99.2 | 180 | 180 |
| 12.A.2 | 0.10 | 99.6 | 190 | 180 |
| 12.A.3 | 0.50 | 99.2 | 190 | 180 |
| 12.A.4 | 0.10 | 99.6 | 180 | 190 |
| 12.A.5 | 0.50 | 99.2 | 180 | 190 |
| 12.A.6 | 0.10 | 99.6 | 190 | 190 |
| 12.A.7 | 0.50 | 99.2 | 190 | 190 |

TABLE 11

Density, average density, and melt temperature for tubes of Example 16.

| Trial [#] | Density [g/cm³] | Average Density [g/cm³] | Melt Temp [° C.] |
|---|---|---|---|
| 12.A.0a | 0.488 | 0.493 | 180 |
| 12.A.0b | 0.499 | | |
| 12.A.0c | 0.486 | | |
| 12.A.0d | 0.495 | | |
| 12.A.0e | 0.494 | | |
| 12.A.0f | 0.498 | | |
| 12.A.1a | 0.491 | 0.509 | 180 |
| 12.A.1b | 0.514 | | |
| 12.A.1c | 0.509 | | |
| 12.A.1d | 0.517 | | |
| 12.A.1e | 0.510 | | |
| 12.A.1f | 0.511 | | |
| 12.A.2a | 0.484 | 0.480 | 180 |
| 12.A.2b | 0.486 | | |
| 12.A.2c | 0.470 | | |
| 12.A.2d | 0.486 | | |
| 12.A.2e | 0.474 | | |
| 12.A.2f | 0.482 | | |
| 12.A.3a | 0.500 | 0.504 | 181 |
| 12.A.3b | 0.499 | | |
| 12.A.3c | 0.503 | | |
| 12.A.3d | 0.508 | | |
| 12.A.3e | 0.504 | | |
| 12.A.3f | 0.509 | | |
| 12.A.4a | 0.495 | 0.500 | 190 |
| 12.A.4b | 0.505 | | |
| 12.A.4c | 0.493 | | |
| 12.A.4d | 0.507 | | |
| 12.A.4e | 0.494 | | |
| 12.A.4f | 0.505 | | |
| 12.A.5a | 0.498 | 0.500 | 190 |
| 12.A.5b | 0.506 | | |
| 12.A.5c | 0.486 | | |
| 12.A.5d | 0.507 | | |
| 12.A.5e | 0.495 | | |
| 12.A.5f | 0.510 | | |
| 12.A.6a | 0.484 | 0.492 | 189 |
| 12.A.6b | 0.494 | | |
| 12.A.6c | 0.494 | | |
| 12.A.6d | 0.494 | | |
| 12.A.6e | 0.492 | | |
| 12.A.6f | 0.493 | | |
| 12.A.7a | 0.512 | 0.514 | 190 |
| 12.A.7b | 0.523 | | |
| 12.A.7c | 0.511 | | |
| 12.A.7d | 0.520 | | |
| 12.A.7e | 0.490 | | |
| 12.A.7f | 0.526 | | |

Example 17

Multi-Layer Tubes Formed at Various $N_2$ Flow Rates

Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.034 kg/h and about 0.104 kg/h, as shown in Table 12.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. In one embodiment, the inner layer provided about 5.8% of the thickness of the entire tube, the outer layer provided about 6.1% of the thickness of the entire tube, and the core layer provided about 88.2% of the thickness of the entire tube. In another embodiment, the inner layer provided about 5.9% of the thickness of the entire tube, the outer layer provided about 6.1% of the thickness of the entire tube, and the core layer provided about 88.0% of the thickness of the entire tube. The thicknesses for two tubes formed at each $N_2$ flow rate were measured and are described in Table 13 as Outer Layer Thickness, Core Layer Thickness, Inner Layer Thickness, and Total Thickness. For each $N_2$ flow rate, density was measured for four tubes according to the procedure of Example 14, as shown in Table 14 as Parison Density. The average of the four densities for each $N_2$ flow rate is shown as Average Density in Table 14. The melt temperature for each formulation was also determined and is reported in Table 14 as Melt Temp.

TABLE 12

$N_2$ flow rate for tubes of Example 17.

| Trial [#] | $N_2$ Flow Rate [kg/h] |
|---|---|
| 12.B.0 | 0.034 |
| 12.B.1 | 0.044 |
| 12.B.2 | 0.054 |
| 12.B.3 | 0.064 |
| 12.B.4 | 0.074 |
| 12.B.5 | 0.084 |
| 12.B.6 | 0.094 |
| 12.B.7 | 0.104 |

TABLE 13

Outer layer thickness, core layer thickness, inner layer thickness, and total thickness for tubes of Example 17.

| Trial [#] | Outer Layer Thickness [mils] [%] | Core Layer Thickness [mils] [%] | Inner Layer Thickness [mils] [%] | Total Thickness [mils] |
|---|---|---|---|---|
| 12.B.0a | 7.18 (6.0) | 104.24 (86.8) | 8.63 (7.2) | 120.05 |
| 12.B.0b | 6.87 (6.1) | 98.98 (87.4) | 7.44 (6.6) | 113.29 |
| 12.B.1a | 5.46 (4.6) | 106.51 (89.0) | 7.67 (6.4) | 119.64 |
| 12.B.1b | 6.39 (5.4) | 103.43 (87.7) | 8.06 (6.8) | 117.88 |
| 12.B.2a | 6.93 (5.5) | 110.55 (87.6) | 8.76 (6.9) | 126.24 |
| 12.B.2b | 7.25 (5.5) | 114.98 (87.9) | 8.52 (6.5) | 130.75 |
| 12.B.3a | 7.77 (5.8) | 119.12 (88.6) | 7.54 (5.6) | 134.43 |
| 12.B.3b | 7.00 (5.2) | 118.8 (88.7) | 8.07 (6.0) | 133.87 |

TABLE 13-continued

Outer layer thickness, core layer thickness, inner layer thickness, and total thickness for tubes of Example 17.

| Trial [#] | Outer Layer Thickness [mils] [%] | Core Layer Thickness [mils] [%] | Inner Layer Thickness [mils] [%] | Total Thickness [mils] |
|---|---|---|---|---|
| 12.B.4a | 8.79 (6.7) | 115.64 (87.4) | 7.28 (5.5) | 131.71 |
| 12.B.4b | 7.62 (5.5) | 123.04 (89.5) | 6.85 (5.0) | 137.51 |
| 12.B.5a | 8.03 (5.8) | 122.68 (89.4) | 6.56 (4.8) | 137.27 |
| 12.B.5b | 6.81 (5.1) | 119.64 (89.8) | 6.82 (5.1) | 133.27 |
| 12.B.6a | 7.07 (5.2) | 120.52 (89.2) | 7.50 (5.6) | 135.09 |
| 12.B.6b | 6.95 (4.9) | 128.6 (91.2) | 5.43 (3.9) | 140.98 |
| 12.B.7a | 6.60 (6.7) | 84.9 (86.8) | 6.33 (6.5) | 97.83 |
| 12.B.7b | 8.51 (9.1) | 76.01 (81.6) | 8.65 (9.3) | 93.17 |

TABLE 14

Density, average density, and melt temp for tubes of Example 17.

| Trial [#] | Density [g/cm$^3$] | Average Density [g/cm$^3$] | Melt Temp [° C.] |
|---|---|---|---|
| 12.B.0a | 0.554 | 0.542 | 180 |
| 12.B.0b | 0.537 | | |
| 12.B.0c | 0.538 | | |
| 12.B.0d | 0.540 | | |
| 12.B.1a | 0.506 | 0.508 | 180 |
| 12.B.1b | 0.505 | | |
| 12.B.1c | 0.513 | | |
| 12.B.1d | 0.508 | | |
| 12.B.2a | 0.466 | 0.470 | 180 |
| 12.B.2b | 0.472 | | |
| 12.B.2c | 0.472 | | |
| 12.B.2d | 0.468 | | |
| 12.B.3a | 0.425 | 0.431 | 180 |
| 12.B.3b | 0.430 | | |
| 12.B.3c | 0.434 | | |
| 12.B.3d | 0.435 | | |
| 12.B.4a | 0.401 | 0.408 | 180 |
| 12.B.4b | 0.407 | | |
| 12.B.4c | 0.411 | | |
| 12.B.4d | 0.414 | | |
| 12.B.5a | 0.379 | 0.374 | 180 |
| 12.B.5b | 0.370 | | |
| 12.B.5c | 0.372 | | |
| 12.B.5d | 0.375 | | |
| 12.B.6a | 0.393 | 0.398 | 180 |
| 12.B.6b | 0.393 | | |
| 12.B.6c | 0.401 | | |
| 12.B.6d | 0.405 | | |
| 12.B.7a | 0.559 | 0.544 | 180 |
| 12.B.7b | 0.541 | | |
| 12.B.7c | 0.537 | | |
| 12.B.7d | 0.540 | | |

Example 18

Formulations and Test Results for Tubes with about 6% Inner/Outer Layer Thickness and Bottles Formed Therefrom Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.034 kg/h and about 0.104 kg/h as shown in Table 15.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 6% of the thickness of the entire tube, the outer layer provided about 6% of the thickness of the entire tube, and the core layer provided about 88% of the thickness of the entire tube. In one embodiment, the inner layer provided about 6.1% of the thickness of the entire tube, the outer layer provided about 5.8% of the thickness of the entire tube, and the core layer provided about 88.2% of the thickness of the entire tube. For each $N_2$ flow rate, the mean density of several tubes was measured according to the procedure of Example 14 and is shown below in Table 15 as Average Tube Density.

For tubes where tube density was not measured, a mold was closed around the tube and a blow needle was inserted into a space formed in the tube and a container was blow molded. For each $N_2$ flow rate, the mean density of several bottles was measured according to the procedure of Example 14 and is shown below in Table 15 as Average Bottle Density.

TABLE 15

$N_2$ flow rate, average tube density, and average bottle density for tubes and bottles of Example 18.

| Trial [#] | $N_2$ Flow Rate [kg/h] | Average Tube Density [g/cm$^3$] | Average Bottle Density [g/cm$^3$] |
|---|---|---|---|
| 13.A.1 | 0.034 | 0.542 | 0.705 |
| 13.A.2 | 0.044 | 0.508 | 0.674 |
| 13.A.3 | 0.054 | 0.470 | 0.674 |
| 13.A.4 | 0.064 | 0.431 | 0.616 |
| 13.A.5 | 0.074 | 0.408 | 0.574 |
| 13.A.6 | 0.084 | 0.374 | 0.553 |
| 13.A.7 | 0.094 | 0.398 | 0.572 |
| 13.A.8 | 0.104 | 0.544 | 0.622 |

* Data not available

Example 19

Formulations and Test Results for Tubes with about 12% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.114 kg/h as shown in Table 16.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 12% of the thickness of the entire tube, the outer layer provided about 12% of the thickness of the entire tube, and the core layer provided about 76% of the thickness of the entire tube. In one embodiment, the inner layer provided about 10.9% of the thickness of the entire tube, the outer layer provided about 11.1% of the thickness of the entire tube, and the core layer provided about 78.0% of the thickness of the entire tube. For each $N_2$ flow rate, average outer, core, and inner layer thicknesses of the tubes were measured and are shown in Table 16. Also, for each of $N_2$ flow rate, density was measured for four tubes according to the procedure of Example 14 and is shown in Table 17 as Density. The average of the four densities for each $N_2$ flow rate is shown as Average Density in Table 17.

TABLE 16

$N_2$ flow rate, outer layer thickness, core layer thickness, inner layer thickness, and total thickness for tubes of Example 19.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.B.0.1 | 0.044 | 14.29 (12.3) | 86.21 (74.5) | 15.29 (13.2) | 115.79 |
| 13.B.1.1 | 0.054 | 13.79 (11.1) | 98.07 (78.8) | 12.54 (10.1) | 124.4 |
| 13.B.2.1 | 0.064 | 13.04 (10.8) | 93.23 (77.3) | 14.29 (11.9) | 120.56 |
| 13.B.3.1 | 0.074 | 13.37 (10.8) | 97.92 (79.3) | 12.2 (9.9) | 123.49 |
| 13.B.4.1 | 0.084 | 13.12 (9.9) | 105.76 (79.7) | 13.79 (10.4) | 132.67 |
| 13.B.5.1 | 0.094 | 13.70 (11.3) | 94.82 (78.2) | 12.7 (10.5) | 121.22 |
| 13.B.6.1 | 0.104 | 13.62 (11.8) | 90.23 (78.3) | 11.36 (9.9) | 115.21 |
| 13.B.7.1 | 0.114 | 13.46 (11.0) | 95.15 (77.5) | 14.13 (11.5) | 122.74 |

TABLE 17

Density and average density for tubes of Example 19.

| Trial [#] | Density [g/cm³] | Average Density [g/cm³] |
|---|---|---|
| 13.B.0.1a | 0.567 | 0.563 |
| 13.B.0.1b | 0.553 | |
| 13.B.0.1c | 0.571 | |
| 13.B.0.1d | 0.559 | |
| 13.B.1.1a | 0.539 | 0.529 |
| 13.B.1.1b | 0.534 | |
| 13.B.1.1c | 0.517 | |
| 13.B.1.1d | 0.526 | |
| 13.B.2.1a | 0.507 | 0.500 |
| 13.B.2.1b | 0.503 | |
| 13.B.2.1c | 0.487 | |
| 13.B.2.1d | 0.502 | |
| 13.B.3.1a | 0.484 | 0.479 |
| 13.B.3.1b | 0.479 | |
| 13.B.3.1c | 0.478 | |
| 13.B.3.1d | 0.476 | |
| 13.B.4.1a | 0.437 | 0.431 |
| 13.B.4.1b | 0.428 | |
| 13.B.4.1c | 0.431 | |
| 13.B.4.1d | 0.427 | |
| 13.B.5.1a | 0.430 | 0.432 |
| 13.B.5.1b | 0.421 | |
| 13.B.5.1c | 0.445 | |
| 13.B.5.1d | 0.433 | |
| 13.B.6.1a | 0.491 | 0.489 |
| 13.B.6.1b | 0.466 | |
| 13.B.6.1c | 0.497 | |
| 13.B.6.1d | 0.502 | |
| 13.B.7.1a | 0.528 | 0.494 |
| 13.B.7.1b | 0.525 | |
| 13.B.7.1c | 0.464 | |
| 13.B.7.1d | 0.460 | |

Example 20

Formulations and Test Results for Bottles with about 12% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.114 kg/h as shown in Table 18.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 12% of the thickness of the entire tube, the outer layer provided about 12% of the thickness of the entire tube, and the core layer provided about 76% of the thickness of the entire tube.

A mold was closed around the tube and a blow needle was inserted into a space formed in the tube and a container was blow molded. After molding, the inner layer of the bottle provided about 15% of the thickness of the entire bottle, the outer layer of the bottle provided about 15% of the thickness of the entire bottle, and the core layer of the bottle provided about 70% of the thickness of the entire bottle. In one embodiment, the inner layer of the bottle provided about 13.2% of the thickness of the entire bottle, the outer layer of the bottle provided about 17.5% of the thickness of the entire bottle, and the core layer of the bottle provided about 69.3% of the thickness of the entire bottle. In this embodiment, blow molding caused the inner layer's contribution to bottle thickness to increase by 20.9%, the outer layer's contribution to bottle thickness to increase by 57.4%, and the core layer's contribution to bottle thickness to decrease by 11.1%. The thicknesses for two tubes formed at each $N_2$ flow rate were measured and are described in Table 18 as Outer Layer Thickness, Core Layer Thickness, Inner Layer Thickness, and Total Thickness. Also, for each of $N_2$ flow rate, density was measured for three bottles according to the procedure of Example 14 and is shown in Table 19 as Bottle Density. The average of the four densities for each $N_2$ flow rate is shown as Average Bottle Density in Table 19. Mean weight of several bottles was measured and is shown in Table 19.

TABLE 18

$N_2$ flow rate, outer layer thickness, core layer thickness, inner layer thickness, and total thickness for bottles of Example 20.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.B.0.2 | 0.044 | 8.98 (19.3) | 30.5 (65.7) | 6.94 (15.0) | 46.42 |
| 13.B.1.2 | 0.054 | 7.39 (19.5) | 25.07 (66.2) | 5.4 (14.3) | 37.86 |
| 13.B.2.2 | 0.064 | 5.73 (17.9) | 21.28 (66.3) | 5.08 (15.8) | 32.09 |
| 13.B.3.2 | 0.074 | 7.59 (21.2) | 22.59 (63.1) | 5.64 (15.7) | 35.82 |
| 13.B.4.2 | 0.084 | 4.79 (15.3) | 23.16 (73.8) | 3.45 (11.0) | 31.4 |
| 13.B.5.2 | 0.094 | 6.6 (13.6) | 37.47 (77.0) | 4.6 (9.5) | 48.67 |
| 13.B.6.2 | 0.104 | 8.65 (20.1) | 28.1 (65.2) | 6.38 (14.8) | 43.13 |
| 13.B.7.2 | 0.114 | 8.27 (13.4) | 47.55 (77.1) | 5.85 (9.5) | 61.67 |

TABLE 19

Bottle density, average bottle density, and bottle weight for bottles of Example 20.

| Trial [#] | Bottle Density [g/cm³] | Average Bottle density [g/cm³] | Bottle Weight [g] |
|---|---|---|---|
| 13.B.0.2a | 0.748 | 0.758 | 20.30 |
| 13.B.0.2b | 0.763 | | |
| 13.B.0.2c | 0.762 | | |
| 13.B.1.2a | 0.715 | 0.728 | 19.54 |
| 13.B.1.2b | 0.737 | | |
| 13.B.1.2c | 0.733 | | |
| 13.B.2.2a | 0.718 | 0.716 | 18.89 |
| 13.B.2.2b | 0.713 | | |
| 13.B.2.2c | 0.717 | | |
| 13.B.3.2a | 0.677 | 0.670 | 18.47 |
| 13.B.3.2b | 0.659 | | |
| 13.B.3.2c | 0.674 | | |
| 13.B.4.2a | 0.624 | 0.636 | 17.71 |
| 13.B.4.2b | 0.622 | | |
| 13.B.4.2c | 0.662 | | |
| 13.B.5.2a | 0.623 | 0.594 | 17.19 |
| 13.B.5.2b | 0.585 | | |
| 13.B.5.2c | 0.575 | | |
| 13.B.6.2a | 0.593 | 0.576 | 16.69 |
| 13.B.6.2b | 0.545 | | |
| 13.B.6.2c | 0.590 | | |
| 13.B.7.2a | 0.571 | 0.555 | 16.85 |
| 13.B.7.2b | 0.522 | | |
| 13.B.7.2c | 0.573 | | |

Example 21

Formulations and Test Results for Tubes with about 18% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.124 kg/h as shown in Table 20.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 18% of the thickness of the entire tube, the outer layer provided about 18% of the thickness of the entire tube, and the core layer provided about 64% of the thickness of the entire tube. In one embodiment, the inner layer provided about 15.1% of the thickness of the entire tube, the outer layer provided about 17.1% of the thickness of the entire tube, and the core layer provided about 67.8% of the thickness of the entire tube. For each $N_2$ flow rate, average outer, core, and inner layer thicknesses of the tubes were measured and are shown in Table 20. Also, for each of $N_2$ flow rate, density was measured for four tubes according to the procedure of Example 14 and is shown in Table 21 as Density. The average of the four densities for each $N_2$ flow rate is shown as Average Density in Table 21.

TABLE 20

$N_2$ flow rate, outer layer thickness, core layer thickness, inner layer thickness, and total thickness for tubes of Example 21.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.C.0.1 | 0.044 | 25.32 (20.5) | 75.52 (61.2) | 22.64 (18.3) | 123.48 |
| 13.C.1.1 | 0.054 | 21.47 (16.8) | 84.05 (65.8) | 22.14 (17.3) | 127.66 |
| 13.C.2.1 | 0.074 | 18.13 (14.5) | 91.65 (73.1) | 15.54 (12.4) | 125.32 |
| 13.C.3.1 | 0.084 | 18.48 (14.5) | 89.08 (69.8) | 20.1 (15.7) | 127.66 |
| 13.C.4.1 | 0.094 | 18.63 (15.6) | 83.14 (69.7) | 17.46 (14.6) | 119.23 |
| 13.C.5.1 | 0.104 | 19.47 (17.3) | 77.6 (68.8) | 15.72 (13.9) | 112.79 |
| 13.C.6.1 | 0.114 | 20.56 (19.3) | 71.17 (66.9) | 14.62 (13.7) | 106.35 |
| 13.C.7.1 | 0.124 | 19.63 (23.0) | 49.96 (58.6) | 15.71 (18.4) | 85.3 |
| 13.C.8.1 | 0.064 | 19.55 (15.5) | 87.64 (69.6) | 18.8 (14.9) | 125.99 |

TABLE 21

Density and average density for tubes of Example 21.

| Trial [#] | Density [g/cm$^3$] | Average Density [g/cm$^3$] |
|---|---|---|
| 13.C.0.1a | 0.601 | 0.605 |
| 13.C.0.1b | 0.599 | |
| 13.C.0.1c | 0.608 | |
| 13.C.0.1d | 0.610 | |
| 13.C.1.1a | 0.582 | 0.575 |
| 13.C.1.1b | 0.561 | |
| 13.C.1.1c | 0.579 | |
| 13.C.1.1d | 0.579 | |
| 13.C.2.1a | 0.514 | 0.512 |
| 13.C.2.1b | 0.533 | |
| 13.C.2.1c | 0.500 | |
| 13.C.2.1d | 0.500 | |
| 13.C.3.1a | 0.490 | 0.482 |
| 13.C.3.1b | 0.491 | |
| 13.C.3.1c | 0.477 | |
| 13.C.3.1d | 0.468 | |
| 13.C.4.1a | 0.442 | 0.504 |
| 13.C.4.1b | 0.517 | |
| 13.C.4.1c | 0.501 | |
| 13.C.4.1d | 0.555 | |
| 13.C.5.1a | 0.474 | 0.518 |
| 13.C.5.1b | 0.581 | |
| 13.C.5.1c | 0.460 | |
| 13.C.5.1d | 0.555 | |
| 13.C.6.1a | 0.503 | 0.576 |
| 13.C.6.1b | 0.627 | |
| 13.C.6.1c | 0.531 | |
| 13.C.6.1d | 0.644 | |
| 13.C.7.1a | 0.610 | 0.506 |
| 13.C.7.1b | 0.469 | |
| 13.C.7.1c | 0.538 | |
| 13.C.7.1d | 0.406 | |
| 13.C.8.1a | 0.496 | 0.496 |
| 13.C.8.1b | 0.494 | |
| 13.C.8.1c | 0.485 | |
| 13.C.8.1d | 0.508 | |

Example 22

Formulations and Test Results for Bottles with about 18% Inner/Outer Skin Thickness Outer-layer formulation 44 comprised about 85% Marlex® HHM 5502BN HDPE (available from Chevron Phillips Chemical Company), about 5% Ampacet 112761 White Polyethylene Masterbatch (available from Ampacet Corporation) as a coloring agent, and about 10% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at levels between about 0.044 kg/h and about 0.124 kg/h as shown in Table 22.

The extruder head temperature was about 190° C., and the core layer extruder barrel temperature was about 180° C.

The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 18% of the thickness of the entire tube, the outer layer provided about 18% of the thickness of the entire tube, and the core layer provided about 64% of the thickness of the entire tube.

A mold was closed around the tube and a blow needle was inserted into a space formed in the tube and a container was blow molded. After molding, the inner layer of the bottle provided about 22% of the thickness of the entire bottle, the outer layer of the bottle provided about 22% of the thickness of the entire bottle, and the core layer of the bottle provided about 56% of the thickness of the entire bottle. In one embodiment, the inner layer of the bottle provided about 20.1% of the thickness of the entire bottle, the outer layer of the bottle provided about 24.2% of the thickness of the entire bottle, and the core layer of the bottle provided about 55.7% of the thickness of the entire bottle. In this embodiment, blow molding caused the inner layer's contribution to bottle thickness to increase by 32.7%, the outer layer's contribution to bottle thickness to increase by 41.7%, and the core layer's contribution to bottle thickness to decrease by 17.8%. The thicknesses for two tubes formed at each $N_2$ flow rate were measured and are described in Table 21 as Outer Layer Thickness, Core Layer Thickness, Inner Layer Thickness, and Total Thickness. Also, for each of $N_2$ flow rate, density was measured for three bottles according to the procedure of Example 14 and is shown in Table 23 as Bottle density. The average of the four densities for each $N_2$ flow rate is shown as Average Bottle Density in Table 23. Mean weight of several bottles was measured and is shown in Table 46.

TABLE 22

$N_2$ flow rate, outer layer thickness, core layer thickness, inner layer thickness, and total thickness for bottles of Example 22.

| Trial [#] | $N_2$ Flow Rate [kg/h] | Outer Layer Thickness [mils] [%] | Core Layer Thickness [mils] [%] | Inner Layer Thickness [mils] [%] | Total Thickness [mils] |
|---|---|---|---|---|---|
| 13.C.0.2 | 0.044 | 11.45 (28.6) | 20.86 (52.1) | 7.72 (19.3) | 40.03 |
| 13.C.1.2 | 0.054 | 7.72 (26.3) | 14.01 (47.7) | 7.64 (26.0) | 29.37 |
| 13.C.2.2 | 0.074 | 10.03 (24.8) | 22.72 (56.1) | 7.76 (19.2) | 40.51 |
| 13.C.3.2 | 0.084 | 9.55 (24.9) | 21.59 (56.4) | 7.15 (18.7) | 38.29 |
| 13.C.4.2 | 0.094 | 8.73 (26.0) | 17.42 (51.8) | 7.47 (22.2) | 33.62 |
| 13.C.5.2 | 0.104 | 9.91 (29.1) | 16.29 (47.8) | 7.88 (23.1) | 34.08 |
| 13.C.6.2 | 0.114 | 7.51 (19.8) | 22.54 (59.4) | 7.92 (20.9) | 37.97 |
| 13.C.7.2 | 0.124 | 10.03 (14.1) | 52.99 (74.3) | 8.27 (11.6) | 71.29 |
| 13.C.8.2 | 0.064 | 10.4 (28.5) | 19.1 (52.4) | 6.98 (19.1) | 36.48 |

TABLE 23

Density and average density for tubes of Example 22.

| Trial [#] | Density [g/cm³] | Average Density [g/cm³] |
|---|---|---|
| 13.C.0.1a | 0.601 | 0.605 |
| 13.C.0.1b | 0.599 | |
| 13.C.0.1c | 0.608 | |
| 13.C.0.1d | 0.610 | |
| 13.C.1.1a | 0.582 | 0.575 |
| 13.C.1.1b | 0.561 | |
| 13.C.1.1c | 0.579 | |
| 13.C.1.1d | 0.579 | |
| 13.C.2.1a | 0.514 | 0.512 |
| 13.C.2.1b | 0.533 | |
| 13.C.2.1c | 0.500 | |
| 13.C.2.1d | 0.500 | |
| 13.C.3.1a | 0.490 | 0.482 |
| 13.C.3.1b | 0.491 | |
| 13.C.3.1c | 0.477 | |
| 13.C.3.1d | 0.468 | |
| 13.C.4.1a | 0.442 | 0.504 |
| 13.C.4.1b | 0.517 | |
| 13.C.4.1c | 0.501 | |
| 13.C.4.1d | 0.555 | |
| 13.C.5.1a | 0.474 | 0.518 |
| 13.C.5.1b | 0.581 | |
| 13.C.5.1c | 0.460 | |
| 13.C.5.1d | 0.555 | |
| 13.C.6.1a | 0.503 | 0.576 |
| 13.C.6.1b | 0.627 | |
| 13.C.6.1c | 0.531 | |
| 13.C.6.1d | 0.644 | |
| 13.C.7.1a | 0.610 | 0.506 |
| 13.C.7.1b | 0.469 | |
| 13.C.7.1c | 0.538 | |
| 13.C.7.1d | 0.406 | |
| 13.C.8.1a | 0.496 | 0.496 |
| 13.C.8.1b | 0.494 | |
| 13.C.8.1c | 0.485 | |
| 13.C.8.1d | 0.508 | |

Example 23

Formulations and Test Results for Tubes with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h, corresponding to between about 0.20% and about 0.30% as shown in Table 24.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube. The layer thicknesses for several tubes of flow rate were measured and the mean values of these thicknesses for each tube are described in Table 24 as Inner Layer Thickness and Outer Layer Thickness.

TABLE 24

$N_2$ saturation, N2 flow rate, inner layer thickness, and outer layer thickness, and total thickness for tubes of Example 23.

| Trial [#] | $N_2$ Saturation [%] | $N_2$ Flow Rate [kg/h] | Inner Layer Thickness [%] | Outer Layer Thickness [mils] [%] |
|---|---|---|---|---|
| 14.A.1 | 0.20 | 0.045 | 11.65 | 16.55 |
| 14.A.2 | 0.22 | 0.0495 | 11.55 | 16.15 |
| 14.A.3 | 0.24 | 0.054 | 11.65 | 16.55 |
| 14.A.4 | 0.26 | 0.0585 | * | * |
| 14.A.5 | 0.28 | 0.0629 | * | * |
| 14.A.6 | 0.30 | 0.069 | * | * |

*Data not available

Example 24

Formulations and Test Results for Bottles with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h as shown in Table 25.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube and a container was blow molded. For each $N_2$ flow rate, the weight of three bottles was measured and is shown in Table 25 as Bottle Weight. The average of the three weights for each $N_2$ flow rate is shown as Average Bottle Weight in Table 25. Also, for each $N_2$ flow rate, density was measured for three bottles according to the procedure of Example 14 and is shown in Table 25 as Bottle Density. The mean of the three densities for each $N_2$ flow rate is shown as Average Bottle Density in Table 25.

TABLE 25

$N_2$ flow rate, bottle weight, average bottle weight, bottle density, and average bottle density for bottles of Example 24.

| Trial [#] | $N_2$ Flow Rate [kg/h] | Bottle Weight [g] | Average Bottle Weight [g] | Bottle density [g/cm$^3$] | Average Bottle density [g/cm$^3$] |
|---|---|---|---|---|---|
| 14.A.1a | 0.045 | 17.21 | 17.3 | 0.710 | 0.710 |
| 14.A.1b |  | 17.08 |  | 0.703 |  |
| 14.A.1c |  | 17.61 |  | 0.718 |  |
| 14.A.2a | 0.0495 | 17.01 | 16.9 | 0.694 | 0.700 |
| 14.A.2b |  | 17.01 |  | 0.696 |  |
| 14.A.2c |  | 16.7 |  | 0.697 |  |
| 14.A.3a | 0.054 | 17.08 | 17.0 | 0.674 | 0.670 |
| 14.A.3b |  | 16.96 |  | 0.671 |  |
| 14.A.3c |  | 16.95 |  | 0.668 |  |
| 14.A.4a | 0.0585 | 17.38 | 17.4 | 0.651 | 0.653 |
| 14.A.4b |  | 17.5 |  | 0.655 |  |
| 14.A.4c |  | 17.36 |  | 0.653 |  |

TABLE 25-continued

N₂ flow rate, bottle weight, average bottle weight, bottle density, and average bottle density for bottles of Example 24.

| Trial [#] | N₂ Flow Rate [kg/h] | Bottle Weight [g] | Average Bottle Weight [g] | Bottle density [g/cm³] | Average Bottle density [g/cm³] |
|---|---|---|---|---|---|
| 14.A.5a | 0.0629 | 17.14 | 17.2 | 0.653 | 0.646 |
| 14.A.5b |  | 17.17 |  | 0.642 |  |
| 14.A.5c |  | 17.16 |  | 0.644 |  |
| 14.A.6a | 0.069 | 16.84 | 16.9 | 0.640 | 0.642 |
| 14.A.6b |  | 16.91 |  | 0.649 |  |
| 14.A.6c |  | 16.81 |  | 0.637 |  |

Example 25

Formulations and Test Results for Tubes with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company). In some embodiments, the inner-layer formulation 40 comprises about 3% to about 7.5% reinforcing fiber.

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h, corresponding to between about 0.20% and about 0.30% as shown in Table 26.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube. The layer thicknesses for several tubes of flow rate were measured and the mean values of these thicknesses for each tube are described in Table 26 as Inner Layer Thickness and Outer Layer Thickness.

TABLE 26

N₂ saturation, N₂ flow rate, inner layer thickness, and outer layer thickness, and total thickness for tubes of Example 25.

| Trial [#] | N₂ Saturation [%] | N₂ Flow Rate [kg/h] | Inner Layer Thickness [%] | Outer Layer Thickness [%] |
|---|---|---|---|---|
| 14.A.7 | 0.20 | 0.045 | 7.30 | 16.85 |
| 14.A.8 | 0.22 | 0.0495 | 9.05 | 15.15 |
| 14.A.9 | 0.24 | 0.054 | 8.85 | 17.2 |
| 14.A.10 | 0.26 | 0.0585 | 11.8 | 18.9 |
| 14.A.11 | 0.28 | 0.0629 | * | * |
| 14.A.12 | 0.30 | 0.069 | * | * |

*Data not available

Example 26

Formulations and Test Results for Bottles with Varying $N_2$ Saturation

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 99.6% Marlex® HHM 5502BN HDPE (available from Chevron Phillips Chemical Company), which was used as a polyethylene base resin. The polyethylene base resin was blended with about 0.1% HYDROCEROL® CF 40E as a chemical blowing agent and nucleating agent and about 0.3% Heritage Plastics HT6000 LLDPE talc as another nucleating agent. $N_2$ was used as a blowing agent and was injected into the rest of the molten core-layer formulation 48 at a level between about 0.045 kg/h and about 0.070 kg/h as shown in Table 27.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube.

A mold was closed around the tube and a blow needle was inserted into a space formed in the tube and a container was blow molded. For each $N_2$ flow rate, the weight of three bottles was measured and is shown in Table 27 as Bottle Weight. The average of the three weights for each $N_2$ flow rate is shown as Average Bottle Weight in Table 27. Also, for each $N_2$ flow rate, density was measured for three bottles according to the procedure of Example 14 and is shown in Table 27 as Bottle Density. The mean of the three densities for each $N_2$ flow rate is shown as Average Bottle Density in Table 27.

TABLE 27

$N_2$ flow rate, bottle weight, average bottle weight, bottle density, and average bottle density for bottles of Example 26.

| Trial [#] | $N_2$ Flow Rate [kg/h] | Bottle Weight [g] | Average Bottle Weight [g] | Bottle density [g/cm³] | Average Bottle density [g/cm³] |
|---|---|---|---|---|---|
| 14.A.7a | 0.045 | 17.02 | 17.0 | 0.694 | 0.691 |
| 14.A.7b | | 17.13 | | 0.700 | |
| 14.A.7c | | 16.81 | | 0.678 | |
| 14.A.8a | 0.0495 | 17.23 | 17.2 | 0.669 | 0.659 |
| 14.A.8b | | 17.2 | | 0.652 | |
| 14.A.8c | | 17.3 | | 0.657 | |
| 14.A.9a | 0.054 | 17.26 | 17.2 | 0.606 | |
| 14.A.9b | | 17.24 | | 0.641 | 0.618 |
| 14.A.9c | | 17.18 | | 0.607 | |
| 14.A.10a | 0.0585 | 16.85 | 16.9 | 0.617 | 0.600 |
| 14.A.10b | | 16.93 | | 0.593 | |
| 14.A.10c | | 16.9 | | 0.590 | |
| 14.A.11a | 0.0629 | 17.31 | 17.2 | 0.562 | 0.569 |
| 14.A.11b | | 17.09 | | 0.589 | |
| 14.A.11c | | 17.21 | | 0.557 | |
| 14.A.12a | 0.069 | 17 | 17.1 | 0.601 | 0.585 |
| 14.A.12b | | 17.31 | | 0.577 | |
| 14.A.12c | | 17.11 | | 0.578 | |

Example 27

Formulations and Test Results for Bottles with Varying Process Aid

Outer-layer formulation 44 comprised between about 72% and about 75% of a base resin blend of 50% Marlex® HHM 5502BN HDPE (available from Chevron Phillips Chemical Company) and 50% DOW LLDPE 50041 Polyethylene, Low Density (available from the Dow Chemical Company) about 5% Ampacet 112761 White Polyethylene Masterbatch (available from Ampacet Corporation) as a coloring agent, about 20% of a reinforcing fiber blend of about 15% Hyperform® HPR-803i (available from Milliken Chemical) and about 85% Braskem F020HC High Crystallinity Polypropylene (available from Braskem), and between about 0% and about 3% of an Ampacet 102823 as a process aid. Inner-layer formulation 40 comprised about 100% Marlex® HHM 5502BN HDPE (available from Chevron Phillips Chemical Company). The outer-layer formulation is further described in Table 28.

Core-layer formulation 48 comprised between about 99.6% and about 99.9% Marlex® HHM 5502BN HDPE (available from Chevron Phillips Chemical Company), which was used as a polyethylene base resin. The polyethylene base resin was blended with between about 0.1% and about 0.3% HYDROCEROL® CF 40E as a chemical blowing agent and nucleating agent and between about 0.1% and about 0.3% Heritage Plastics HT6000 LLDPE talc as another nucleating agent. $N_2$ was used as a blowing agent and was injected into the rest of the molten core-layer formulation 48 at a level between of about 0.060 kg/h. The core-layer formulation is further described in Table 28.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 8% of the thickness of the entire tube, the outer layer provided about 14% of the thickness of the entire tube, and the core layer provided about 78% of the thickness of the entire tube.

A mold was closed around the tube and a blow needle was inserted into a space formed in the tube and a container was blow molded. For each $N_2$ flow rate, the weight of ten bottles was measured. The average of the ten weights for each $N_2$ flow rate is shown as Average Bottle Weight in Table 29. Also, for each $N_2$ flow rate, density was measured for three bottles according to the procedure of Example 14 and is shown in Table 29 as Bottle Density. The mean of the three densities for each $N_2$ flow rate is shown as Average Bottle Density in Table 29.

TABLE 28

Amounts base resin blend, process aid, HDPE, talc, and chemical blowing agent for bottles of Example 27.

| | Outer Layer | | Core Layer | | |
|---|---|---|---|---|---|
| Trial [#] | Base resin blend [%] | 102823 [%] | 5502BN [%] | HT6000 [%] | CF 40E [%] |
| 14.B.1 | 75 | 0 | 99.6 | 0.3 | 0.1 |
| 14.B.2 | 75 | 0 | 99.9 | 0 | 0.1 |
| 14.B.3 | 75 | 0 | 99.7 | 0 | 0.3 |
| 14.B.4 | 72 | 3 | 99.6 | 0.3 | 0.1 |
| 14.B.5 | 72 | 3 | 99.9 | 0 | 0.1 |

TABLE 28-continued

Amounts base resin blend, process aid, HDPE, talc, and chemical blowing agent for bottles of Example 27.

| | Outer Layer | | Core Layer | | |
|---|---|---|---|---|---|
| Trial [#] | Base resin blend [%] | 102823 [%] | 5502BN [%] | HT6000 [%] | CF 40E [%] |
| 14.B.6 | 72 | 3 | 99.7 | 0 | 0.3 |
| 14.B.7 | 75 | 0 | 99.9 | 0 | 0.1 |

TABLE 29

Average bottle weight, bottle density, and average bottle density for bottles of Example 27.

| Trial [#] | Average Bottle Weight [g] | Bottle density [g/cm$^3$] | Average Bottle density [g/cm$^3$] |
|---|---|---|---|
| 14.B.1a | 17.1 ± 0.3 | 0.672 | 0.68 |
| 14.B.1b | | 0.683 | |
| 14.B.1c | | 0.690 | |
| 14.B.2a | 17.0 ± 0.1 | 0.669 | 0.67 |
| 14.B.2b | | 0.678 | |
| 14.B.2c | | 0.676 | |
| 14.B.3a | 17.1 ± 0.2 | 0.665 | 0.67 |
| 14.B.3b | | 0.675 | |
| 14.B.3c | | 0.669 | |
| 14.B.4a | 17.0 ± 0.4 | 0.670 | 0.67 |
| 14.B.4b | | 0.676 | |
| 14.B.4c | | 0.676 | |
| 14.B.5a | 17.2 ± 0.2 | 0.681 | 0.68 |
| 14.B.5b | | 0.670 | |
| 14.B.5c | | 0.674 | |
| 14.B.6a | 17.0 ± 0.2 | 0.672 | 0.67 |
| 14.B.6b | | 0.665 | |
| 14.B.6c | | 0.667 | |
| 14.B.7a | 17.1 ± 0.2 | 0.657 | 0.65 |
| 14.B.7b | | 0.655 | |
| 14.B.7c | | 0.648 | |

Example 28

Formulation and Test Results for Bottles with 50% Regrind

Outer-layer formulation 44 comprised about 75% Marlex® HHM 5502BN HDPE (available from Chevron Phillips Chemical Company), about 5% Ampacet 112761 White Polyethylene Masterbatch (available from Ampacet Corporation) as a coloring agent, and about 20% of a reinforcing fiber blend of about 15% Hyperform® HPR-803i (available from Milliken Chemical) and about 85% Braskem F020HC High Crystallinity Polypropylene (available from Braskem). Inner-layer formulation 40 comprised about 100% Marlex® HHM 5502BN HDPE (available from Chevron Phillips Chemical Company).

Core-layer formulation 48 comprised about 50% first-pass regrind material and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. N$_2$ was used as a blowing agent and was injected into the rest of the molten core-layer formulation 48 at a level between that led to 0.22% N$_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube and a container was blow molded. The weights of three bottles were measured to be 17.25 g, 17.16 g, and 17.39 g leading to an average weight of 17.3 g. Also, density was measured for three bottles according to the procedure of Example 14 to be 0.689 g/cm$^3$, 0.676 g/cm$^3$, and 0.680 g/cm$^3$ leading to an average density of 0.682 g/cm$^3$.

Example 29

Formulations and Test Results for Bottles with Various Amounts of Regrind

Outer-layer formulation 44 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 40 comprised about 100% Marlex® HHM 5502BN HDPE (available from Chevron Phillips Chemical Company).

Core-layer formulation 48 comprised between about 0% and about 50% first-pass regrind material, as shown in Table 28, and between about 0% and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. N$_2$ was used as a blowing agent and was injected into the rest of the molten core-layer formulation 48 at a level that led to 0.22% N$_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 11% of the thickness of the entire tube, the outer layer provided about 14% of the thickness of the entire tube, and the core layer provided about 75% of the thickness of the entire tube.

A mold was closed around the tube and a blow needle was inserted into a space formed in the tube and a container was blow molded. The average of the weights for each $N_2$ flow rate is shown as Average Bottle Weight in Table 30. Also, for each formulation, density was measured for several bottles according to the procedure of Example 14. The mean of the densities for each formulation is shown as Average Bottle Density in Table 30.

TABLE 30

Amount of regrind, average bottle weight, bottle density, and average bottle density for bottles of Example 29.

| Trial [#] | Regrind [%] | Average Bottle Density [g/cm³] |
|---|---|---|
| 16.A.1 | 0 | 0.685 ± 0.008 |
| 16.B.1 | 25 | 0.690 ± 0.004 |
| 16.B.2 | 50 | 0.670 ± 0.015 |

Example 30

Formulations and Test Results for Bottles with Various Amounts of Regrind

Outer-layer formulation 44 comprised about 75% Marlex® HHM 5502BN HDPE (available from Chevron Phillips Chemical Company), about 12.5% Braskem Polypropylene Inspire 6025N (available from Braskem), about 5% Ampacet 112761 White Polyethylene Masterbatch (available from Ampacet Corporation) as a coloring agent, and about 7.5% Hyperform® HPR-803i (available from Milliken Chemical). Inner-layer formulation 40 comprised about 100% Marlex® HHM 5502BN HDPE (available from Chevron Phillips Chemical Company).

Core-layer formulation 48 comprised between about 0% and about 50% regrind material, as shown in Table 31, and between about 0% and about 50% of a formulation comprising about 99.6% Marlex® HHM 5502BN HDPE (available from Chevron Phillips Chemical Company), which was used as a polyethylene base resin, blended with about 0.1% HYDROCEROL® CF 40E as a chemical blowing agent and nucleating agent, and about 0.3% Heritage Plastics HT6000 LLDPE talc as another nucleating agent. Several stages of bottles production were performed using different amounts of multiple-pass regrind, as shown in Table 31. First pass regrind was obtained from bottles made of virgin material (stage 0), second pass regrind was obtained from bottles made of material from stage 1, third pass regrind was obtained from bottles made of material from stage 2, fourth pass regrind was obtained from bottles made of material from stage 3, fifth pass regrind was obtained from bottles made of material from stage 4, and sixth pass regrind was obtained from bottles made of material from stage 5. $N_2$ was used as a blowing agent and was injected into the rest of the molten core-layer formulation 48 at a level between that led to 0.22% $N_2$ saturation.

The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. Inner and outer layers were extruded through the die head, locating the expanded formulation therebetween, to form a multi-layer tube. The layers were extruded such that the inner layer provided about 14% of the thickness of the entire tube, the outer layer provided about 14% of the thickness of the entire tube, and the core layer provided about 72% of the thickness of the entire tube.

A mold was closed around the tube and a blow needle was inserted into a space formed in the tube and a container was blow molded.

TABLE 31

Pass level of regrind material used in different stages of production of bottles of Example 30.

| | Regrind Stage | | | | | | |
|---|---|---|---|---|---|---|---|
| | Stage 0 | Stage 1 | Stage 2 | Stage 3 | Stage 4 | Stage 5 | Stage 6 |
| Virgin | 100.00% | 50.00% | 50.00% | 50.00% | 50.00% | 50.00% | 50.00% |
| 1st Pass | | 50.00% | 25.00% | 25.00% | 25.00% | 25.00% | 25.00% |
| 2nd Pass | | | 25.00% | 12.50% | 12.50% | 12.50% | 12.50% |
| 3rd Pass | | | | 12.50% | 6.25% | 6.25% | 6.25% |
| 4th Pass | | | | | 6.25% | 3.13% | 3.13% |
| 5th Pass | | | | | | 3.13% | 1.56% |
| 6th Pass | | | | | | | 1.56% |

Example 31

Top Load Measurement Method
Top Load Measurements
General Procedure

Top load testing determines how much force a container can withstand before the container fails or necks in to form an hourglass shape. Various containers 10 were subjected to top load testing. An Instron tester, such as and generally consistent with an Instron Series 5500 Load Frame, may be used to determine top load performance The top load test was generally performed according to the following procedure. A container was placed on a flat surface such that the floor of the container was arranged to lie in a substantially parallel relation to the flat surface. A crosshead of the Instron tester applied a compressive force to the top of the neck of the container. A load transducer, mounted in series with the container, measured the applied load. Containers 10 were tested until they failed or necked in to form an hourglass shape. Once failure or necking was observed, the value shown on Instron tester was recorded.

Example 32

Parison Cell Counting Method
General Procedure

Parison cell counting is a measurement of the quality of the foam of the extruded material. The extruded material, for example a parison, is cut in cross sections and viewed with microscopy. The number of cells are counted in a given unit volume, for example cubic inches.

A square of the sample to be subjected to the parison cell counting method is cut out from the center of the parison. The excised square of the parison is then divided by cutting across the diagonal exposing the underlying cell structure. The cells are then visualized and counted using microscopy.

Example 33

Formulations and Test Results for Tubes with Varying LDPE

Outer-layer formulation 44 comprised about 95% Dow DMDA 6400 NT7 and about 5% Ampacet 11078 as a white colorant. Inner-layer formulation 40 comprised about 100% Marlex® HHM 5502BN HDPE (available from Chevron Phillips Chemical Company).

Core-layer formulation 48 comprised a percentage of DOW DMDA 6400 NT7 as shown in Table 32, a percentage of DOW™ LDPE 692 LDPE HEALTH+™ as shown in Table 32 to form a core masterbatch that was about 98.9% of the overall formulation, about 0.1% HYDROCEROL® CF 40E as a chemical blowing agent and nucleating agent, and about 1% Heritage Plastics HT4HP talc as another nucleating agent. The $N_2$ was introduced at about 0.032 kg/h. The extruder head temperature was about 190° C., and the core layer extruder barrel temperature was about 180° C. The inner and outer layer extruder barrel temperatures were both 190° C. The resulting expanded core-layer formulation 48 was extruded through a die head to establish a core-layer parison. The core layer extruder was operated at 13 RPM. Inner and outer layers were extruded through the die head, locating the expanded formulation therebetween, to form a multi-layer tube. The inner layer extruder was operated at 20 rpm and the outer layer extruded was operated at 34 rpm such that the inner layer provided about 15% of the thickness of the entire tube, the outer layer provided about 15% of the thickness of the entire tube, and the core layer provided about 70% of the thickness of the entire tube. The multi-layer tube was blow molded to form a container, as shown for example in FIG. 8, to provide a multi-layer bottle wherein the inner layer is about 30%, the outer layer is about 30% and the core layer is about 40% of the total bottle thickness. The Top Load performance was measured according to the Top Load Method described in Example 31, and the results are shown in Table 32. The parison was analyzed using the Cell Count of Parison Method described in Example 32, and the results are shown in Table 32. Table 32 shows the parison densities, the cell count of the parison in the diagonal, the bottle density, and the top load measurement.

TABLE 32

Characteristics of the parison and bottles formed in Example 33.

| Percentage LDPE | Parison Density (g/cm³) | Cell count of parison in diagonal | Bottle Density (g/cm³) | Top Load (lbsF) |
|---|---|---|---|---|
| 0 | 0.526 | 1,081,339 | 0.710 | 91.42 |
| 10 | 0.531 | 1,712,299 | 0.723 | 92.21 |
| 20 | 0.522 | 1,761,616 | 0.714 | 94.03 |
| 30 | 0.517 | 2,033,991 | 0.711 | 87.91 |
| 40 | 0.517 | 2,542,148 | 0.720 | 88.35 |
| 50 | 0.514 | 2,942,949 | 0.711 | 87.28 |
| 60 | 0.514 | 2,842,743 | 0.714 | 86.78 |
| 70 | 0.507 | 3,276,861 | 0.705 | 87.66 |
| 80 | 0.506 | 3,121,752 | 0.708 | 82.65 |
| 90 | 0.512 | 3,174,007 | 0.682 | 80.96 |
| 100 | 0.491 | 2,877,073 | 0.657 | 89.33 |

The invention claimed is:

1. A container comprising:
a floor and
a container wall extending away from the floor, and the container wall and the floor cooperate to form an interior product storage region,
wherein the container wall is formed of a multi-layer material including a first layer of an insulative cellular non-aromatic polymeric material comprising high density polyethylene and a second layer comprising high density polyethylene and in contact with an outer surface of the first layer to locate the insulative cellular non-aromatic polymeric material between the second layer and the interior product-storage region,
wherein the first layer is extruded and the second layer is extruded on the first layer to cause the first layer and the second layer to contact one another,
wherein the container has a density less than about 0.4 g/cm³.

2. The container of claim 1, wherein the first layer and the second layer are extruded together.

3. The container of claim 1, wherein the second layer is about 5 mils to about 26 mils thick.

4. The container of claim 3, wherein the container has an average collapse force in a range of about 50 pounds-Force to about 400 pounds-Force.

5. The container of claim 4, wherein the container survives top load forces of 115 pounds-Force to about 170 pounds-Force.

6. The container of claim 3, wherein the first layer is about 14 mils to about 130 mils thick.

7. A container comprising:
a floor and
a container wall extending away from the floor, and the container wall and the floor cooperate to form an interior product storage region,
wherein the container wall is formed of a multi-layer material including a first layer of an insulative cellular non-aromatic polymeric material comprising high density polyethylene and a second layer arranged to locate the insulative cellular non-aromatic polymeric material between the second layer and the interior product-storage region, and
wherein the insulative cellular non-aromatic polymeric material comprises regrind of previously prepared containers.

8. The container of claim 7, wherein the regrind is free of aromatic material.

9. A method of producing a container, the method comprising:
extruding a first layer of an insulative cellular non-aromatic polymeric material comprising high density polyethylene,
extruding a second layer onto an outer surface of the first layer to contact the first layer to form a multilayer material, the second layer comprising high-density polyethylene, and forming a container from the multilayer material,
wherein the container has a floor, a container wall extending away from the floor and the container wall and the floor cooperate to form an interior product storage region,
wherein the container has a density less than about 0.4 g/cm³.

10. The method of claim 9, wherein the second layer is about 5 mils to about 26 mils thick.

11. The method of claim 10, wherein the container has an average collapse force of in a range of about 50 pounds-Force to about 400 pounds-Force.

12. The method of claim 11, wherein the container survives top load forces of 115 pounds-Force to about 170 pounds-Force.

13. The method of claim 9, wherein the container has an average collapse force of in a range of about 50 pounds-Force to about 400 pounds-Force.

\* \* \* \* \*